United States Patent
Thubert et al.

(10) Patent No.: US 9,112,788 B2
(45) Date of Patent: *Aug. 18, 2015

(54) BICASTING USING NON-CONGRUENT PATHS IN A LOOP-FREE ROUTING TOPOLOGY HAVING ROUTING ARCS

(71) Applicants: Pascal Thubert, La Colle sur Loup (FR); Patrice Bellagamba, Saint-Raphael (FR); Ijsbrand Wijnands, Leuven (BE)

(72) Inventors: Pascal Thubert, La Colle sur Loup (FR); Patrice Bellagamba, Saint-Raphael (FR); Ijsbrand Wijnands, Leuven (BE)

(73) Assignee: Cisco Technology, Inc., San Jose, CA (US)

( * ) Notice: Subject to any disclaimer, the term of this patent is extended or adjusted under 35 U.S.C. 154(b) by 259 days.

This patent is subject to a terminal disclaimer.

(21) Appl. No.: 13/648,500

(22) Filed: Oct. 10, 2012

(65) Prior Publication Data

US 2014/0098711 A1    Apr. 10, 2014

(51) Int. Cl.
| | |
|---|---|
| H04L 12/28 | (2006.01) |
| H04L 12/735 | (2013.01) |
| H04L 12/705 | (2013.01) |
| H04L 12/707 | (2013.01) |

(52) U.S. Cl.
CPC .............. *H04L 45/128* (2013.01); *H04L 45/18* (2013.01); *H04L 45/24* (2013.01)

(58) Field of Classification Search
None
See application file for complete search history.

(56) References Cited

U.S. PATENT DOCUMENTS

| | | | |
|---|---|---|---|
| 7,656,857 B2 | 2/2010 | Thubert et al. | |
| 7,668,119 B2 | 2/2010 | Thubert et al. | |
| 7,693,064 B2 | 4/2010 | Thubert et al. | |
| 7,801,031 B2 | 9/2010 | Chao et al. | |
| 2002/0176371 A1 | 11/2002 | Bahzadi | |
| 2003/0046426 A1 | 3/2003 | Nguyen | |
| 2009/0073921 A1* | 3/2009 | Ji et al. ........................ | 370/328 |
| 2009/0228575 A1* | 9/2009 | Thubert et al. ................ | 709/220 |
| 2010/0188979 A1 | 7/2010 | Thubert et al. | |

(Continued)

OTHER PUBLICATIONS

Atlas, Ed., "U-turn Alternates for IP/LDP Fast-Reroute", [online], Feb. 2006, [retrieved on Sep. 28, 2010] Network Working Group, Internet-Draft, <draft-atlas-ip-local-protect-uturn-03>. Retrieved from the Internet: <URL: http://tools.ietf.org/html/draft-atlas-ip-local-protect-uturn-03>, pp. 1-29.

(Continued)

*Primary Examiner* — Sulaiman Nooristany
(74) *Attorney, Agent, or Firm* — Leon R. Turkevich

(57) ABSTRACT

In one embodiment, a method comprises creating, in a computing network, a loop-free routing topology comprising a plurality of routing arcs for reaching a destination network node, each routing arc comprising a first network node as a first end of the routing arc, a second network node as a second end of the routing arc, and at least a third network node configured for routing any network traffic along the routing arc toward the destination node via any one of the first or second ends of the routing arc, the loop-free routing topology providing first and second non-congruent paths; and forwarding bicasting data, comprising a data packet in a first direction from a network node and a bicasted copy of the data packet in a second direction from the network node, concurrently to the destination node respectively via the first and second non-congruent paths.

21 Claims, 35 Drawing Sheets

(56) References Cited

U.S. PATENT DOCUMENTS

| | | | |
|---|---|---|---|
| 2012/0300668 A1 | 11/2012 | Thubert et al. | |
| 2013/0058349 A1* | 3/2013 | Khalil et al. | 370/400 |
| 2013/0195111 A1* | 8/2013 | Allan et al. | 370/395.53 |
| 2013/0208594 A1* | 8/2013 | Thubert et al. | 370/235 |
| 2013/0301470 A1* | 11/2013 | Thubert et al. | 370/254 |

OTHER PUBLICATIONS

Winter, Ed., "RPL: Routing Protocol for Low Power and Lossy Networks", [online], Aug. 3, 2009, [retrieved on Apr. 11, 2011]. Network Working Group, Internet-Draft, <draft-ietf-roll-rpl-00>. Retrieved from the Internet: <URL: http://tools.ietf.org/html/draft-ietf-roll-rpl-00>, pp. 1-69.

Atlas, Ed. et al., "Basic Specification for IP Fast Reroute: Loop-Free Alternates", [online], Sep. 2008, [retrieved on Aug. 17, 2010]. Network Working Group, Request for Comments: 5286. Retrieved from the Internet: <URL: http://tools.ietf.org/html/rfc5286>, pp. 1-31.

Filsfils et al., "LFA applicability in SP networks", [online], Mar. 1, 2010, [retrieved on Aug. 29, 2011]. Network Working Group, Internet-Draft, <draft-filsfils-rtgwg-lfa-applicability-00>. Retrieved from the Internet: <URL: http://tools.ietf.org/html/draft-filsfils-rtgwg-lfa-applicability-00>, pp. 1-28.

Atlas et al., "Algorithms for computing Maximally Redundant Trees for IP/LDP Fast-Reroute", [online], Oct. 24, 2011, [retrieved on Nov. 30, 2011]. Routing Area Working Group, IETF Draft, <draft-enyedi-rtgwg-mrt-frr-algorithm-00>. Retrieved from the Internet: <URL: http://tools.ietf.org/id/draft-enyedi-rtgwg-mrt-frr-algorithm-00.txt>, pp. 1-40.

Atlas, Ed., "U-turn Alternates for IP/LDP Local Protection", [online], Jul. 8, 2004 [retrieved on Apr. 11, 2011] Network Working Group, Internet-Draft, <draft-atlas-ip-local-protect-uturn-00>. Retrieved from the Internet: <URL: http://tools.ietf.org/html/draft-atlas-ip-local-protect-uturn-00>, pp. 1-30.

Thubert et al., "Available Routing Constructs", Internet Draft, Oct. 2, 2012, <draft-thibert-rtgwg-arc-00>, XP015087564, pp. 1-19.

Ramanathan et al., "Delivery of Time-Critical Messages Using a Multiple Copy Approach", ACM Transactions on Computer Systems, vol. 10, No. 2, May 10, 1992, New York, XP000329077, pp. 144-166.

Fragopoulou et al., "Edge-Disjoint Spanning Trees on the Star Network with Applications to Fault Tolerance", IEEE Transactions on Computers, vol. 45, No. 2, Feb. 15, 1996, New York, XP000583111, pp. 174-185.

Thubert et al., U.S. Appl. No. 13/620,677, filed Sep. 14, 2012.
Thubert et al., U.S. Appl. No. 13/371,065, filed Feb. 10, 2012.
Thubert et al., U.S. Appl. No. 13/467,603, filed May 9, 2012.
Thubert et al., U.S. Appl. No. 13/566,029, filed Aug. 3, 2012.

Martini et al., "Inter-Chassis Communication Protocol for L2VPN PE Redundancy", [online], Jul. 9, 2011, [retrieved on Jul. 16, 2012]. Retrieved from the Internet: <URL: http://tools.ietf.org/pdf/draft-ietf-pwe3-iccp-06.pdf>, pp. 1-78.

Atlas, Ed., et al., "An Architecture for IP/LDP Fast-Reroute Using Maximally Redundant Trees", [online], Mar. 12, 2012, [retrieved on Jul. 16, 2012]. Retrieved from the Internet: <URL: http://tools.ietf.otg/pdf/draft-ietf-rtgwg-mrt-frr-architecture-01.pdf>, pp. 1-25.

Thubert, Ed. et al., "Available Routing Constructs", [online], Oct. 2, 2012, [retrieved on Oct. 11, 2012]. Retrieved from the Internet: <URL: http://tools.ietf.org/pdf/draft-thubert-rtgwg-arc-00.pdf>, pp. 1-19.

DocWiki, "MLPS/Tag Switching", [online], Oct. 15, 2010, [retrieved on Jul. 13, 2012]. Retrieved from the Internet: <URL: http://docwiki.cisco.com/wiki/MLPS/Tag_Switching>, pp. 1-10.

Rosen et al., Multiprotocol Label Switching Architecture, Network Working Group, Request for Comments: 3031, Jan. 2001, pp. 1-61.

Andersson et al., "LDP Specification", Network Working Group, Request for Comments: 3036, Jan. 2001, pp. 1-132.

Andersson et al., "LDP Specification", Network Working Group, Request for Comments: 5036, Oct. 2007, pp. 1-135.

Smith et al., "Label Edge Router Forwarding of IPv4 Option Package", Internet Engineering Task Force, Request for Comments: 6178, Mar. 2011, pp. 1-9.

PCT/US12/39039 International Search Report, Aug. 24, 2012.

Cho et al., "Resilient multipath routing with independent directed acyclic graphs", Proceedings of IEEE International Conference on Communications (ICC), [online], May 2010, [retrieved on Oct. 30, 2012]. Retrieved from the Internet: <URL: http://ieeexplore.ieee.org/stamp/stamp.jsp?tp=&arnumber=5502526>, 5 pages.

Cho et al., Independent Directed Acyclic Graphs for Resilient Multipath Routing:, IEEE/ACM Transactions on Networking, vol. 1, No. 20, [online], Feb. 20, 2012, [retrieved on Oct. 24, 2012]. Retrieved from the Internet: <URL: http://srini.ca/p/Srini-2011-TON-IDAGS.pdf>, pp. 153-162.

Erlebach et al., "Path Splicing with Guaranteed Fault Tolerance", IEEE GLOBECOM 2009 Proceedings, [online], [retrieved on Oct. 23, 2012]. Retrieved from the Internet: <URL: http://202.194.20.8/proc/GLOBECOM2009/DATA/PID960701.PDF>, 6 pages.

Erlerbach et al., "Path Splicing with Guaranteed Fault Tolerance", Dynamo 2009, Dagstuhl, Germany, [online], [retrieved on Nov. 26, 2012]. Retrieved from the Internet: <URL: http://cost295.lboro.ac.uk/docs/dagstuhl/files/erlebach.pdf>, 52 pages.

"ATM Routing", SES PNNI Controller Software Configuration Guide, Release 1.0, Part No. 78-6123-03, May 2000, pp. 2-1 to 2-28 (28 pages).

Bryant et al., "Joint Working Team (JWT) Report on MPLS Architectural Consideration for a Transport Profile", Network Working Group, Request for Comments: 5317, Feb. 2009, pp. 1-68.

Niven-Jenkins et al., Requirements of an MPLS Transport Profile:, Network Working Group, Request for Comments: 5654, Sep. 2009, pp. 1-31.

Beller et al., "An In-Band Data Communication Network for the MPLS Transport Profile", Internet Engineering Task Force, Request for Comments: 5718, Jan. 2010, pp. 1-8.

Vigoureux et al., "Requirements for Operations, Administration, and Maintenance (OAM) in MPLS Transport Networks", Internet Engineering Task Force, Request for Comments: 5860, May 2010, pp. 1-17.

Nelakuditi et al., "Fast Local Rerouting for Handling Transient Link Failures", [online], 2007; pp. 14 https://www.dtc.umn.edu/publications/report/2007_12.pdf.

* cited by examiner

From Figure 3C
↓

(C.2.b.) if N is not an intermediate junction yet:

→ (C.2.b.i.) if link (N,i) enables the end point node of (N,i) to become a junction, and if link (N,i) does not cause pruning of the SPF link of safe node N, mark link (N,i) reversible (this link is reversible within an arc);

→ (C.2.b.ii.) if safe node N is now an edge Junction towards S, prune outgoing ?-S links of safe node N with ☐ and reverse orientation to inwards, and change all incoming links of safe node N from "?-S" to "?-N";

→ (C.2.b.iii.) if safe node N is now an intermediate junction, prune outwards all links of safe node N but the 2 reversible links with ☐, and reverse orientation of pruned links to inwards;

→ (C.3.) if the link (N,i) is incoming, if marked ?-S mark it ?-N, recursively mark all unresolved incoming links in SubDAG of N to ?-N;

→ (C.4.) recursively call "resolve_neighbor" for endpoint node of link (N,i) (i.e., resolve_neighbor (link_end_point));

State Table, 54

| Event | Network Node under Analysis | Link Analysis, Status Change(s) | Node Status Change(s) |
|---|---|---|---|
| 200 | R | A→R; B→R | R=Root |
| 202 | A | A→R = Resolved (SPF); D→A = ?-A; C→A = ?-A | A= Heir |
| 204 | B | B→R = Resolved (SPF); K→B = ?-B; | B = Heir |
| 206 | K | K→B = SPF; M→K = ?-B; J→K = ?-B | |
| 208 | M | M→K = SPF; J→M = ?-B | |
| 210 | D | D→A = SPF; C→D = ?-A; E→D = ?-A; L→D = ?-A | |
| 212 | C | C→A = SPF; E→C = ?-A; F→C = ?-A | |
| 214 | L | L→D = SPF; E→L = ?-A | |
| 216 | E | E→C = SPF; F→E = ?-A; G→E = ?-A; H→E = ?-A | |
| 218 | F | F→C = SPF; H→F = ?-A; I→F = ?-A; J→F = ?-A | |
| 220 | N | N→L = Resolved | N = Leaf |
| 222 | G | G→E = SPF; H→G = ?-A | |
| 224 | H | H→F = SPF; I→H = ?-A | |
| 226 | I | I→F = SPF | |
| 228 | J | J→K = SPF, J→K = "Rev" (Reversible); M☐→J = ?-J | J = Edge Junction |

| | | | |
|---|---|---|---|
| 230 | K(J) | K→B = "Rev"; M→K = ?-K | K = Edge Junction (J→K=Rev); K=Intermediate Junction (K→B= Rev) |
| 232 | B(K, J) | (B→R Already Resolved) | B = Edge Junction, End of Arc |
| 234 | K(J) | (Resolve Next Endpoint M of link M→K) | |
| 236 | M(K, J) | M→K = Resolved (1st End of first collapsed arc ARC1) | M = Junction |
| 238 | K(M,K,J) | (No other links to analyze, return to M) | |
| 240 | M(K, J) | M→J = Resolved (2nd End of first collapsed arc ARC1: first collapsed arc ARC1 completed) | |

From Figure 4A

To Figure 4C

State Table, 54

Figure 4B

From Figure 4B ↓

State Table, 54

| | | |
|---|---|---|
| 242 | (No other links to analyze, return to J) | J=Intermediate Junction |
| 244 | K(J) <br> J→F = Rev | F=Edge Junction |
| 246 | F(J) <br> F→C = Rev; E☐→F = ?-F; <br> H→F = ?-F; I→F = ?-F | C=Edge Junction |
| 248 | C(F, J) <br> C→A = Rev; D☐→C = ?-C; <br> E→C = ?-C | A=Edge Junction, End of ARC2 |
| 250 | A(C, F, J) <br> (A→R Already Resolved, First Infrastructure Arc ARC2 Formed) | D = Junction |
| 252 | D(A, C, F, J) <br> D→A = Resolved (1st end of second collapsed arc ARC3); D☐→C = Resolved (Second Collapsed Arc ARC3 Formed) <br> L→D = ?-D; E→D = ?-D; E→L = ?-D; <br> G→E = ?-D; H→G = ?-D; I→H = ?-D; and H→E = ?-D | |
| 254 | E(D, A, C, F, J) <br> E→C = Resolved (1st end of Second Infrastructure Arc ARC4); E→D = Resolved (1st end of Collapsed Arc ARC8); <br> E→L = Rev | E=Junction |

From Figure 4C

| | | | |
|---|---|---|---|
| 256 | L(E, D, A, C, F, J) | L→D = Resolved (Second Infrastructure Arc ARC4 Formed) | L=Edge Junction |
| 258 | E(D, A, C, F, J) | E□→F = Resolved (Collapsed Arc ARC8 formed); G→E = ?-E; H→E = ?-E, H→G = ?-E, and I→H = ?-E | |
| 260 | G(E, D, A, C, F, J) | (no-op, return to E) | |
| 262 | E(D, A, C, F, J) | Call endpoint of H→E | |
| 264 | H(E, D, A, C, F, J) | H→F = Resolved (1d End of Infrastructure Arc ARC5, 1st End of Collapsed Arc ARC6); H→E = Resolved (2nd End of Collapsed Arc ARC6); H→G = Rev | H = Junction |
| 266 | G(H, E, D, A, C, F, J) | G→E = Resolved (2nd End of Infrastructure Arc ARC5 | G = Edge Junction |
| 268 | H(E, D, A, C, F, J) | I→H = ?-H | |
| 270 | I(H, E, D, A, C, F, J) | I→F = Resolved (1st End of Collapsed Arc ARC7); I→H = Resolved (2nd End of Collapsed Arc ARC7) | I = Junction |
| 272 | Return to J, Analysis Complete | | |

State Table, 54

Figure 4D

| Arc Topology for Root Node "R" | |
|---|---|
| Root Network Node | R |
| SPF Links | A→R; B→R; C→A; D→A; E→C; F→C; G→E; H→F; I→F; J→K; K→B; L→D; M→K; N→L |
| Junction Nodes | A, B, C, D, E, F, G, H, I, J, K, L, M |
| Leaf Nodes | N |
| Reversible Links | J→K; K→B; J→F; F→C; C→A; E→L; H→G |
| Arc Node Membership | ARC1: J-M-K<br>ARC2 (Base Arc to Root R): B-K-J-F-C-A<br>ARC3: A-D-C<br>ARC4: D-L-E-C<br>ARC5: E-G-H-F<br>ARC6: E-H-F<br>ARC7: H-I-F<br>ARC8: D-E-F |
| Arc Cursor Ownership | ARC1: M (collapsed)<br>ARC2: J<br>ARC3: D (collapsed)<br>ARC4: E<br>ARC5: H<br>ARC6: H (collapsed)<br>ARC7: I (collapsed)<br>ARC8: E (collapsed) |

Figure 5

| ARC Reference | Cursor (Serialized Arc ID) | Serialized Arc Format | |
|---|---|---|---|
| ARC2 | J | ([R], {B, K, J, F, C, A}, [R]) | ←114a |
| ARC4 | E1 | ([C], {E, L}, [D]) | ←114b |
| ARC5 | H1 | ([F], {H,G}, [E]) | ←114c |
| ARC1 | M | ([K], {M}, [J]) | ←114d |
| ARC3 | D | ([A], {D}, [C]) | ←114e |
| ARC6 | H2 | ([F], {H}, [E]) | ←114f |
| ARC8 | E2 | ([D], {E}, [F]) | ←114g |
| ARC7 | I | ([F], {I}, [H]) | ←114h |

| Multicasting Network Node | Pruning Action by Multicasting Node | Multicasted Set of Serialized Arcs | |
|---|---|---|---|
| Ω(R)→A; A→C; C→F; F→J; Ω(R)→B; B→K; K→J; | (None) | Ω=R: [J, E1, H1, M, D, H2, E2, I] | ←116a |
| A→D; C→D | Prune J, M | Ω=R: [E1, H1, D, H2, E2, I] | ←116b |
| C→E; F→E | Prune J, M, D | Ω=R: [E1, H1, H2, E2, I] | ←116c |
| F→H | Prune J, M, D, E1, E2 | Ω=R: [H1, H2, I] | ←116d |
| F→I | Prune J, M, D, E1, E2, H1, H2 | Ω=R: [I] | ←116e |
| D→E | Further Prune D | Ω=R: [E1, H1, H2, E2, I] | ←116f |
| D→L | Further Prune D, H1, H2, E2, I | Ω=R: [E1] | ←116g |
| L→E | Further Prune H1, H2, E2, I | Ω=R: [E1] | ←116h |
| E→G | Further Prune H1, H2, E2, I | Ω=R: [H1] | ←116i |
| E→H | Further Prune E1, E2 | Ω=R: [H1, H2, I]] | ←116j |
| G→H | (None) | Ω=R: [H1] | ←116k |
| H→I | Further Prune H1, H2 | Ω=R: [I] | ←116l |
| K→M; J→M | Prune J, E1, H1, D, H2, E2, I | Ω=R: [M] | ←116m |

BICASTING USING NON-CONGRUENT PATHS IN A LOOP-FREE ROUTING TOPOLOGY HAVING ROUTING ARCS

TECHNICAL FIELD

The present disclosure generally relates to generating a loop-free routing topology in a computing network, such as an Internet Protocol (IP) network.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

Bicasting is employed in industrial wireless applications where both reliability and timeliness of data traffic must be guaranteed. However, existing routing protocols are not well suited for bicasting applications. Existing routing protocols assume recalculation of routes can be performed in response to a detected failure (e.g., loss of a link or a connecting network node); however, recalculation of routes requires computation time that likely results in a loss of data traffic. One attempt to accelerate responding to a detected failure includes "Loop Free Alternates" (LFA), where a router can respond to losing a next hop router in a path to a destination node by identifying a feasible successor for reaching the destination node, as long as the feasible successor does not create a loop by sending the packet back to the router. The IETF Draft by Atlas, entitled "U-turn Alternates for IP/LDP Local Protection (draft-atlas-ip-local-protect-uturn-00.txt)", illustrates in FIG. 3 of the IETF Draft a network topology where LFA solutions can be provided for the network nodes N2, N4, and R3 to forward a data packet to the destination node D in the event of a failed link, however, LFA cannot provide any solutions for any of the network nodes N3, S, P, R1, or R2. The IETF Draft by Atlas proposed a "U-turn protocol" to reverse a link; however, the U-turn protocol cannot provide any solution for the nodes P, R1, or R2 of FIG. 3 in the event of a link failure.

Another proposed routing protocol, referred to as "Fast Local Rerouting for Handling Transient Link Failures" (FIR) requires a complete recalculation of routes in response to a link failure, and hence recalculation of routes requires computation time that likely results in a loss of data traffic.

BRIEF DESCRIPTION OF THE DRAWINGS

Reference is made to the attached drawings, wherein elements having the same reference character designations represent like elements throughout and wherein:

FIGS. 3A, 3B, 3C and 3D illustrate example methods for creating a loop-free routing topology, according to an example embodiment.

FIG. 4 (consisting of FIGS. 4A, 4B, 4C and 4D) illustrate an example data structure in the memory circuit of the apparatus of FIG. 2 used for creation of a loop-free routing topology, according to an example embodiment.

FIG. 5 illustrates another example data structure in the memory circuit of the apparatus of FIG. 2 used for creation of a loop-free routing topology, according to an example embodiment.

FIG. 12 illustrates selective pruning of selected paths from the set of serialized representations propagated from the destination network node by network nodes within the loop-free routing topology, according to an example embodiment.

DESCRIPTION OF EXAMPLE EMBODIMENTS

Overview

Figure 1:
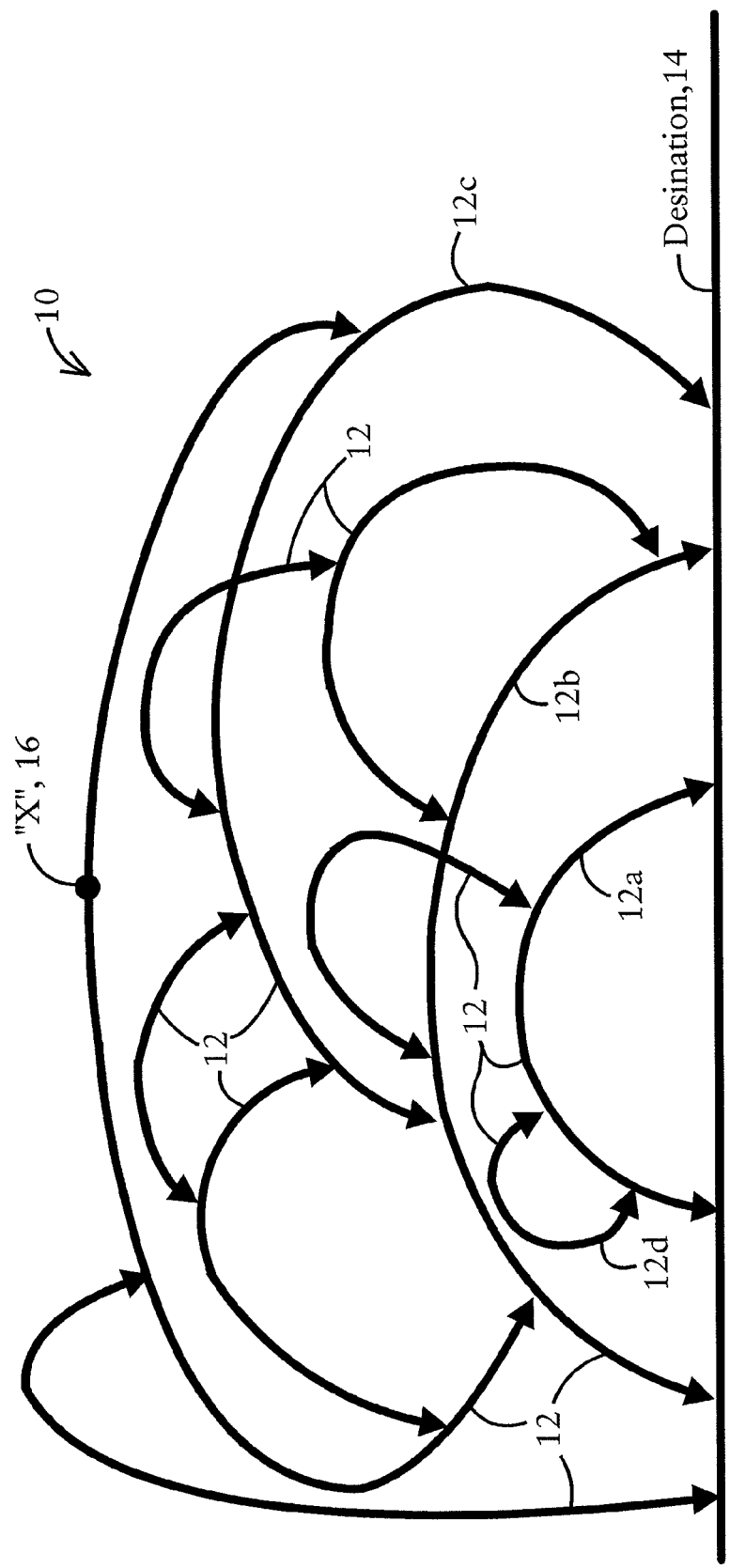
FIG. 1 illustrates an example loop-free routing topology comprising a plurality of routing arcs for reaching a destination network node, according to an example embodiment.

In one embodiment, a method comprises creating, in a computing network, a loop-free routing topology comprising a plurality of routing arcs for reaching a destination network node, each routing arc comprising a first network node as a first end of the routing arc, a second network node as a second end of the routing arc, and at least a third network node configured for routing any network traffic along the routing arc toward the destination node via any one of the first or second ends of the routing arc, the loop-free routing topology providing first and second non-congruent paths; and forwarding bicasting data, comprising a data packet in a first direction from a network node and a bicasted copy of the data packet in a second direction from the network node, concurrently to the destination node respectively via the first and second non-congruent paths.

In another embodiment, an apparatus comprises a processor circuit and a network interface circuit. The processor circuit is configured for creating, in a computing network, a loop-free routing topology comprising a plurality of routing arcs for reaching a destination network node, each routing arc comprising a first network node as a first end of the routing arc, a second network node as a second end of the routing arc, and at least a third network node configured for routing any network traffic along the routing arc toward the destination node via any one of the first or second ends of the routing arc, the loop-free routing topology providing first and second non-congruent paths. The network interface circuit is configured for causing forwarding of bicasting data, comprising a data packet in a first direction from a network node and a bicasted copy of the data packet in a second direction from the network node, concurrently to the destination node respectively via the first and second non-congruent paths.

DETAILED DESCRIPTION

Particular embodiments enable efficient network traffic management from a source network node to a destination network node in a loop-free routing topology having distinct paths, such as routing arcs, that enable the network traffic to be routing along any of two ends of any path. The particular embodiments apply the use of routing arcs to create at least two non-congruent paths within the loop-free routing topology: the term "non-congruent" is defined as any network path (between a source node and a destination node) that does not share any part of its path (including any intermediate network nodes or connecting data links) with any other network path. Hence, two network paths are non-congruent if they do not share any data link or any intermediate network node between the source node and the destination node. The use of non-congruent paths guarantees that any traffic that is bicasted concurrently along the non-congruent paths from the source node will reach the destination node, even if there is a failure in one of the non-congruent paths.

The non-congruent paths also can be used for multicasting, where a multicast registration bicasted by a multicast consumer is marked (i.e., recorded) by each intermediate network node and forwarded along the non-congruent paths. The destination network node (i.e., the multicast registration destination) can utilize the non-congruent paths for transmission of multicast streams via the non-congruent paths. Collision mediation also is employed to ensure multiple multicast subscribers do not create overlapping multicast streams.

The following description will begin with describing creation of a plurality of routing arcs (omega arcs), followed by a description of establishment of omega label switched paths for reaching a destination network node. The description of the omega arcs and the omega label switched paths are described with respect to FIGS. 1 through 15. The omega label switched paths enable fast rerouting to be implemented within the loop-free routing topology. The description of establishing the non-congruent paths will be described with respect to FIGS. 16 through 19.

Generating the Loop-Free Topology Using Routing Arcs

FIGS. 1 through 6I describe the generation of routing arcs in loop-free topology using routing arcs, according to an example embodiment. Routing arcs can be generated in a loop-free routing topology that can guarantee that any network node having at least two data links can reach the destination network node via at least one of the routing arcs: the network traffic can be instantaneously rerouted toward another end of a routing arc in response to detected data link failure (or network node failure), based on reversing an identified reversible link within the routing arc. The reversal of the identified reversible link within the routing arc also is guaranteed to not introduce any loops into the loop-free routing topology.

In one embodiment, the loop-free routing topology is represented by generating a set of serialized representations describing the loop-free routing topology. In particular, each serialized representation describes one of the paths (e.g., routing arcs), in the loop-free routing topology; for example a serialized representation of a given path or routing arc can resemble a source route path from one end of the path (e.g., a first junction node of a routing arc) to another end of the path (e.g., a second junction node of a routing arc). Hence, the set of the serialized representations provides a complete representation of all the paths in the loop-free routing topology.

Moreover, any network node receiving the set of serialized representations can establish multiple paths for reaching the destination network node, for example in the form of loop-free label switched paths for reaching the destination network node. Hence, the propagation of the serialized representations throughout the network nodes in the computing network enables the automatic deployment of label switched paths by the network nodes.

In particular, the following description with respect to FIGS. 1 through 6I describe an apparatus creating, in a computing network, a loop-free routing topology comprising a plurality of routing arcs for reaching a destination network node: each routing arc comprises a first network node as a first end of the routing arc, a second network node as a second end of the routing arc, and at least a third network node configured for routing any network traffic along the routing arc toward the destination network node via any one of the first or second ends of the routing arc.

A junction node is defined as a network node (e.g., a computing network having a prescribed network topology, for example a prescribed ring topology) identified based on its relative position within a network topology) that has at least two data links providing respective non-congruent paths for reaching the destination network node: the term "non-congruent" in this specification and the attached claims requires that the paths from a junction node do not share any common data link for reaching the destination network node, rather each link belonging to one path (from the junction node to the destination network node) is distinct and independent of any link belonging to the second non-congruent path (from the junction node to the destination network node).

A data link of a junction node also can be deemed a "reversible link" if the data link enables an endpoint of the data link (i.e., a network node that is directly coupled to the junction node via the data link) to become a junction node having its own non-congruent paths for reaching the destination network node.

In one embodiment, one or more junction nodes coupled by a reversible link can be logically connected in sequence to create a routing arc as a first infrastructure arc having its two corresponding ends terminating at the destination network node. Additional routing arcs can be created that have at least one end terminating in a previously-created infrastructure arc (e.g., the first infrastructure arc), and the other end terminating in either a previously-created infrastructure arc or the destination network node, where each new routing arc includes network nodes that are distinct from any of the network nodes in previously-generated routing arcs. In other words, a network node assigned to one existing routing arc cannot later be assigned to another routing arc (except if the network node is a junction between the existing routing arc and an end of the newer routing arc).

In another embodiment, a routing arc can be created as an infrastructure arc based on identifying, within a first directed acyclic graph for reaching the destination network node, one or more junction nodes having reversible links for reaching the destination network node via non-congruent paths; a second routing arc can be created based on identifying, within the first directed acyclic graph, a second directed acyclic graph for reaching one of the junction nodes (as one end of the second routing arc) of the first directed acyclic graph, and identifying within the second directed acyclic graph a new junction node having a new non-congruent path for reaching the destination network node that is distinct from the one junction node, the new junction node providing the new non-congruent path via the second end of the second routing arc that terminates either at the destination network node or a previously-created infrastructure routing arc.

Hence, example embodiments enable any network node having two data links in the loop-free routing topology to be guaranteed reachability to the destination network node, even if any one data link in the loop-free routing topology encounters a failure, based on reversing an identified reversible link.

FIG. 1 illustrates an example loop-free routing topology 10 comprising a plurality of routing arcs 12 for reaching a destination network node 14, according to an example embodiment. Each routing arc 12 comprises a plurality of network nodes 16 each having at least two data links for reaching adjacent network nodes. As apparent from FIG. 1, the loop-free routing topology 10 guarantees that any network node 16 along any point of any arc 12 (illustrated by "X" in FIG. 1) has at least two non-congruent paths for reaching the destination network node 14, guaranteeing reachability to the destination network node 14 even if a link failure is encountered in the loop-free routing topology 10. The term "node" in the specification and claims can refer to a network device or a network having a prescribed topology, for example a ring-based network having a prescribed ring topology.

As described in further detail below with respect to FIGS. 6A-6I, each routing arc (e.g., "ARC1" of FIG. 6I) 12 comprises at least three network nodes 16, namely a first network node (e.g., network node "K" of FIG. 6I) 16 designated as a first end of the routing arc, a second network node (e.g., network node "J" of FIG. 6I) 16 designated as a second end of the routing arc, and at least a third network node (e.g., network node "M" of FIG. 6I) 16 identified as a junction node and configured for routing any network traffic along the routing arc toward the destination network node 14 via any one of two available non-congruent paths provided by the first or second ends of the routing arc. Hence, network traffic can be forwarded along at least one of the routing arcs 12 to the destination network node 14.

Figure 6A:
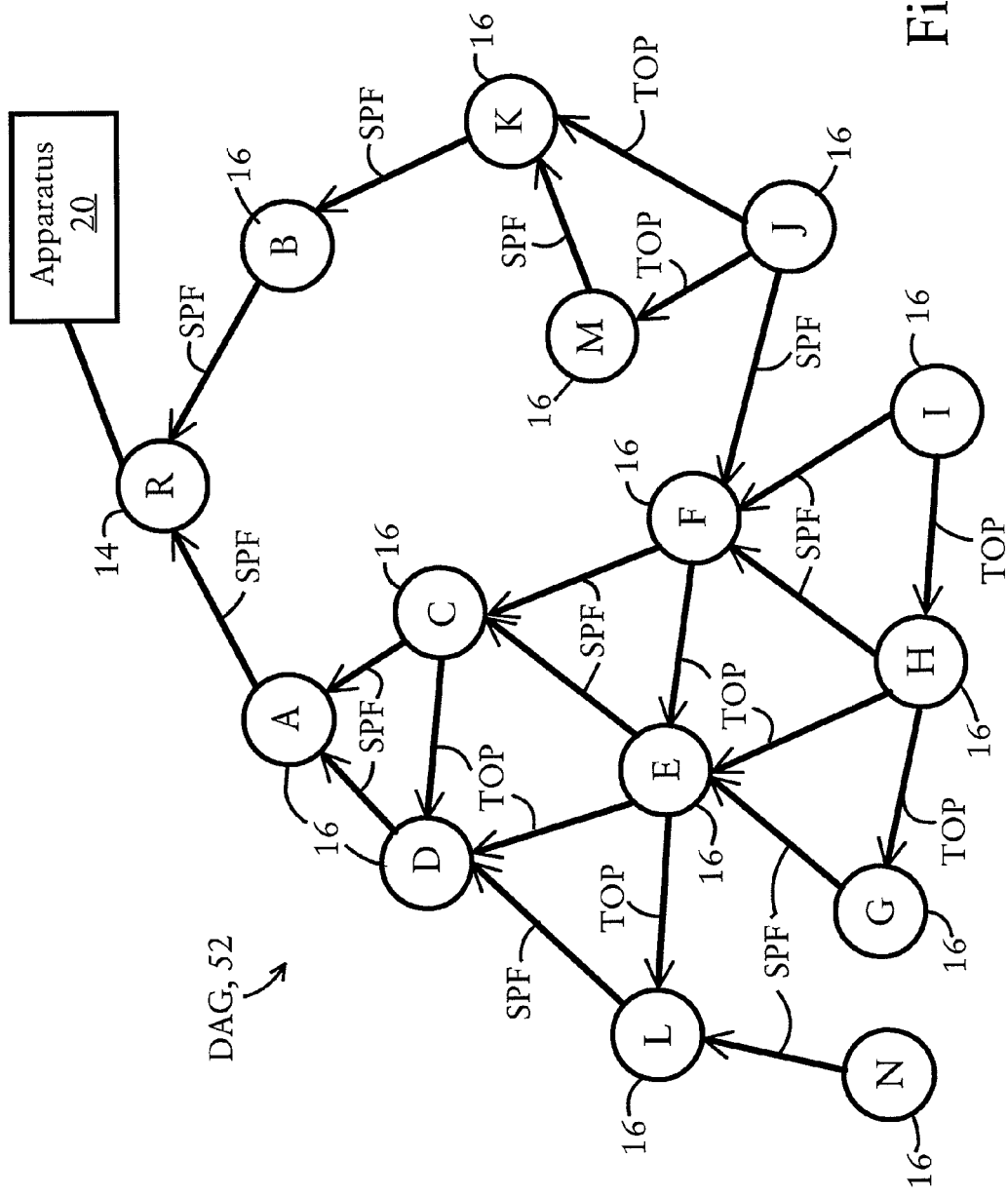
FIGS. 6A-6I illustrate an example sequence of constructing, from the link layer network of FIG. 2, the loop-free routing topology having a plurality of paths (e.g., routing arcs), according to an example embodiment.
Figure 6B:
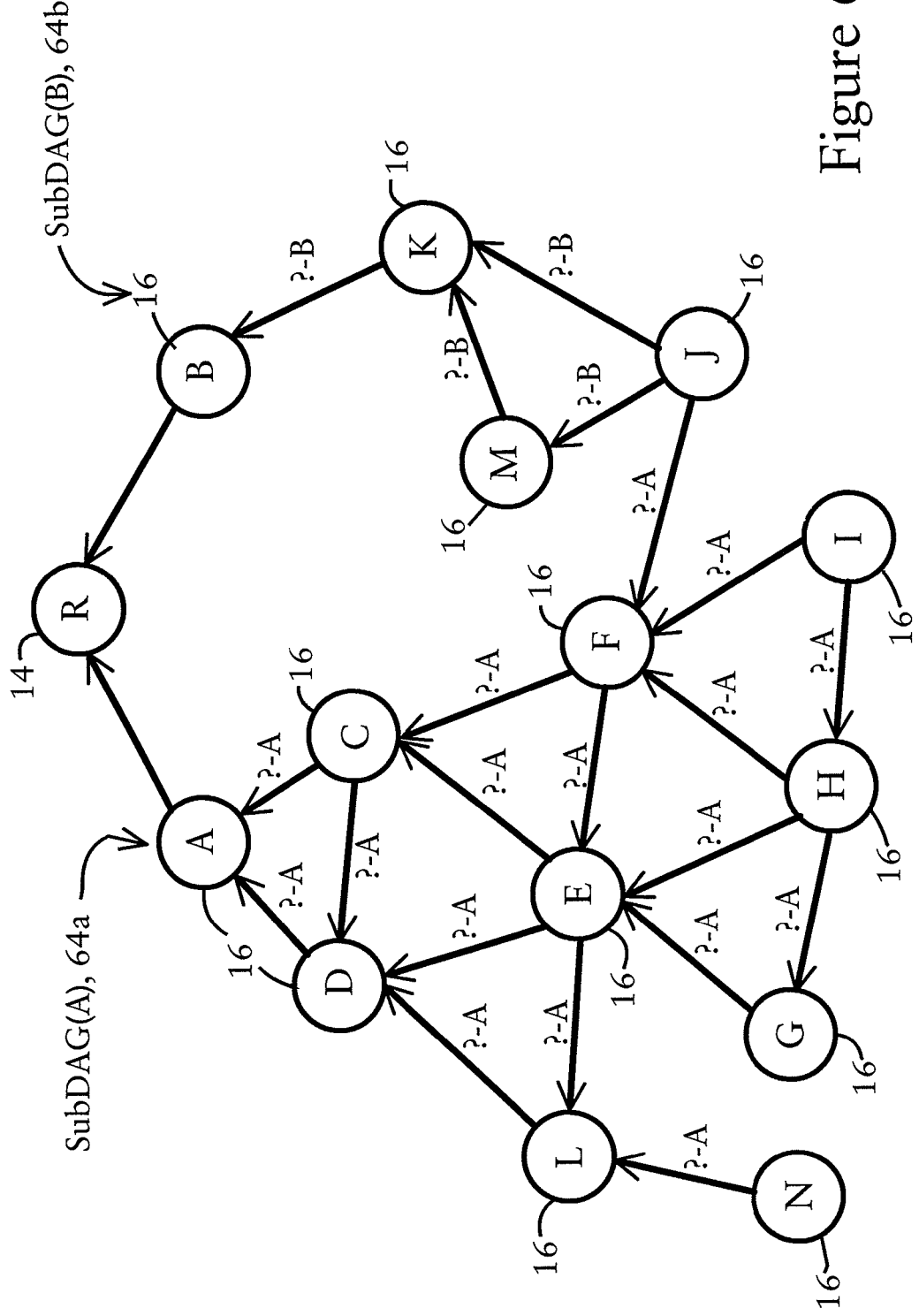
Figure 6C:
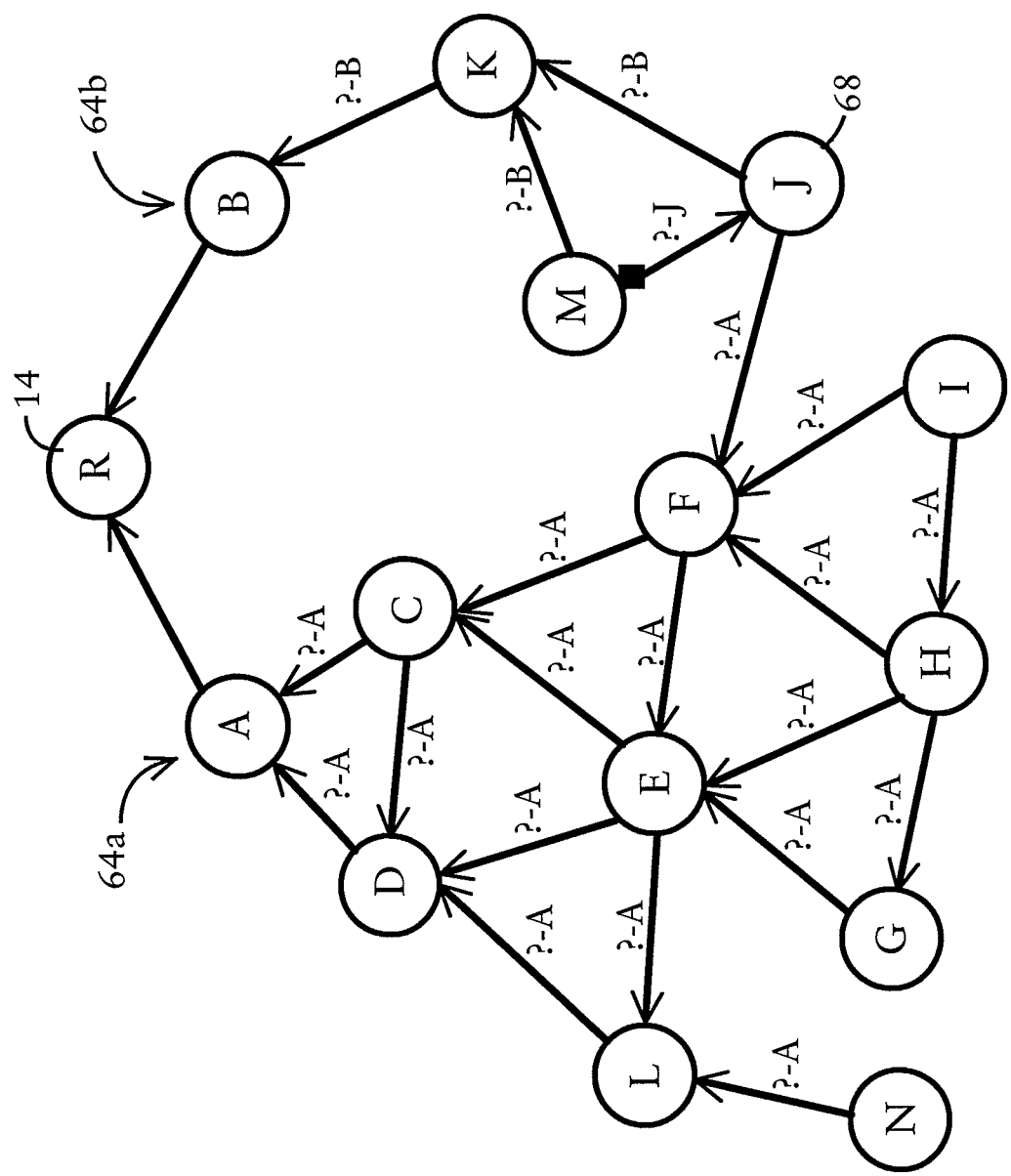
Figure 6D:
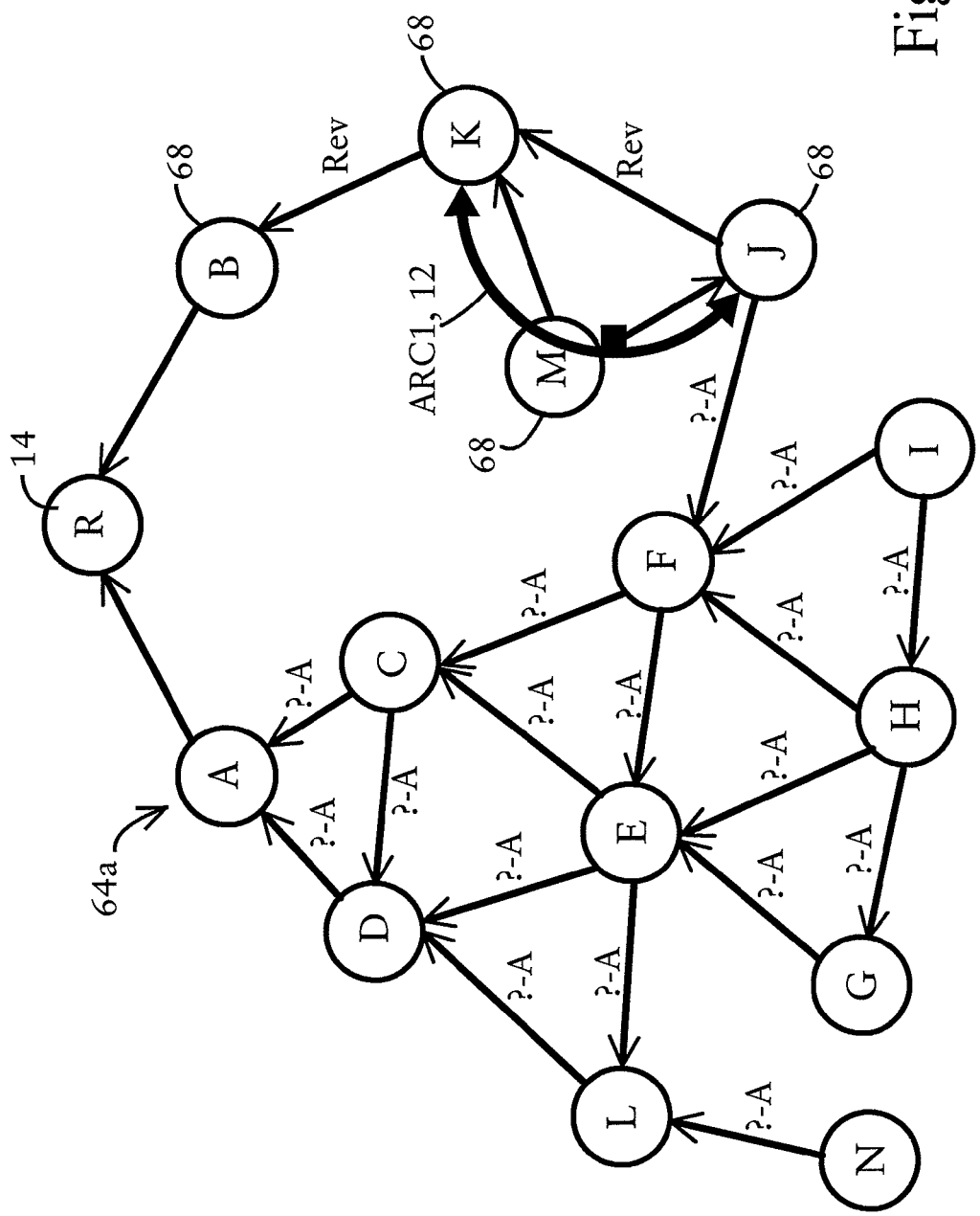
Figure 6E:
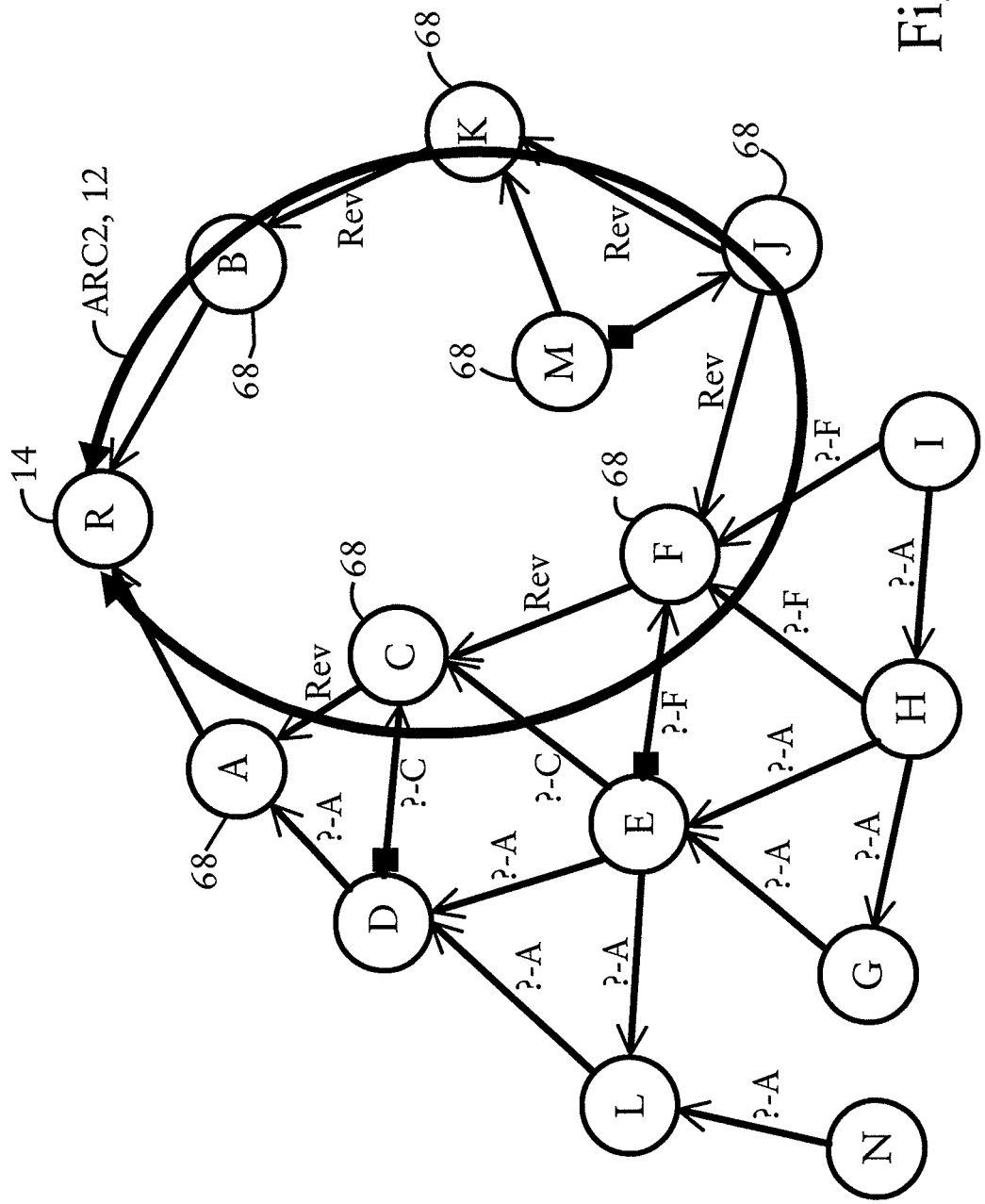
Figure 6F:
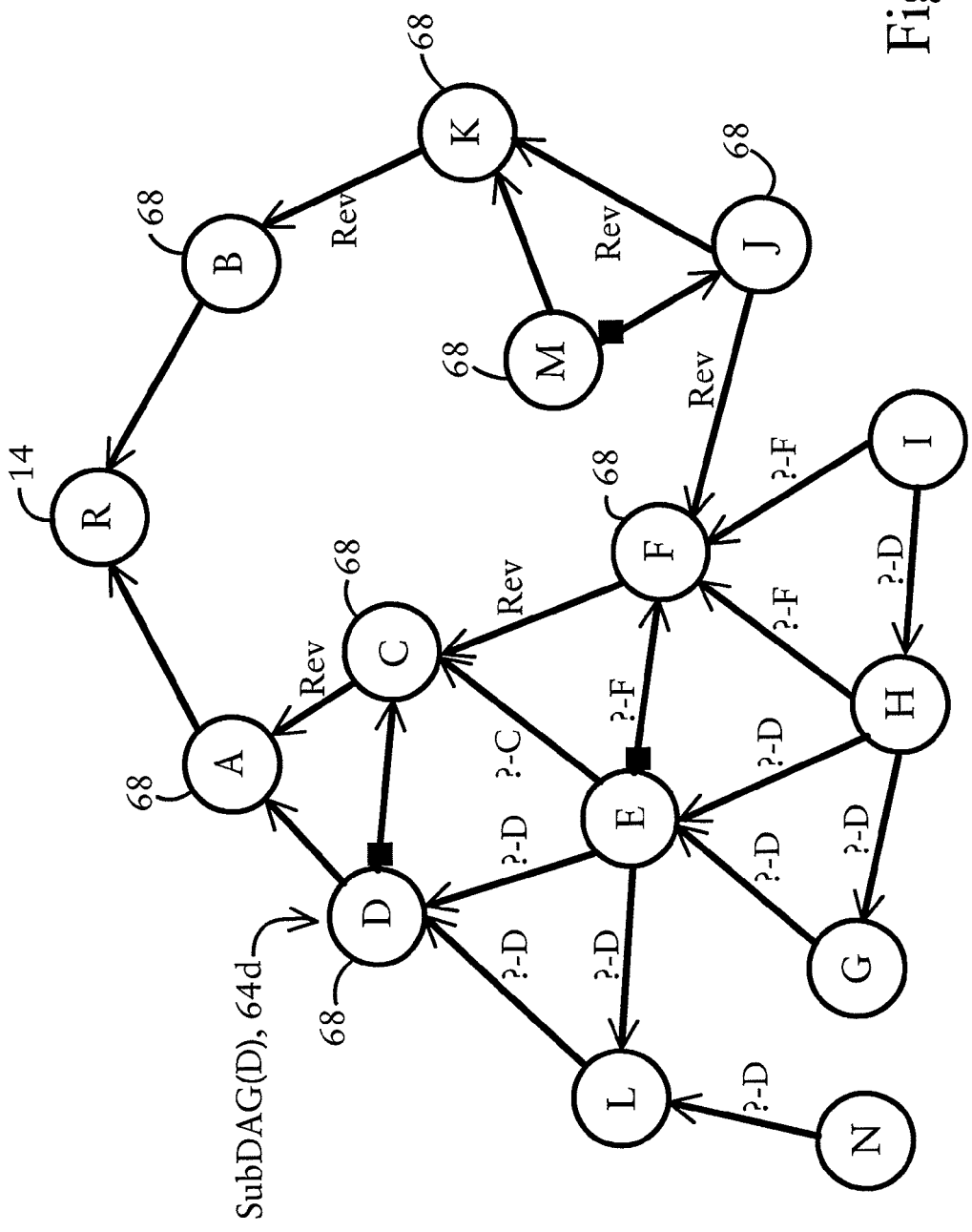
Figure 6G:
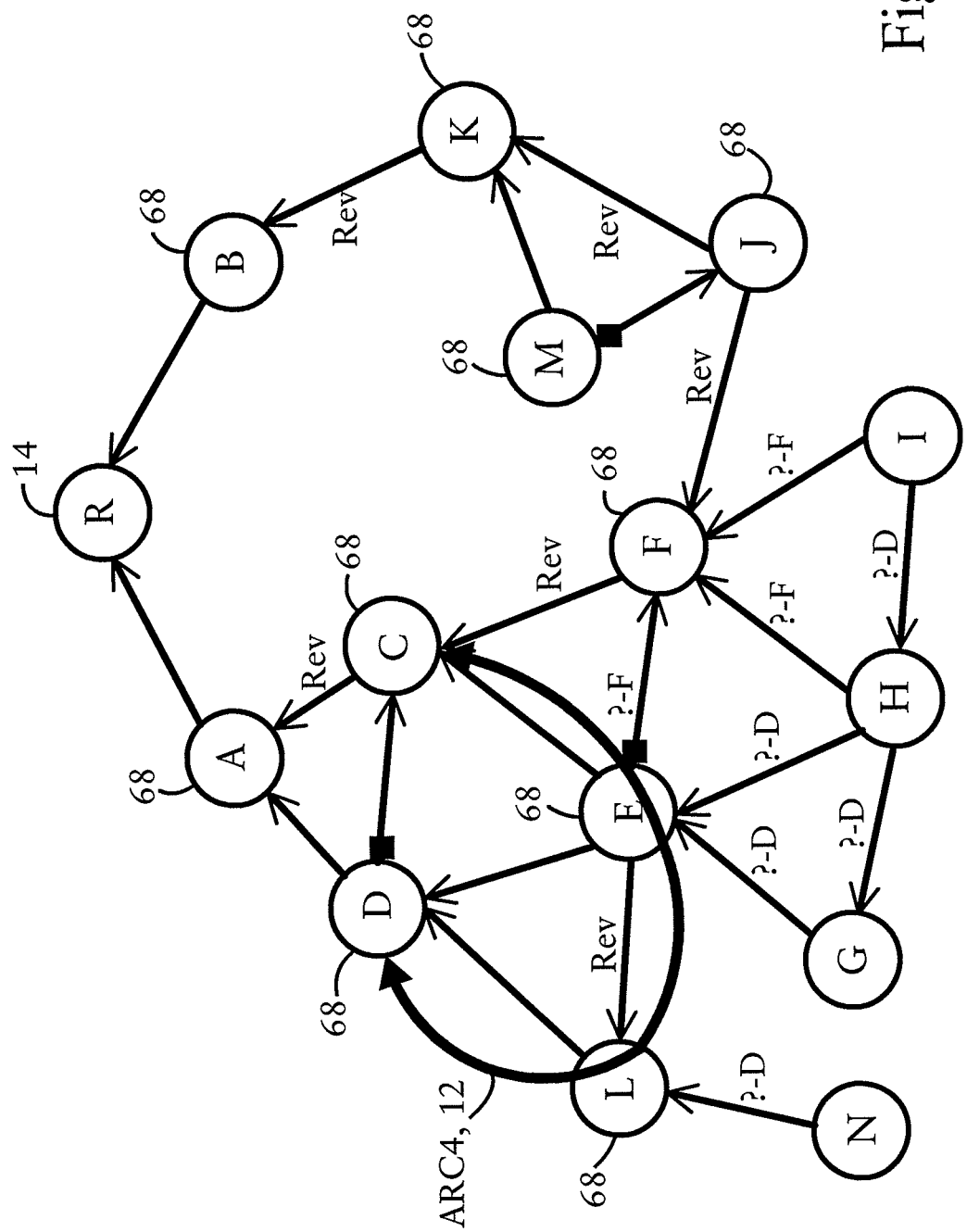
Figure 6H:
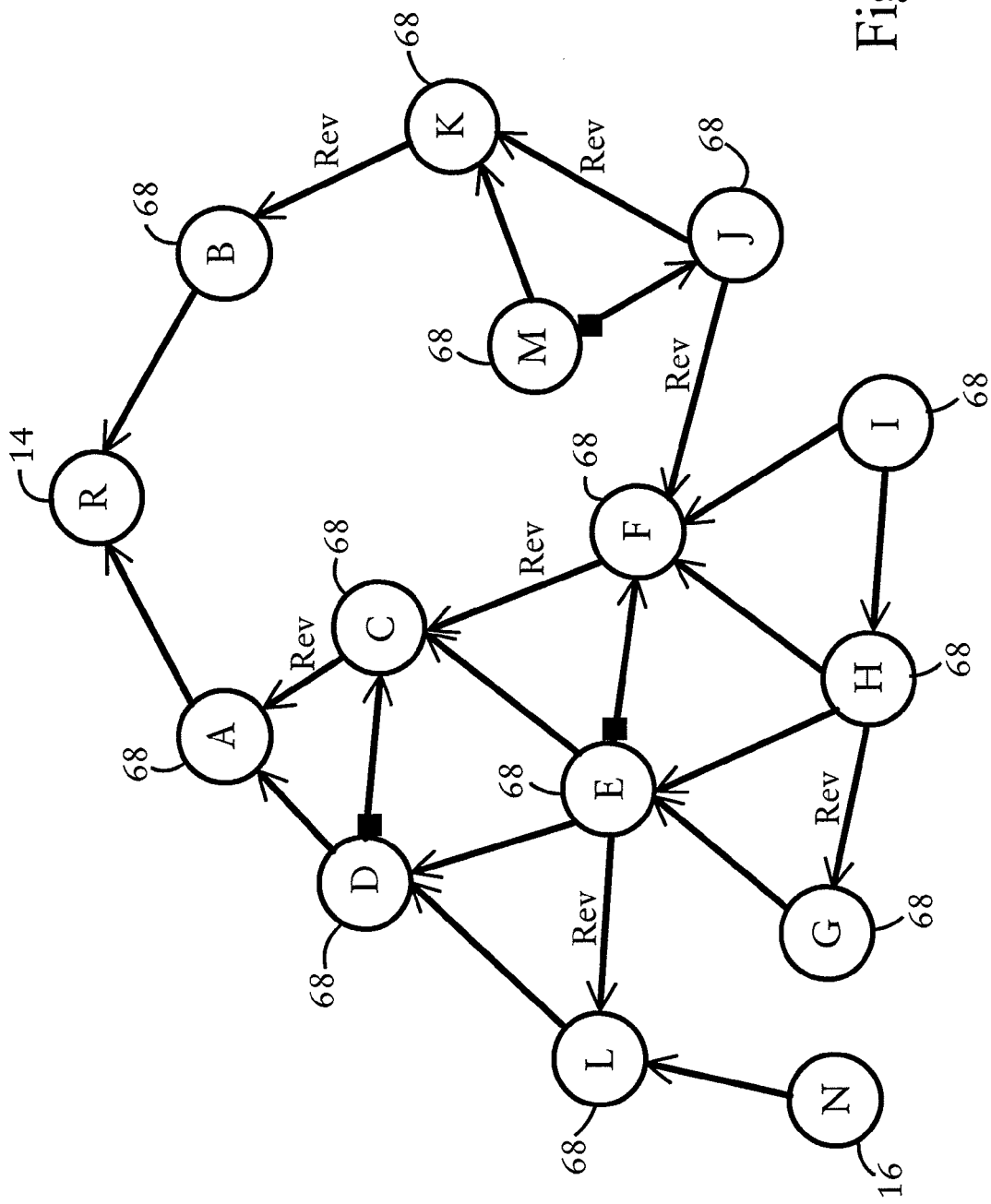
Figure 6I:
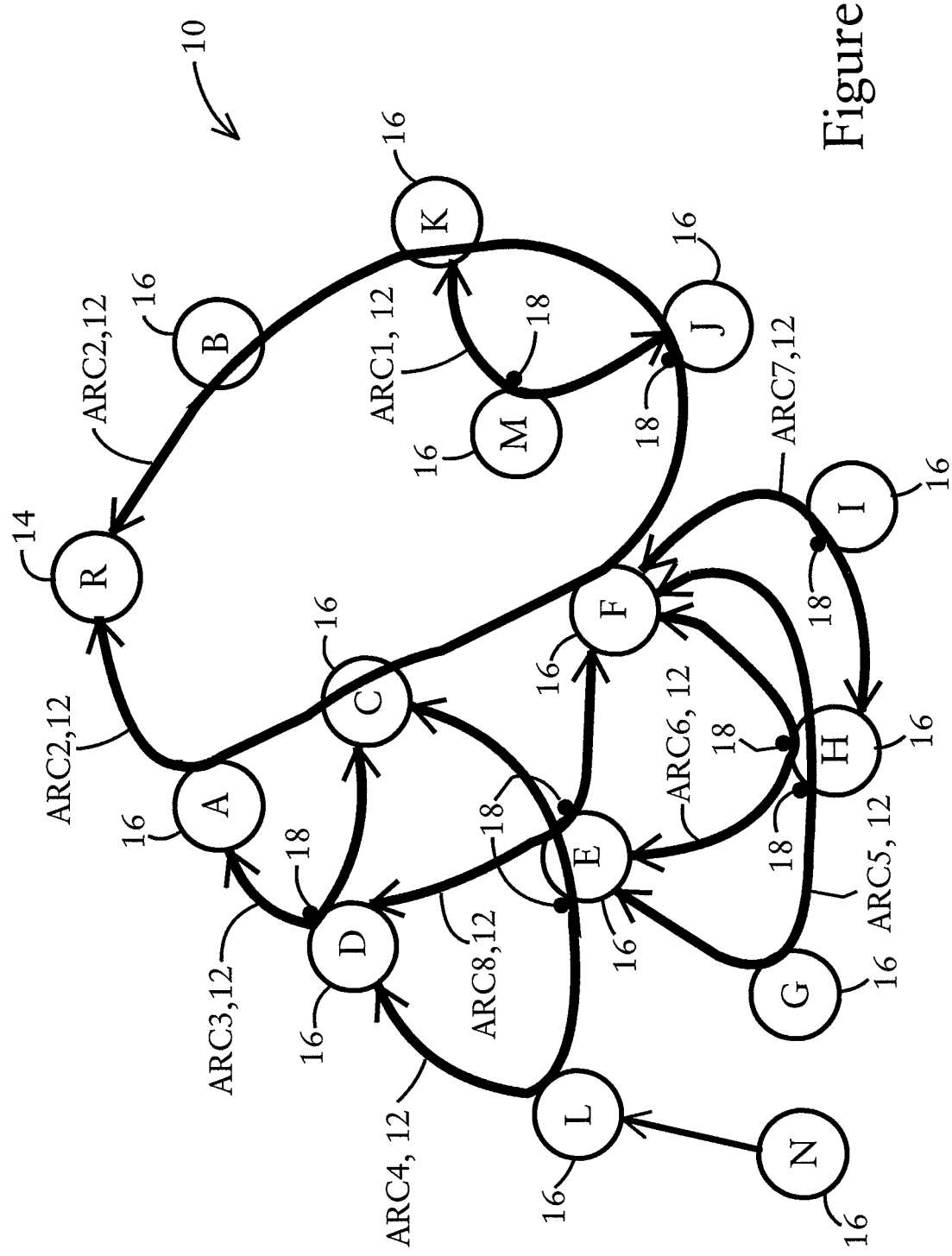

As illustrated in FIG. 6I, the first and second ends of each routing arc 12 each terminate at a "safe network node", for example either the destination network node 14, another network node directly coupled to the destination network node (e.g., network node "A" or network node "B"), or a junction node of another routing arc. A network node (e.g., "A" of FIG. 6I) directly coupled to the destination network node "R" 14 is referred to as an "heir network node". Hence, a "safe network node" can be any one of the destination network node 14, an heir network node (e.g., "A" or "B" of FIG. 6I), or a junction node having two non-congruent paths for reaching the destination network node. For example, both ends of the routing arc "ARC2" 12 terminate at the destination network node "R" 14, also referred to as the "root network node" or "root node"; a first end of the routing arc "ARC3" 12 terminates at the heir network node "A" 16, and a second end of the routing arc "ARC3" 12 terminates at the junction node "C" of the routing arc "ARC2" 12. The routing arc "ARC2" 12 also can be referred to as the "root arc", since both ends of the routing arc "ARC2" 12 terminate at the destination network node "R" 14

In an example embodiment illustrated in FIG. 5 and FIG. 6I, each routing arc comprises one and only one arc cursor (18 of FIG. 6I) that provides exclusive control of directing the network traffic along the routing arc. One and only one junction node of the routing arc (i.e., one and only one network node assigned a position within the routing arc as a junction node) has possession of the arc cursor 18 at any given time: the junction node having possession of the arc cursor 18 can control the network traffic along the corresponding routing arc 12 based on possession of the arc cursor 18. In particular, the junction node (e.g., "J" of FIG. 6I) having possession of the arc cursor 18 can direct network traffic away from itself along either of its outwardly-oriented links toward the ends of the routing arc (e.g., "ARC2") 12. Hence, a junction node having possession of the arc cursor 18 (also referred to as an "arc cursor node") has exclusive control over routing the network traffic along the corresponding routing arc, based on the junction node routing the network traffic away from itself along one of its outwardly-oriented links.

A second junction node (i.e., another network node a position within the routing arc as a junction node) can gain possession of the arc cursor (e.g., from the first junction node of the routing arc) based on a detected failure in the corresponding routing arc, for continued routing of the network traffic in the corresponding routing arc despite the detected failure. For example, the junction node "F" of the routing arc "ARC2" 12 can gain possession of the corresponding arc cursor 18 that was previously owned by the junction node "J", based on a detected failure in the link "F-C" between network nodes "F" and network node "C", enabling the network node "F" to reverse the link "F-J" toward the node "J" for continued reachability toward the destination network node "R" 14 (see FIGS. 6H and 6I). Hence, the second junction node (e.g., "F" of FIGS. 6H and 6I), upon gaining possession of the arc cursor 18 that provides exclusive control of directing the network traffic along the routing arc (e.g., "ARC2") 12, can reverse one of the connected reversible links without creating a loop in the loop-free routing topology 10. Hence, data traffic along a routing arc (e.g., "ARC2") 12 can be instantaneously rerouted for continued routing in the routing arc 12 toward the destination network node 14 in response to a detected failure in the routing arc (e.g., failure in link "F-C"), based on a junction node (e.g., "F") in the routing arc gaining possession of the routing arc 18 previously owned by another junction node (e.g., "J") in the same routing arc 12.

Figure 2:
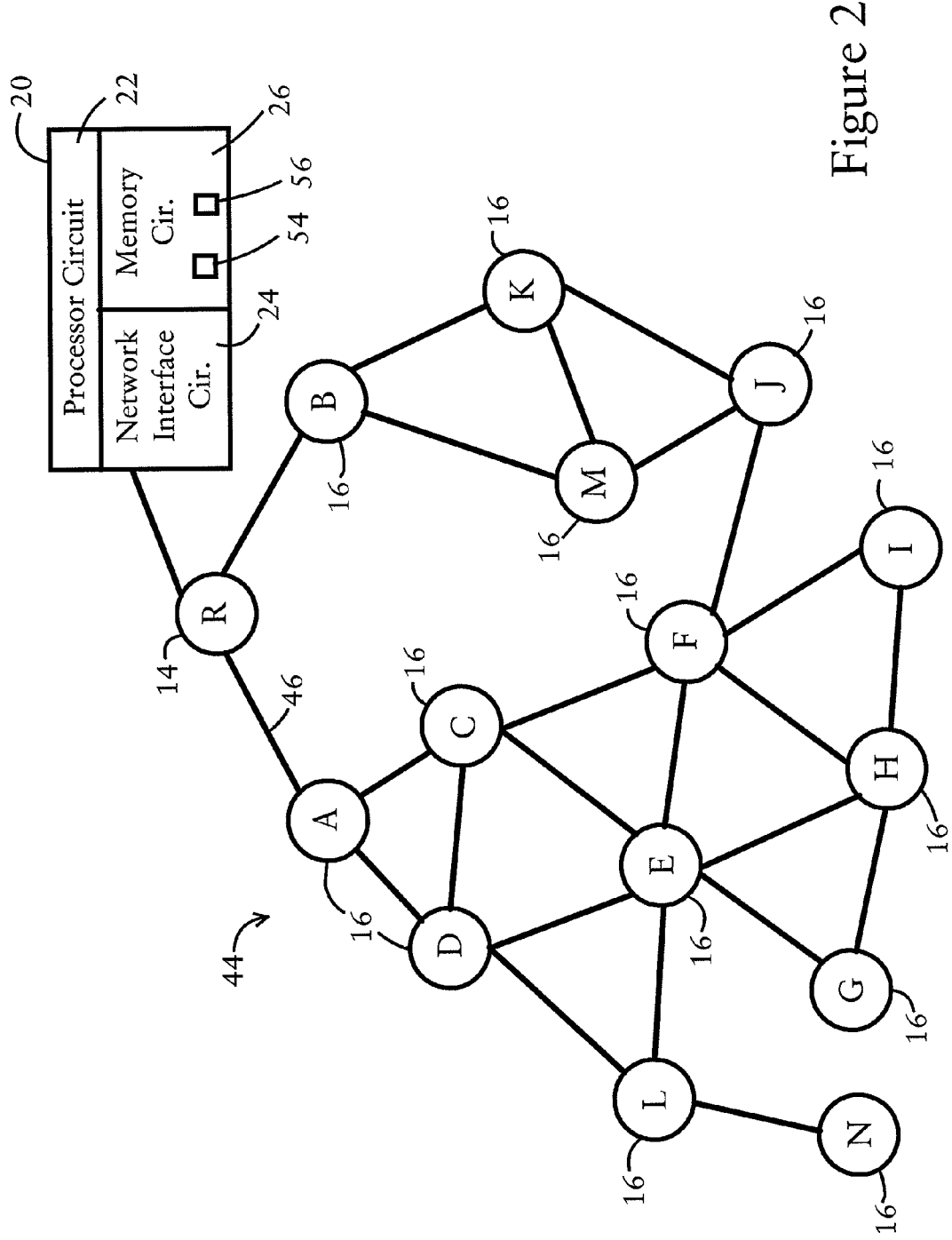
FIG. 2 illustrates an example apparatus for creating a loop-free routing topology in a link layer network of network nodes coupled by data links, according to an example embodiment.

FIGS. 2 and 6A illustrate an example apparatus 20 for creating the loop-free routing topology 10 of FIGS. 1, 6I, and 16-25, according to an example embodiment. The apparatus (i.e., device, machine) can be implemented as a router, a centralized server, a network management entity, etc. that executes the disclosed operations for creating the loop-free routing topology 10, and distributing relevant routing arc parameters to each of the network nodes implementing the loop-free routing topology 10 as network nodes 16 within the topology 10. The apparatus 20 is a physical machine (i.e., a hardware device) configured for implementing network communications with other physical machines 14, 16 via data links establishing a link layer mesh topology network 44 (see FIG. 2).

As illustrated in FIG. 2, the apparatus 20 includes a processor circuit 22, a device interface circuit 24, and a memory circuit 26. The processor circuit 22 is configured for creating, for a computing network, the loop-free routing topology 10 comprising the routing arcs 12 for reaching the destination network node 14. The memory circuit 26 is configured for storing parameters associated with the routing arcs 12 in a state table 54 and/or a topology table 56, described in further detail below with respect to FIGS. 4 and 5. The device interface circuit 24 is configured for outputting at least selected parameters associated with the routing arcs 12 to a second apparatus, for deployment of the loop-free routing topology 10: the second apparatus can be a network management entity for configuring the network nodes 16, or at least one of the network nodes 16 that can be configured directly by the apparatus 20. Hence, the output by the device interface circuit 24 of the selected parameters for deployment of the loop-free routing topology 10 causing the network traffic in the computing network to be forwarded along at least one of the routing arcs to the destination network node.

Any of the disclosed circuits of the apparatus 20 (including the processor circuit 22, the device interface circuit 24, the memory circuit 26, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 26) causes the integrated circuit(s) implementing the processor circuit 22 to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 26 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a tangible memory medium in the disclosed apparatus (e.g., in a receive buffer). Also note that the memory circuit 23 can be implemented dynamically by the processor circuit 22, for example based on memory address assignment and partitioning executed by the processor circuit 22.

The following definitions are provided prior to a description of the methods for creating the routing arcs.

A routing arc is defined as a double ended reversible path. A reversible arc is defined as a routing arc containing one or more reversible links, and the reversible arc can contain one or more non-reversible links at each end of the arc. Data links that are labeled "Rev" in FIGS. 6B through 6H are reversible links, and links that are not labeled "Rev" in FIGS. 6B through 6H are not reversible; hence, the end of a routing arc can be identified based on one or more successive non-reversible links, with one or more reversible links internal to the non-reversible links. A collapsed arc (e.g., "ARC1", "ARC3", "ARC6", "ARC7", and "ARC8" of FIG. 6I) is defined as a routing arc 12 having no reversible link and consisting of a one network node that has fixed (i.e., non-transferable) possession of the arc cursor 18, and two other network nodes 16 nodes serving as respective ends of the collapsed arc. For example, the collapsed arc "ARC1" 12 is illustrated in FIG. 5 and FIG. 6I as consisting of the network nodes "J", "M", and "K", where the network node "M" has fixed possession of the arc cursor 18 between the network nodes "J" and "K" at the respective ends of the collapsed arc "ARC1" 12.

A link designated with an arrow at one end and having a designation of "SPF" represents a link as found in a tree generated according to a conventional routing protocol such as Open Shortest Path First (OSPF), such that the network node at the end of the arrow represents a shortest path first (SPF) successor of the network node at the tail end of the arrow (e.g., network node "A" in FIG. 6A is the SPF successor to network nodes "C" and "D"). Any link at the edge of the arc (i.e., that terminates the arc and connects the arc either to a second arc or to the destination) will be designated using the arrow at one end. A link designated with "TOP" (representing "then other path") represents a link that has not been chosen by OSPF because it is not the shortest path successor, but that can be used as an alternate next hop (i.e., a feasible successor), for example for generating a directed acyclic graph (DAG) (see, e.g., U.S. Pat. No. 7,656,857).

As described previously, the network node having possession of the arc cursor can decide in which direction along the arc network traffic should be forwarded. Hence, a network node is determined to be a "safe network node" if the "safe network node" can forward network traffic in either direction along the arc (i.e., the "safe network node" can safely forward any packet in one direction along the arc even if the other direction fails).

A link designated with the reference "?-S" represents a candidate link that is unresolved for a junction node "S" that is identified as the nearest safe network node for the network node via the link having the designation "?-S": reference to a candidate link denotes a transient state when the two ends of a routing arc have not yet been established, and it is not yet established whether the candidate link is to be used in the formation of a routing arc. As described in further detail below with respect to FIGS. 6B-6F, the links designated with the reference "?-S" also identify a subDAG (i.e., a DAG within a DAG) for reaching the safe node "S".

A link designated with the reference "Rev" indicates a reversible link connecting two network nodes that are within a routing arc 12: as illustrated in FIGS. 6H and 6I, a network node (e.g., "J") having at least one reversible link is within the middle of the arc, and can have possession of the arc cursor 18 for the corresponding routing arc. As illustrated in FIGS. 6H and 6I, data links at the edge of a routing arc (e.g., that terminates at a first arc and enters into a second arc, or that terminates at the destination node D) are directed away from the middle of the routing arc (and the junction node having possession of the corresponding arc cursor 18) 12, and the data links at the edge of a routing arc 12 are not reversible.

A link designated with a square-shaped or diamond-shaped block at one end (e.g., "M□→J" in FIG. 6C) indicates a blocked link that is not reversible, where the destination network node (e.g., network node "J" in FIG. 6C) cannot send any data traffic to the other sourcing network node (e.g., "M" of FIG. 6C), but the sourcing network node (e.g., "M" of FIG. 6C) can send data traffic to the destination network node ("J") via the link ("M□→J"). Blocked links are used during computation to prevent any formation of loops.

As described in further detail below, data links are oriented away from the junction node having possession of the arc cursor toward the edges of the routing arc 12, and link orientation of a reversible link can be changed by moving the arc cursor 18 (i.e., passing ownership of the cursor from one network node to another network node).

Routing arcs 12 are built between network nodes identified as junction nodes. A junction node 68 is a network node connected to two or more safe network nodes (described below) over non-congruent paths (i.e., no single point of failure can stop reachability from the junction node to the root node). An edge junction is defined as a junction node 68 terminating one and only one reversible link, where the edge junction can have multiple nonreversible links oriented both inwards and/or outwards. An intermediate junction is defined as a junction node 68 that terminates two and only two reversible links, where all other links coupled to the intermediate junction are oriented inwards to avoid loops: a link can be safely reversed towards an intermediate junction. Hence, an intermediate junction consists of two reversible links and zero or more inward oriented links from any other network node. A collapsed arc does not have any intermediate junction, and an edge junction can belong to one or more collapsed arcs.

A root network node 14 is defined as a single network node in a network (i.e., a "destination network node") that must be accessed to reach a resource, i.e., there never can be a second path that can bypass the root network node to reach the resource. Calculation of routing arcs 12 begins with identification of a root node (i.e., the destination node) 14 for a given routing topology 10. Examples of a root node 14 can include a head end of an autonomous directed acyclic graph within the routing arcs 12, a gateway to another network, or any identifiable destination. All of the root links always are oriented inwards toward the root node 14 and resolved.

An "heir" network node is a network node that is directly connected to a root network node 14. As illustrated in FIGS. 1 and 6A-6I, a destination network node serving as a root network node 14 must have at least two heir network nodes (e.g. network nodes "A" and "B" of FIGS. 6A-6I) that are directly connected to a root network node 14: if a root network node has only one heir node, then the heir network node is designated as the new root node (based on the definition of a root network node as having no second path to reach a resource). The heir network node is used to identify a safe network node: if a network node can reach the root node alternatively via either a first heir network node or a second heir network node, then the network node is considered a safe network node because it can route a packet to the root via two non-congruent paths, namely either via the first heir network node or via the second heir network node, guaranteeing that reachability if one of the links toward the root node is broken.

A leaf network node is a node that has one and only one data link: a leaf node cannot be a junction node and cannot belong to a routing arc 12. The data link coupled to the leaf network node is always oriented outwards (i.e., away from the leaf network node) and resolved.

A safe network node is a designation used to identify any one of a root network node 14, an heir node (e.g., "A" or "B" of FIGS. 6A-6I), or a junction node. Hence, a junction node is a network node that is neither a root network node 14 nor an heir network node, but that is a safe network node because it has two or more non-congruent paths to the root network node such that no single point of failure can cut off the junction node from the root network node. A network node can be identified as a junction node if the direction of a reversible link must be turned to obtain the alternate path.

Hence, a network node connected to an heir network node and the root network node is a junction node; a network node connected to two different heir network nodes is a junction node; a network node connected to an heir network node and a junction node also is a junction node; a network node connected to two different junction nodes also is a junction node. Since the root network node, the heir network node, and the junction node each are defined as safe network nodes, then a network node connected to two different safe network nodes is a junction node; a network node that has non-congruent paths to at least two different safe network nodes is a junction node (the junction node can be considered to "see" to safe network nodes, and then hide them so long as they are only reachable from via that junction node); a network node that can only see one junction node is within the "subDAG" that junction node and can be tracked as such.

Hence, a data packet must follow along a routing arc 12, and can exit a routing arc 12 only via an edge junction at one of the ends of the routing arc 12. Consequently, a data packet can reach the root node (i.e., the destination node) 14 based on traveling along one or more routing arcs 12.

Figure 3A:
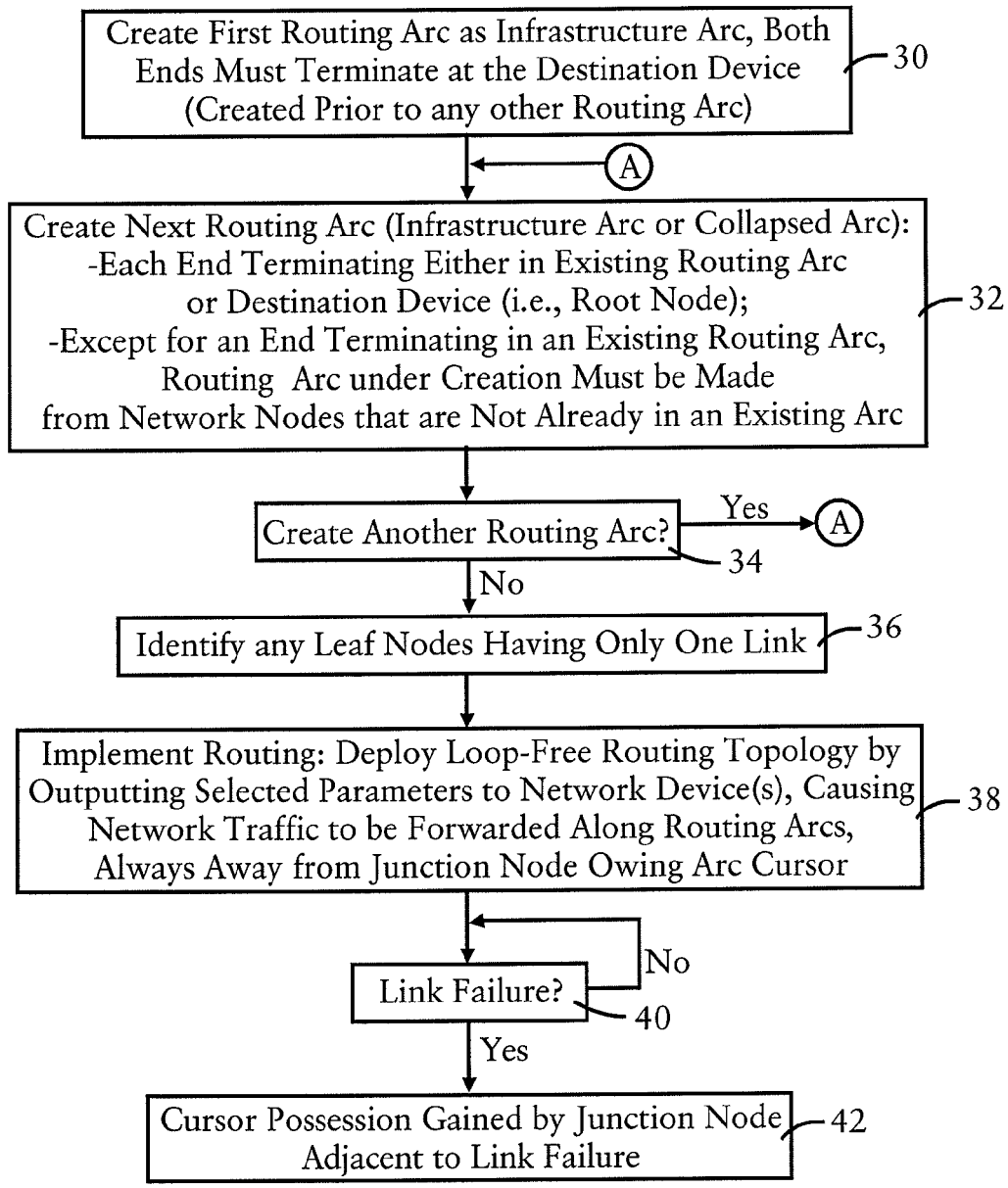
Figure 3B:
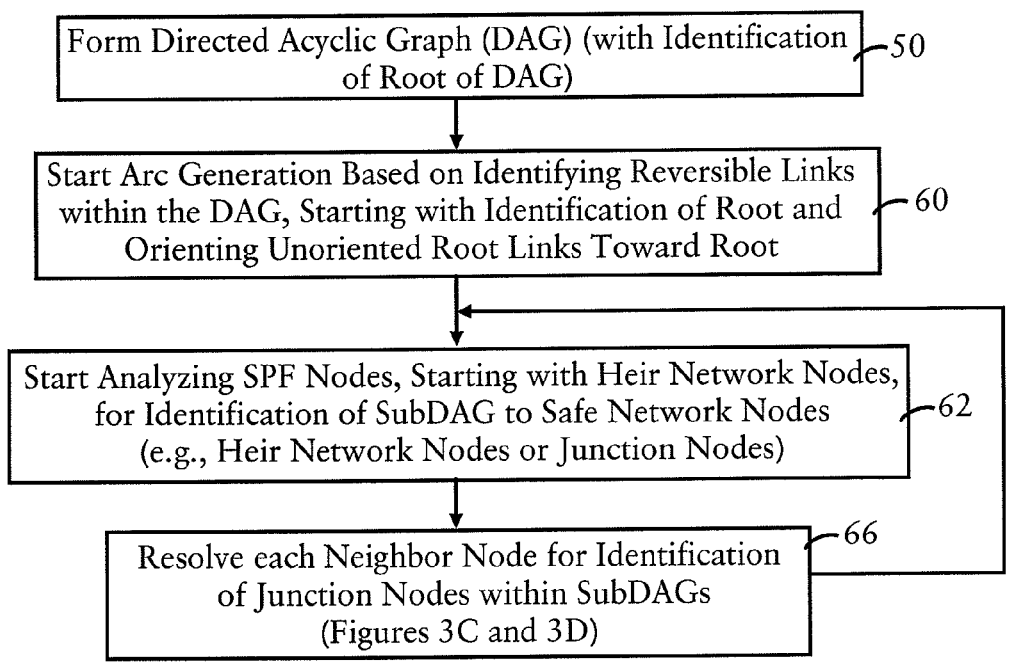
Figure 3C:
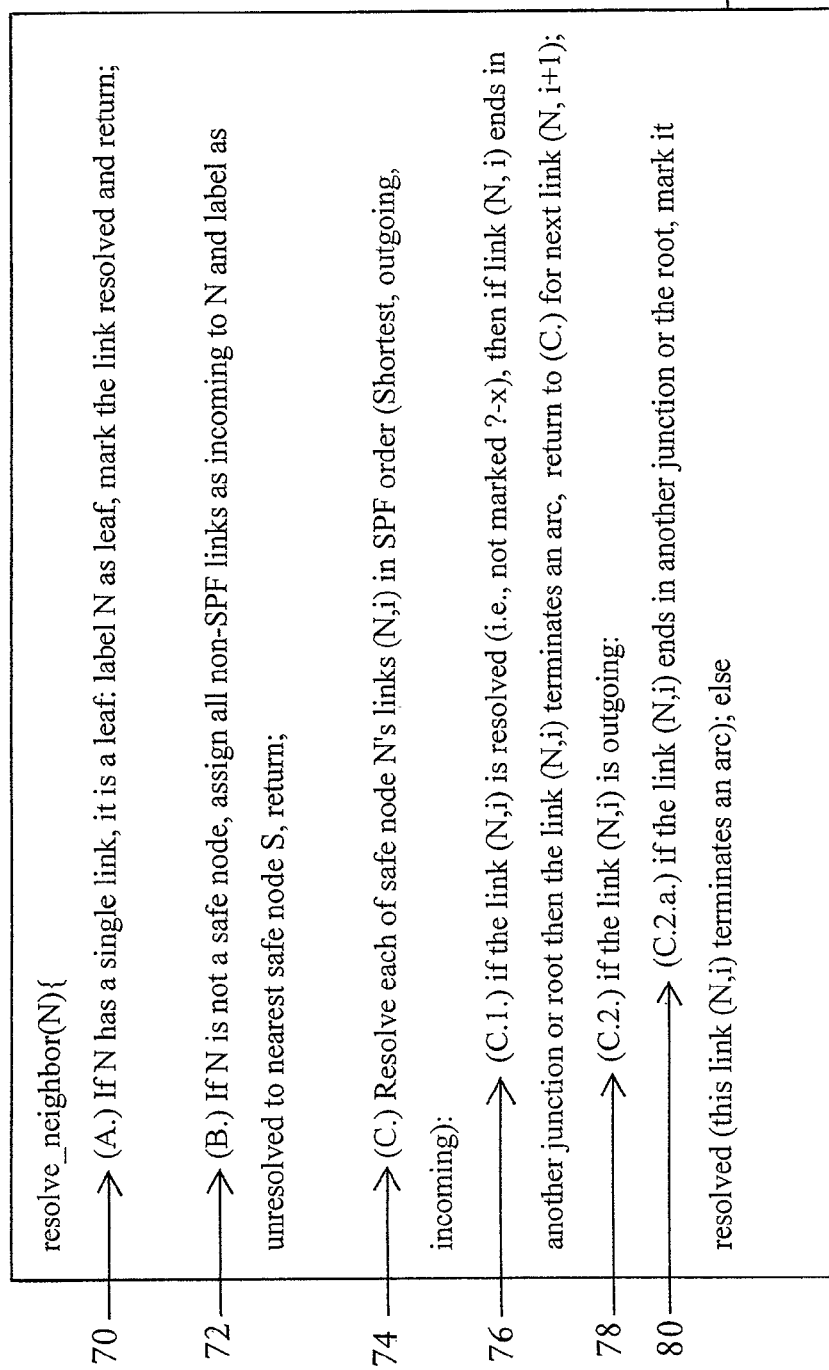

FIG. 3A is a diagram illustrating an example method by the apparatus 20 of FIG. 2 that includes creating a loop-free routing topology 10 comprising routing arcs 12 for reaching a destination network node 14, according to an example embodiment. FIGS. 3B, 3C and 3D illustrate an alternate method by the apparatus 20 for creating the loop-free routing topology 10, according to another example embodiment. The operations described with respect to any of the Figures (e.g., FIGS. 3A-3D, FIGS. 8-11, 13, and 17-18, described below) can be implemented as executable code stored on a computer or machine readable non-transitory tangible storage medium (e.g., floppy disk, hard disk, ROM, EPROM, EEPROM, non-volatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.) by a machine or device.

Referring to FIG. 3A, the processor circuit 22 can create the loop-free routing topology 10 based on creating in operation 30 the first routing arc 12 as an infrastructure arc (i.e., a routing arc that is not a collapsed arc): the first routing arc 12 (e.g., 12a or 12b of FIG. 1) created in operation 30 must have both ends terminating at the destination network node (i.e., the root node) 14. The processor circuit 22 can create in operation 32 the next routing arc 12 (after the first routing arc 12a or 12b created in operation 30) as an infrastructure arc (e.g., 12c after 12b) or a collapsed arc (e.g., 12d after 12a), subject to the following rules: (1) the next routing arc 12 under construction must terminate either in the junction node of an existing routing arc or at the destination network node 14 (e.g., routing arc 12c terminates one end at the routing arc 12b and terminates the other end at the destination network node 14); and (2) except for an end of a routing arc terminating in the junction node of an existing routing arc, the routing arc under creation must be made from network nodes that are not already in an existing routing arc; in other words, in rule (2) the next routing arc 12 includes network nodes that are distinct from any of the network nodes of the existing routing arcs. The next routing arc 12 can be constructed by the processor circuit 22 in operation 34, until all the routing arcs have been completed for all network nodes having at least two data links. The processor circuit 22 identifies in operation 36 any leaf network nodes consisting of only one data link, and implements in operation 38 the loop-free routing topology 10 constructed in operations 30, 32, 34, and 36.

As illustrated operations 30, 32, and 34, the first routing arc 12 (e.g., 12a or 12b) preferably is created prior to any other routing arc 12 (e.g., 12c or 12d); however, the routing arcs 12 in FIG. 1 can be created in any arbitrary order, so long as the rules of operation 32 are followed to guarantee no loop formation, where the "existing routing arc" refers to a set of network nodes that already are allocated for another routing arc. Hence, alternative techniques for creating the loop-free routing topology 10 can be utilized, so long as: the routing arcs 12 do not intersect across each other during formation; or any routing arcs 12 that intersect across each other share the same cursor at the intersection point (e.g., a collapsed arc), causing all network traffic to be directed away from the cursor point.

The processor circuit 22 can deploy in operation 38 the loop-free routing topology 10 based on causing the device interface circuit 24 to output at least selected parameters associated with the routing arcs 12 to at least one other apparatus (e.g., a network router, a network management apparatus, one or more network nodes, etc.), causing the network traffic in the routing topology 10 to be forwarded along at least one of the routing arcs 12 to the destination network node 14. If in operation 40 a link failure is detected (or a network node failure) in one of the routing arcs, for example by either the apparatus 20 or by one of the network nodes 14 or 16, the possession of the arc cursor 18 can be gained (e.g., by transfer, reassignment, etc. by the processor circuit 22) by the junction node adjacent to the link failure in operation 42, enabling the junction node to control the network traffic based on reversing one of the reversible links for continued routing toward the destination network node 14 without creating a loop in the loop-free routing topology 10.

FIGS. 3B, 3C and 3D illustrate an example method by the processor circuit 22 for creating the loop-free routing topology 10 comprising the routing arcs 12 of FIG. 6I, according to an example embodiment.

According to an example embodiment, a loop-free routing topology 10 can be created in which an attempt is made to establish every network node, except the root network node and the heir network nodes, as junction nodes, in order to guarantee that every network node has a shortest path and an alternate path to a destination network node (i.e., the root network node) 14. This guarantee is established by creating routing arcs 12 that terminate at safe network nodes. Since conventional techniques for generating a directed acyclic graph (DAG) does not guarantee that every node within a directed acyclic graph can be a junction, the example embodiments enable a link to be reversed in response to a detected failure in a network node or network link, enabling immediate rerouting of data traffic without route recalculation and without the formation of any loop in the topology. Hence, the example embodiment can establish a loop-free routing topology of routing arcs for reaching a root network node, the loop-free routing topology consisting of a root network node, two or more heir network nodes coupled to the root network node, junction nodes, and zero or more leaf network nodes.

As described in further detail with respect to FIGS. 3B, 3C, 4-5 and 6A-6I, the loop-free routing topology 10 is created based on: generating a first directed acyclic graph for reaching the destination network node 14; identifying (within the first directed acyclic graph) junction nodes that have non-congruent paths for reaching the destination network node 14; identifying reversible links between the junction nodes, along the non-congruent paths, and that do not introduce or create a loop in the loop-free routing topology 10; and identifying at least one second directed acyclic graph within the first directed acyclic graph (also referred to as a "subDAG") for reaching one of the junction nodes, the second directed acyclic graph including an identified new junction node having a new non-congruent path for reaching the destination network node.

In this disclosure, links can be identified by the connecting network nodes, such that the link "A-R" refers to a wired or wireless link that connects the network node "A" to the next hop network node "R": an arrow in a link designation can refer to an assigned direction (e.g., "A→R" and "R←A" equivalently identify a link directing traffic from node A to node R), whereas the absence of an arrow in a link designation (e.g., "A-R") indicates that a direction has not yet been assigned to the link.

Referring to FIGS. 2 and 3B, the processor circuit 22 identifies the data link layer topology 44 (FIG. 2) composed of wired or wireless data links (e.g., wired or wireless IEEE 802.11, Bluetooth, etc.) 46, and creates in operation 50 a directed acyclic graph (DAG) 52 for reaching the destination network node 14, illustrated in FIG. 6A. In particular, the link layer topology 44 of FIG. 2 includes network nodes 14 having one or more link layer connections (e.g., wired or wireless IEEE 802 links, Bluetooth links, etc.) interconnecting the network nodes, for example in the form of a link layer (i.e., OSI Layer 2) mesh of interconnected network nodes. The directed acyclic graph 52 is generated in operation 50 by the processor circuit 22, for example according to the techniques described in U.S. Pat. No. 7,656,857, where the links labeled "SPF" identify the Shortest Path First (SPF) links in the SPF topology, and the links labeled "TOP" identify the "then other path" (TOP) links overlying the SPF topology that result in the formation of the directed acyclic graph (DAG) toward the root node "R". In summary, the directed acyclic graph is formed by the processor circuit 22 in operation 50 based on identifying next hop nodes adjacent to the root node 14, and orienting the link of each next hop node toward the root. Secondary adjacent nodes (adjacent to each of the next hop nodes) are then identified, and the paths from the next hop nodes to the associated secondary adjacent nodes are extended while orienting each of the links between the secondary adjacent nodes and the next hop nodes toward the next hop nodes. These operations are repeated recursively until the paths extend to the furthest nodes in the network, and orienting the links back toward the root, for formation of the directed acyclic graph.

The SPF status of the SPF links are retained in the memory circuit 26 during calculation of the routing arcs 12 with respect to FIGS. 6A-6I. FIG. 4 (consisting of FIGS. 4A, 4B, 4C and 4D) illustrate an example state table 54 that can be stored in the memory circuit 26 and configured for storing state changes in the network nodes and the data links during execution of the method in FIGS. 3B, 3C and 3D.

FIG. 5 illustrates an example topology table 56 that can be stored in the memory circuit 26 and configured for storing arc topology attributes as the routing arcs are constructed for reaching the destination network node (i.e., root network node "R") 14. The processor circuit 22 can update the topology table 56 of FIG. 5 as the state table 54 is updated (e.g., upon identification of SPF links, identification of reversible links, identification of junction nodes 68, upon creating a routing arc, etc.), where the ownership of an arc cursor 18 is identified by the junction node 68 having the two outwardly oriented reversible links. Hence, the processor circuit 20 stores in operation 50 the SPF links 58 in the topology table 56, and the non-SPF links (not shown in FIG. 5).

As illustrated in FIG. 6A, none of the network nodes in the DAG topology 52 (except the network node "J") has at least two non-congruent paths for reaching the root node "R". Hence, the method of FIGS. 3B, 3C and 3D provides the creation of the routing arcs 12 in a loop-free routing topology 10, the routing arcs enabling network traffic to be routed along the routing arcs toward the destination root network node via any one of the ends of the routing arcs.

After formation of the directed acyclic graph in operation 50, the generation of the routing arcs begins in operation 60 of FIG. 3B, where the SPF links are retained, while selectively modifying non-SPF links in the directed acyclic graph as either unidirectional links or reversible links. The status of each network node and each data link can be stored in a memory circuit.

The generation of the routing arcs in operation 60 begins with identification of the root network node R and orienting unoriented links toward the root (A→R, B→R) as illustrated by the state change in the state table of FIG. 4A at event 200, and initiating identification of the heir network nodes (e.g., node A) in operation 62. As described in further detail below, the SPF nodes are successively analyzed by the processor circuit 22 in operation 62 for identification of subordinate directed acyclic graphs (subDAGs) 64 (e.g., 64a and 64b of FIG. 6B) within the DAG 52 toward the destination network node 14. Each heir network node link (e.g., A-R) that is coupled to the root network node 14 is oriented outward toward the root network node and marked in the state table 54 as resolved (A→R=Resolved) (event 202 of FIG. 4A). Each neighbor network node is successively resolved in operation 66 to identify any junction node within a subDAG 64 that has an alternate non-congruent path for reaching the destination network node 14 via a path that is distinct from the subDAG 64; in other words, each neighbor network node 16 is successively resolved to identify, within a subDAG 64, any junction nodes having at least two non-congruent paths for reaching the destination network node.

FIGS. 3C and 3D illustrate in further detail the operations executed by the processor circuit 22 in operation 66. The operations of FIGS. 3C and 3D are illustrated in the example form of "C code" for a function call entitled "resolve_neighbor(N)", annotated with outline annotations to identify nested operations. The apparatus 20 is omitted in FIGS. 6B through 6I and FIG. 7 to simplify the illustrations, although it will be apparent that the apparatus 20 will be consistently present during calculation of the routing arcs 12 and creation of the loop-free routing topology 10 (and load balancing of the loop-free routing topology 10 as described below with respect to FIGS. 7-9).

The first operation in operation 70 is executed by the processor circuit 22 if the neighbor node "N" under analysis is a leaf network node consisting of one and only one data link. In this example, the current state of execution is state 202 of FIG. 4A, where the heir network node "A" is under analysis; hence, operation 70 is skipped because the heir network node A is not a leaf node. Operation 72 is executed by the processor circuit 22 if the neighbor node "N" under analysis is not a safe node. In this current state of analyzing the heir network node "A", operation 72 is skipped because the heir network node A is a safe network node (because it is an heir network node).

As described previously, the method executed by the processor circuit 22 attempts to identify adjacent network nodes that are safe network nodes. Hence, any of the links (N-i) in the safe network node under analysis (e.g., Node N=Node A) that have not yet been labeled (i.e., are unlabeled) (e.g., D→A, C→A), are set initially to an unresolved status toward the nearest safe node (D→A="?-S"; C→A="?-S") to indicate that it has not yet been determined whether the links (e.g., D→A, C→A) couple the network node (e.g., node A) to another safe network node that enables the link to be reversible, or whether the links couple the network node to an unsafe network node (i.e., a network node that is not a safe network node as previously defined).

Each of the links (N-i) of the safe network node under analysis (e.g., node N=node A) are resolved in operation 74 in order according to SPF identification, namely links providing shortest path first, followed by outgoing links, followed by incoming links. If in operation 76 a data link is already resolved, the execution by the processor circuit 22 proceeds to the next link in operation 74: note that the link A→R is resolved and ends in the root network node 14, identifying the link A→R as terminating a routing arc 12. Operations 78 through 86 are currently skipped by the processor circuit 22 because the safe network node under analysis (e.g., node N=node A) has no other unresolved outgoing links. The processor circuit 22 returns to the next link in operation 74, namely the incoming links.

If in operation 88 the processor circuit 22 determines the unresolved link under analysis (which is not an SPF link or an outgoing link) has no assigned direction, the link is assigned an incoming direction to direct traffic toward the safe network node under analysis (e.g., Node N=Node A). If the incoming link (e.g., D→A based on the initial directed acyclic graph) is marked to an unresolved status (e.g., D→A="?-S"), the incoming link is marked to an unresolved status with respect to the safe network node under analysis (i.e., the link D→A is reset from "?-S" to "?-N"). Hence, the link "D→A" is reset to the status "?-A" (Node N=Node A: D→A="?-A"); the process is repeated in operations 74 and 88 by the processor circuit 22 for the next link of node A, hence the link "C→A" is reset in operation 88 to the status "?-A" (C→A="?-A"), indicating that it has not yet been determined whether the links "D→A" and "C→A" are reversible to reach another safe network node (the links are oriented toward the nearest safe network node). Hence, the unresolved status indicates that a routing arc cannot be formed yet because the unresolved link has not been found to be reversible toward an alternate non-congruent path to the root network node. All the unresolved incoming links in the subDAG toward the safe network node "N" (Node N=Node A) are recursively relabeled in operation 88, resulting in the identification of subDAG(A) 64a of FIG. 6B via the links labeled "?-A".

After all the links for the safe network node under analysis (e.g., Node N=Node A) have been analyzed, the process of operations 62 and 66 of FIG. 3B are repeated by the processor circuit 22 for the next node having the shortest path (in the SPF computation of operation 50) to the root network node "R" that has not yet been analyzed (e.g., heir network node "B") (event 204 of FIG. 4A). The network node "B" is identified by the processor circuit 22 as an heir network node in operation 62, and the root link "B→R" is identified by the processor circuit 22 as an SPF link and oriented toward the root network node, and marked in the state table 54 and the topology table 56 as a resolved SPF link in operation 62. As illustrated by the execution by the processor circuit 22 of operation 66 in FIGS. 3C and 3D, since network node "B" is identified as an heir network node (and therefore a safe network node) having an additional incoming link "K-B", operations 70 and 72 are skipped by the processor circuit 22, and the processor circuit 22 changes the status of the link "K→B" in operation 88 in the state table 54 from "?-S" to "?-B" (K→B="?-B"). The remaining incoming links are recursively resolved toward the nearest safe node "B", resulting in the subDAG(B) 64b of FIG. 6B.

Processing continues by the processor circuit 22 in operation 62 of FIG. 3B to the next node identified by the SPF computation as closest to the root network node "R" that has not yet been analyzed, namely the network node "K" (event 206 of FIG. 4A). Operation 70 of FIG. 3C is skipped because the network node "K" is not a leaf node. Hence, the network node "K" is not a safe network node because it does not yet have two non-congruent paths to the root network node "R", rather the network node "K" currently has only the SPF link "K→B" to the safe network node "B". Hence, all the non-SPF links (e.g., M-K and J-K) assigned by the processor circuit 22 to be oriented incoming to the current network node "K" under analysis, and the links are labeled by the processor circuit 22 in operation 72 as unresolved to the nearest safe network node (e.g., M→K="?-B"; J→K="?-B").

Hence, the current set of analyzed network nodes include the network nodes "A", "R", "B", and "K".

The method continues by the processor circuit 22 in operation 62 of FIGS. 3B and 104 with the next SPF network node, identified as a network node "M" which is not a safe network node (event 208 of FIG. 4A). Operation 70 skipped by the processor circuit 22, the node "M→K" is identified as the SPF link, and in operation 72 the link "J-M" is assigned in the state table 54 in operation 72 as an incoming link having an unresolved status to the nearest safe network node "B" (J→M="?-B").

The next network node chosen by the processor circuit 22 in operation 62 of FIG. 3B from the SPF nodes is the network node "D" (event 210), the link "D→A" is identified as the SPF link, operation 70 is skipped by the processor circuit 22, and since the network node "D" is not a safe network node, the remaining non-SPF links are assigned by the processor circuit 22 as incoming to the network node "D" in operation 72, and labeled in the state table 54 as unresolved to the nearest safe network node "A" (C→D="?-A"; E→D="?-A"; L→D="?-A"). As described in further detail below, the cost of each of the non-SPF links for each of the network nodes can be tracked for later analysis. The method is repeated by the processor circuit 22 for the network node "C" (event 212), resulting in the link "C→A" identified as the SPF link and the labeling of the links E→C="?-A" and F→C="?-A" in the state table 54 in operation 72.

The next network node chosen in operation 62 of FIG. 3B from the SPF nodes is the network node "L" (event 214). Operation 70 is skipped by the processor circuit 22, and since the network node "L" is not a safe network node, link L→D is identified by the processor circuit 22 as the SPF link, the link "E-L" is assigned as incoming to the network node "L", and labeled in the state table 54 as unresolved to the nearest safe network node "A" ("E→L"="?-A") in operation 72.

The next network node chosen by the processor circuit 22 in operation 62 of FIG. 3B from the SPF nodes is the network node "E" (event 216). Operation 70 is skipped, and since the network node "E" is not a safe network node, in operation 72 the link E→C is identified by the processor circuit 22 as an SPF link, and all the non-SPF links are oriented as incoming to the network node "E" and labeled as unresolved to the nearest safe network node "A", resulting in the labeling of the links F→E="?-A", G→E="?-A", and H→E="?-A" in the state table 54.

The next network node by the processor circuit 22 in operation 62 of FIGS. 3B and 104 from the SPF nodes is the network node "F" (event 218). Operation 70 is skipped by the processor circuit 22, and since the network node "F" is not a safe network node, in operation 72 the link F→C is identified as an SPF link, and all the non-SPF links are oriented as incoming to the network node "F" and labeled by the processor circuit 22 as unresolved to the nearest safe network node "A", resulting in the labeling of the links H→F="?-A", I→F="?-A", and J→F="?-A" in the state table 54.

The next network node chosen by the processor circuit 22 in operation 62 of FIG. 3B from the SPF nodes is the network node "N" (event 220). The network node "N" is identified by the processor circuit 22 as leaf network node based on its one and only one link N→L; hence, the link "N-L" is marked in the state table 54 as resolved (N→L=Resolved) in operation 70.

The next network node chosen by the processor circuit 22 in operation 62 of FIG. 3B from the SPF nodes is the network node "G" (event 222). Operation 70 is skipped, and since the network node "G" is not a safe network node, in operation 72 the link G→E is identified by the processor circuit 22 as an SPF link, and the non-SPF link H-G is oriented as incoming to the network node "G" and labeled as unresolved to the nearest safe network node "A", resulting in the labeling of the link H→G="?-A" in the state table 54.

The next network node chosen in operation 62 by the processor circuit 22 from the SPF nodes is the network node "H" (event 224). Since the network node "H" is not a safe network node, in operation 72 the link H→F is identified by the processor circuit 22 as an SPF link, and the non-SPF link I-H is oriented as incoming to the network node "H" and labeled as unresolved to the nearest safe network node "A", resulting in the labeling of the link I→H="?-A" by the processor circuit 22 in the state table 54.

The next network node chosen by the processor circuit 22 is the network node "I" (event 226. Since the network node "I" is not a safe network node, in operation 72 the link I→F is identified by the processor circuit 22 as an SPF link in the state table 54. As described previously, each of the SPF links 58 also can be labeled by the processor circuit 22 in the topology table 56 of FIG. 5.

As apparent from the foregoing description with respect to FIG. 6B, the identification of SPF links and unresolved links enables identification of the shortest path tree plus alternative unresolved links that can be used for identification of an alternate non-congruent path that is distinct from the shortest path to the root network node. The following description with respect to node "J" demonstrates how the identification of the alternative unresolved links enables identification of one or more junction nodes within the subDAGs 64a and 64b for formation of the arc routing topology.

In particular, the following description illustrates the identification within the DAG 52 (two or more) junction nodes, and reversible links (labeled "Rev") between the unction nodes and that can be reversed along one of the non-congruent paths of the junction nodes, without introducing a loop into the loop-free topology. In addition, the identification of a junction node in one subDAG (64a or 64b) that has a non-congruent path for reaching the destination network node 14 (distinct from the junction node serving as the root of the subDAG) enables formation of another infrastructure arc overlying a first infrastructure arc.

As illustrated with respect to FIGS. 6B and 6C, the next network node chosen by the processor circuit 22 in operation 62 of FIG. 3B from the SPF nodes is the network node "J" (event 228). The node "J" is identified by the processor circuit 22 as a safe network node because it can be classified as a junction node 68, illustrated in FIGS. 3C and 3D. The node "J" can be identified by the processor circuit 22 as a junction node because it has two non-congruent paths for reaching a safe node (e.g., the root network node "R") via the link J→F (labeled as unresolved to the nearest safe network node "A", i.e., "?-A"), and/or the link J→K (labeled as the SPF link unresolved to the nearest safe network node "B", i.e., "?-B"). Hence, the non-congruent paths provided by the links J→F and J→K are identified by the respective and distinct labels "?-A" and "?-B" identifying reachability to the root network node "R" via the respective safe network nodes "A" and "B".

Operation 72 is skipped by the processor circuit 22 because the network node "J" is identified as a junction node. Each of the data links of the network node "J" are resolved in operation 74 in a prescribed order, namely SPF link first, then any outgoing link(s), then any incoming link(s). Hence, the link J→K is the SPF link and therefore the first link to be analyzed in operation 74. Since the link J→K is unresolved in operation 76, the outgoing link J→K in operation 78 does not end in another junction, hence operation 80 is skipped.

Referring to FIG. 3D, the processor circuit 22 determines whether to execute operation 82 if the network node is not yet an intermediate junction. Operation 82 is executed by the processor circuit 22 for the link J→K of the network node "J" because if the link J→K, if reversed, the link reversal would enable the endpoint network node "K" to become a junction node, i.e., the endpoint network node "K" could now have an alternate path to the root network node "R" via the safe network node "A" (e.g., if the label of link J→K was changed upon link reversal from "?-B" to "?-A"); hence, the link J→K enables the node "J" to become a junction and does not cause any pruning of the SPF link J→K. Consequently, the link J→K is resolved by marking the link in the state table 54 as reversible ("Rev") by the processor circuit 22 in operation 82. The labeling of the link J→K as reversible ("Rev") is illustrated in FIG. 6D.

Since the node "J" is an edge junction toward the safe network node "B", operation 84 is executed by the processor circuit 22 to prevent the formation of a loop via the outward link "J→M" in the event that the link J→K is ever reversed to K→J in order to reach the safe network node "A"; hence, since "J→M"="?-B" is an outward link satisfying the condition "?-S" (where S=B), the outward link "J→M"="?-B" is pruned in operation 84 by blocking the path toward node "M" (note the square □ in FIG. 6C at the end of the link intersecting with network node "M", indicating traffic from network node "J" to network node "M" is blocked); the direction of the pruned (i.e., blocked) link J-M is reversed and relabeled by the processor circuit 22 as unresolved inward toward the new safe network node (junction node), i.e., M□→J="?-J" in the state table 54.

Also note that if in operation 84 another link existed (e.g., J→B) (not shown in FIG. 6B) as an unresolved link toward the safe node "B" (J→B="?-B"), that link (J→B) could be pruned at both ends (i.e., removed: J□-□B) in order to avoid the possibility of any loops in the event of any link reversal.

Hence, in order to avoid loops a junction node in a routing arc can have one and only one link toward a first end of the arc, and one and only one other link toward a second end of the arc. The link J→F is unaffected in operation 84 because J is an edge junction toward safe node "B" (via J→K), whereas the node J→F is toward the other safe network node "A".

Operation 86 is skipped by the processor circuit 22 for junction node "J" because it is not yet an intermediate junction because it does not yet have two reversible links. Operation 88 is skipped because the SPF link J→K is assigned as an outgoing link.

Execution of operation 78 by the processor circuit 22 with respect to the SPF link J→K ("Rev") continues in operation 90, which recursively calls execution of operation 66 (as illustrated in FIGS. 3C and 3D) for the endpoint of the link J→K, namely the network node "K", in order to extend the arc along the shortest path; in other words, the operations of FIGS. 3C and 3D are executed based on the change in status of the link J→K to a reversible link (event 230 of FIG. 4B). Hence, operation 70 is skipped for the J→K link endpoint node "K" (which is not a leaf node). The J→K link enables the endpoint node "K" to now become a junction node since the link J→K link is now reversible, hence the network node "K" as a junction node (specifically, an edge junction), and now a safe network node, hence operation 72 is skipped by the processor circuit 22. Each of the safe network node "K" links are resolved in operation 74, starting with the SPF link K→B: operation 76 is skipped by the processor circuit 22 because the SPF link K→B="?-B" is not yet resolved. The SPF link K→B is an outgoing link, hence operation 78 is executed by the processor circuit 22: operation 80 is not executed by the processor circuit 22 because the node K→B does not end in another junction node (i.e., the heir network node "B" is not a junction node). Operation 82 is executed by the processor circuit 22 because network node "K" is not an intermediate junction node yet, and the link K→B enables the end point network node B to become a junction node, hence the node K→B is labeled as reversible, K→B="Rev" in operation 82, to enable the heir network node "B" to become labeled by the processor circuit 22 as a junction node in the state table 54.

In operation 84 the node N=K is now an edge junction toward node "B", and there is no outward unresolved link to be pruned; however, the link M→K is relabeled by the processor circuit 22 from "?-B" to "?-K" in the state table 54. In operation 86 the network node "K" is now identified by the processor circuit 22 as an intermediate junction having two reversible links J→K="Rev" and K→B="Rev"; however, there are no other outward links other than the two reversible links, hence no pruning of other outward links is needed.

Hence, the resolution of the link J→K at node J as a reversible link causes resolution of the link endpoint K to be recursively resolved by the processor circuit 22 at operation 90, resulting in the resolution of reversible link K→B at node K. The resolution of the reversible link K→B at node K causes in operation 90 the recursive resolution by the processor circuit 22 of the link endpoint B (event 232).

The heir network node B is identified as an edge junction based on the reversible link K→B, and since the SPF link B→R is to the root, the heir network node "B" is identified as the end of a routing arc. The resolution of node B causes the recursive execution by the processor circuit 22 in operation 90 to return to network node "K" (event 234) to continue resolving the remaining links of the network node K.

Hence, the SPF link has been resolved in network node K, no outgoing links need to be resolved, causing the analysis of the link M→K="?-K" at operation 74. Each of the operations 76, 78, are skipped by the processor circuit 22 because the link M→K is not outgoing, and the incoming link is already marked unresolved to K "?-K". Hence, the processor circuit recursively resolves the endpoint M of the link K→M in operation 90 (event 236).

The network node M is determined by the processor circuit 22 in operation 72 to be a safe node because it has two non-congruent paths to the root, namely the path "?-K" via the link M→K, and the path "?-J" via the link M→J. Starting with the shortest path link M→K, in operation 78 the link is identified in operation 80 as ending in another junction "K", enabling the link M→K to be marked by the processor circuit 22 as resolved in the state table 54 (and a first end of the collapsed arc "ARC1" of FIG. 6D and FIG. 6I). A recursive call by the processor circuit 22 from network node M to network node K in operation 90 (event 238) results in no changes, hence the processor circuit 22 returns to network node M (event 240), and the processor circuit 22 resolves the next outgoing and unresolved link M→J="?-J" into a resolved link in operation 80 (and the second end of the collapsed arc "ARC1" of FIG. 6I).

Referring to FIG. 4B, the recursive resolution of network node "M" (as the endpoint of the link M-K) is complete, causing the processor circuit 22 return to the network node "K" at event 242 of FIG. 4C; the recursive resolution of the network node "K" also is complete, causing the return to network node "J" at event 244.

Note that the network nodes "K" and "M" are junction nodes without changing the link reversibility. Hence, the link M→J terminates a routing arc because it ends in a junction node "J", and the link M→K terminates in a routing arc because it ends in another junction node "K". Hence, the network nodes "J", "K", and "M" form a collapsed arc "ARC1" 12, illustrated in FIG. 6D.

The processor circuit 22 in operation 74 repeats the link analysis for the next link of the junction node "J", namely the outgoing link J→F="?-A". After skipping operation 76, operation 80 is skipped by the processor circuit 22 because the network node "F" is not a junction in FIG. 6D, hence link J→F does not end in another junction. The network node "J" is not an intermediate junction yet because it does not have two reversible paths, hence operation 82 is executed to make the link J→F reversible (J→F="Rev") because the reversal of link J→F enables the endpoint network node "F" to become a junction having an alternate path to the root network node "R" via "?-A" and the path via the network node "J". The network node "J" was already an edge junction, hence operation 84 is skipped.

Marking the link J→F reversible in operation 78, however, now makes the safe node "J" an intermediate junction, hence operation 86 is executed by the processor circuit 22: the description in operation 86 of "prune outwards all links of safe node N but the 2 reversible links . . . " ensures that there are no outward links except along the arc (formed via network nodes F, J, K, and B) 12, such that any other links are pruned and directed inwards (as executed previously with respect to the link M☐→J). Operation 88 is skipped by the processor circuit 22 because the link J→F is not incoming, and operation 90 is executed to recursively resolve the neighbor for the endpoint node of the link J→F, namely the network node "F" (event 246).

The processor circuit 22 skips operation 70 during resolution of the network node "F" it has multiple links. The network node "F" is identified as an edge junction (and therefore a safe node) because it has two non-congruent paths to the root node "R", and the network node "F" includes one reversible link J→F, hence, execution of operation 72 is skipped. As will be described in further detail below, the junction node "F" belongs to the subDAG(A) 64a of FIG. 6B, and the junction nodes "J", "K", and "B" belong to the subDAG(B) 64b; hence, a first infrastructure arc ("ARC2" illustrated in FIG. 6E) 12 can be created that comprises (at least two or more) junction nodes and (one or more) reversible links, where one end of the first infrastructure arc terminates at the destination network node "R".

Each of the links of the safe node "F" are analyzed in operation 74, starting with the SPF link F→C: operations 76 and 80 are skipped, and operation 82 is executed by the processor circuit 22 to mark the link F→C as reversible (F→C="Rev"). Operation 84 is executed by the processor circuit 22 because the network node "F" is now an edge junction towards "S" (S=A). Hence, in operation 84 any outgoing unresolved links labeled "?-A" (e.g., F→E="?-A") are pruned and reversed inwards toward the edge junction and marked by the processor circuit 22 as unresolved toward the edge junction (e.g., change from F→E="?-A" to E☐→F="?-F") in the state table 54; further, in operation 84 all incoming links (i.e., inward links) of the safe node "F" are changed by the processor circuit 22 from "?-A" to "?-F" (e.g., change H→F="?-A" and I→F="?-A" to H→F="?-F" and I→F="?-F"). The relabeling of the links E☐→F, H→F, and I→F in operation 84 in the state table 54 exposes the network nodes "E", "H", and "I" to the alternate path to the root node "R" via the edge junction "F", enabling the network nodes "E", "H", and "I" to be later identified as new junction nodes (and therefore safe network nodes) having new non-congruent paths for reaching the root node "R", distinct from the path provided by the subDAG (A) 64a. hence, the network nodes "E", "H", and "I" can later be used to create secondary infrastructure arcs based on the non-congruent paths distinct from the subDAG (A) 64a.

The edge junction "F" is not an intermediate junction yet, hence operation 86 is skipped, and operation 88 is skipped because the incoming link E☐→F is already marked "?-F" as unresolved toward the edge junction "F".

A recursive call is executed by the processor circuit 22 in operation 90 for the endpoint network node "C" of the SPF link F→C="Rev" (event 248).

The recursive resolution by the processor circuit 22 of the network node "C" skips operation 70 because it has multiple links. The network node "C" is identified as an edge junction (and therefore a safe node) because it has two paths to the root node "R", and the network node "C" includes one reversible link F→C, hence, execution of operation 72 is skipped by the processor circuit 22. Operations 76 and 80 are skipped, and operation 82 is executed by the processor circuit 22 to mark the link C→A as reversible (C→A="Rev") in the state table 54. Operation 84 is executed by the processor circuit 22 because the network node "C" is now an edge junction towards "S" (S=A). Hence, in operation 84 any outgoing unresolved links labeled "?-A" (e.g., C→D="?-A") are pruned and reversed inwards by the processor circuit 22 toward the edge junction "C" and marked in the state table 54 as unresolved toward the edge junction (e.g., change from C→D="?-A" to D☐→C="?-C"); further, in operation 84 any incoming links of the safe node "C" are changed by the processor circuit 22 from "?-A" to "?-C" (e.g., change E→C="?-A" to E→C="?-C") in the state table 54. The relabeling of the links D☐→C and E→C in operation 84 exposes the network node "D" to an alternate path to the root node "R" via the edge junction "C", enabling the network node "D" to be later identified as a junction node having two non-congruent paths for reaching the root node "R".

The edge junction "C" is not an intermediate junction yet, hence operation 86 is skipped by the processor circuit 22, and the link C→A is not incoming, hence operation 88 is skipped. A recursive call is executed in operation 90 for the endpoint network node "A" of the SPF link C→A="Rev" (event 250).

The recursive resolution by the processor circuit 22 of the network node "A" skips operation 70 because it has multiple links. The heir network node "A" is a safe node, and is identified as an edge junction because it has two non-congruent paths to the root node "R", and the network node "A" includes one reversible link C→A, hence, execution of operation 72 is skipped.

The SPF link A→R is first selected in operation 74 and identified in operation 76 as resolved. The resolved SPF link A→R also ends in the root "R", and therefore terminates the arc identified by the sequence of recursively called neighbors A (C, F, J) extending back to the intermediate junction "J", and extending to the edge junction "B".

Hence, the identification of the SPF link A→R as resolved during the successive recursion by the processor circuit 22 from the intermediate junction "J" (i.e., a junction node having two reversible links), establishes the junction node "A" as the second edge junction, resulting in the first infrastructure arc "ARC2" for reaching the root node "R", illustrated in FIG. 6E and FIG. 6I. As illustrated in FIGS. 6E, 6H, and 6I, the infrastructure arc "ARC2" for reaching the root node "R" includes the junction nodes "A", "C", "F", "J", "K", and "B" connected by the reversible links A-C, C-F, F-J, J-K, and K-B. Hence, the infrastructure arc "ARC2" for reaching the root node "R" can be identified based on traversing the sequence of an heir network node (e.g., "A") and the sequence of reversible links until reaching another heir network node (e.g., "B").

The next link of junction node "A" is analyzed in operation 74, namely the link D→A=?-A, resulting in the recursive resolution of the network node "D" in operation 90 (event 252). The network node "D" is now a junction node (and therefore a safe node), because it has two non-congruent paths (via nodes A and C) for reaching the root node "R". Hence, operations 70 and 72 are skipped, and operation 74 is executed first for the SPF link D→A. The link D→A is marked as resolved in operation 80 based on terminating in the junction node A. The recursive calling from node "D" to node "A" causes the recursive analysis for node "A" to return back to node "D", as all other links have already been analyzed with respect to node "A": such a return is referred to as a "no-op recursion", and will be omitted in future discussion for brevity.

The analysis for node "D" continues for link D☐→C in operation 74. The link D☐→C ends in the junction node "C" and therefore is marked as resolved in operation 80, resulting in the formation of the collapsed arc "ARC3" 12 illustrated in FIG. 6I. The incoming link L→D is next analyzed with respect to the junction node D in operation 74, and relabeled in operation 88 from the unresolved status of ?-A to the unresolved status ?-D (L→D="?-D"), indicating that the nearest safe node is the node "D".

As illustrated in FIG. 6F, the safe node "D" can form its own subordinate directed acyclic graph SubDAG(D) 64d within the SubDAG(A) 64 toward the root node "R", such that the safe node "D" becomes the closest safe node for the network nodes "L", "N", "E", "G", "H", and "I". Hence, similar to operation 72, all the unresolved incoming links in the SubDAG of safe node "D" (e.g., links L→D, E→D, E→L, G→E, H→G, I→H, and H→E) are recursively relabeled (i.e., marked) in operation 88 to "?-D" to propagate the identification of the newest safe node "D" (state 252).

The recursive analysis in operation 90 of the node "L" by the processor circuit 22 results in a no-op recursion because the node "L" is not yet a safe node, hence the analysis returns to the node "D".

The link E→D is next analyzed with respect to the junction node D in operation 74, and relabeled in operation 88 by the processor circuit 22 from the unresolved status of ?-A to the unresolved status ?-D (E→D="?-D") in the state table 54. The analysis for node E is recursively called by the processor circuit 22 in operation 90 (event 254).

The network node E is a junction node (and therefore a safe node) because it has two non-congruent paths to the root via junction nodes "D" and "E", without changing any link reversibility. The following links of junction node "E" need to be analyzed in operation 74, in the following example order: E→C, E→D, E→L, E☐→F, G→E, and H→E.

Hence, the SPF link E→C is marked as resolved in operation 80 because it ends in the junction node "C". The outgoing link E→D is analyzed with respect to the network node "E" in operation 74, and is marked as resolved in operation 80 (becoming the first end of the collapsed arc "ARC8" of FIG. 6I) because it ends in the junction node "D". The outgoing link E→L is next analyzed in operation 74, and since the link E→L enables in operation 82 the endpoint node "L" to become a junction, the link E→L is marked as reversible in operation 82. The endpoint "L" is recursively analyzed in operation 90 (event 256).

Referring to FIG. 4D and event 256, the network node "L" is identified as an edge junction (and therefore a safe node) because it has the reversible link E→L. The link L→D is marked as resolved in operation 80 because it ends in the junction node "D", resulting in the formation of the second infrastructure arc "ARC4" of FIG. 6G and FIG. 6I. Since the arc "ARC4" ends in a safe node "D", then even though all traffic from the arc "ARC4" could exit via network node C (i.e., network node "D" sends its traffic to network node C via the link D☐→C), the network node "D" still has an alternate path via network node A. The link N→L has already been resolved for the leaf node N, hence the analysis returns to network node "E".

The next link under analysis by the processor circuit 22 with respect to the network node "E" (event 258) is the link E☐→F=?-F in operation 74. The link E☐→F is resolved in operation 80 as ending in the junction node "F" (resulting in the formation of the collapsed arc "ARC8"). Although the link E☐→F was pruned as unidirectional, it could be safely reversed for LFA analysis, if desired (operation 90 is a no-op for the endpoint node F of link E☐→F, hence, analysis returns to the network node "E").

The incoming link G→E of network node "E" is next analyzed in operation 74. Since the network node "G" is not a junction, it is not a safe node and therefore the link G→E cannot be resolved, but is relabeled ?-E in operation 88: all incoming links to the safe node "E" also are recursively marked by the processor circuit 22 as unresolved toward "E" (namely, links G→E, H→E, H→G, and I→H all are reset to "?-E") resulting in the formation of a subDAG(E) toward E. Analysis of the network node "G" is recursively called as the endpoint of the link G→E in operation 88.

The network node "G" (event 260) is determined to not be a junction node, and all links are already labeled to the nearest safe node "E", hence operation 72 can be skipped and the processor circuit 22 can return back to node "E" in event 262.

The next incoming link H→E of the safe node "E" is analyzed in operation 74, causing the processor circuit to recursively analyze in operation 90 the endpoint node "H" at event 264.

The network node "H" in operations 72 and 74 is identified as a junction node having non-congruent paths via unresolved paths "?-F" (via the SPF link H→F) and "?-E" (via the links H→E and H→G). Hence, each of the links of the safe node "H" are successively resolved in operation 74, namely the links H→F, H→E, H→G, and I→H.

The SPF link H→F of the safe network node "H" is resolved by the processor circuit in operation 80 as ending in the junction node "F": as will be shown later, the link H→F will terminate the infrastructure arc "ARC5" and the collapsed arc "ARC6" of FIG. 6I. Operation 90 results in a no-op recursive analysis of node "F" (as the endpoint of the link H→F), hence, the analysis of the next (outgoing) link H→E for the safe node "H" in operation 74 causes the link H→E (ending in the junction node "E") to be resolved in operation 80 as the second end of the collapsed arc "ARC6".

Operation 90 results in the no-op recursive analysis of node "E" (as the endpoint of the link H→E), hence the analysis of the next (outgoing link) H→G for the safe node "H" is executed in operation 74. In operation 82 the link H→G enables the endpoint node "G" to become a junction; further, the link H→G if reversed does not cause pruning of the SPF link H→F; hence, the link H→G is relabeled in operation 82 by the processor circuit 22 to a reversible link (H→G="Rev") in the state table 54. Operation 90 is executed for recursive analysis of the endpoint node "G" of the link H→G (event 266).

The network node "G" is determined in operation 72 to be an edge junction (and therefore a safe node) based on the reversible link H→G. Hence, analysis of the SPF link G→E in operation 74 results in operation 80 with the link G→E being labeled as resolved as the second end of the infrastructure arc "ARC5". Operation 90 results in the no-op recursive analysis of node "E" (as the endpoint of the link G→E), and since the safe network node "G" has no other links to resolve, execution returns to node "H" for evaluation of the next incoming link I→H (event 268).

The next link in operation 74, namely the incoming link I→H of the safe network node "H": The link I→H is relabeled in operation 88 from I→H="?-A" to I→H="?-H", and the operation 90 is executed by the processor circuit 22 for recursive analysis of the endpoint node "I" of the link I→H (event 270).

The network node "I" is determined by the processor circuit 22 in operation 72 to be a junction node having non-congruent paths via unresolved paths "?-F" (via the SPF link I→F) and "?-H" (via the outgoing link I→H). Hence, in operation 74 the SPF link I→F is analyzed by the processor circuit 22, and marked in operation 80 as resolved (and terminating the collapsed arc "ARC7") based on ending in the junction node "F". Operation 90 results in the no-op recursive analysis of node "F" (as the endpoint of the link I→F), resulting in analysis in operation 74 of the next (outgoing link) I→H. Since the link I→H ends in the junction node "H", the link I→H is labeled in operation 114 as resolved, forming the second end of the collapsed arc "ARC7" of FIG. 6I. Operation 90 results in the no-op recursive analysis of node "H" (as the endpoint of the link I→H), returning execution analysis to junction node "I".

Analysis of node "I" is completed by the processor circuit 22, returning execution analysis by the processor circuit 22 to node "H"; analysis of node "H" is complete, returning execution analysis to node "E"; analysis of node "E" is complete, returning execution analysis to node "D"; analysis of node "D" is complete, returning execution analysis to node "A"; analysis of node "A" is complete, returning execution analysis to node "C"; analysis of node "C" is complete, returning execution analysis to node "F"; and analysis of node "F" is complete, returning execution analysis to node "J". As described previously, the processor circuit 22 can update the topology table 56 of FIG. 5 as each routing arc is constructed, where the ownership of an arc cursor is identified by the junction node having the two outwardly oriented reversible links.

The resulting link topology is illustrated in FIG. 6H, with the resulting arcs "ARC1" through "ARC8" illustrated in FIG. 6I. The routing topology of FIG. 6I illustrates the routing arcs "ARC1" through "ARC8", with all the network nodes being junction nodes except for the root network node "R" and the leaf node "N". As illustrated in FIGS. 6H and 6I, the collapsed arc "ARC1" includes the junction nodes "J", "M", and "K"; the infrastructure arc "ARC2" for reaching the root node "R" includes the junction nodes "A", "C", "F", "J", "K", and "B" connected by the reversible links C→A, F→C, J→F, J→K, and K→B; the collapsed arc "ARC3" includes the junction nodes "A", "D", and "C"; the infrastructure arc "ARC4" includes the junction nodes "D", "L", "E", and "C"; the infrastructure arc "ARC5" includes the junction nodes "E", "G", "H", and "F"; the collapsed arc "ARC6" includes the junction nodes "E", "H", and "F"; the collapsed arc "ARC7" includes the junction nodes "H", "I", and "F"; and the collapsed arc "ARC8" has the junction nodes "D", "E", and "F".

Consequently, assuming the link F→C encountered a failure, the network node "F" could redirect traffic to the node "J" via the reversible link J→F (e.g., based on the network nodes "F" and "J" negotiating that the link J→F needs to be reversed to F→J, enabling network traffic to be redirected without recalculation of routes.

As apparent from this disclosure, the loop-free routing topology 10 for the destination network node ("R") 14 can be repeated for each network node 16, enabling each network node 16 to have its own loop-free routing topology 10 that guarantees reachability to the corresponding network node 16 via non-congruent paths.

Distributed Establishment of Loop-Free Label Switched Paths in the Loop-Free Routing Topology As described previously, the loop-free routing topology 10 illustrated in FIG. 6I enables network traffic to be redirected instantaneously in response to a detected failure in the routing topology based on reversing a reversible link, without introducing any loops into the topology. The loop-free routing topology 10 also can utilize a new label distribution protocol that enables the network nodes 16 to establish loop-free label switched paths for reaching the destination network node 14 via the loop-free routing topology 10. The apparatus 20 can be configured for not only computing the arc topology 10, but also generating a set of serialized representations describing the loop-free routing topology, where each serialized representation describes a corresponding path in the topology: as described herein, the "path" as used herein is not necessarily limited to the disclosed routing arcs. The set of serialized representations can be propagated from the destination network node 14 to the network nodes 16 in the computing network, enabling each of the network notes to establish their own loop-free label switched paths for reaching the destination network node 14.

The apparatus can be implemented, for example, as a centralized path computing engine associated with a network management system, the destination network node 14, or any node computing the topology 10 for a number of destinations within a prescribed autonomous system.

Figure 7:
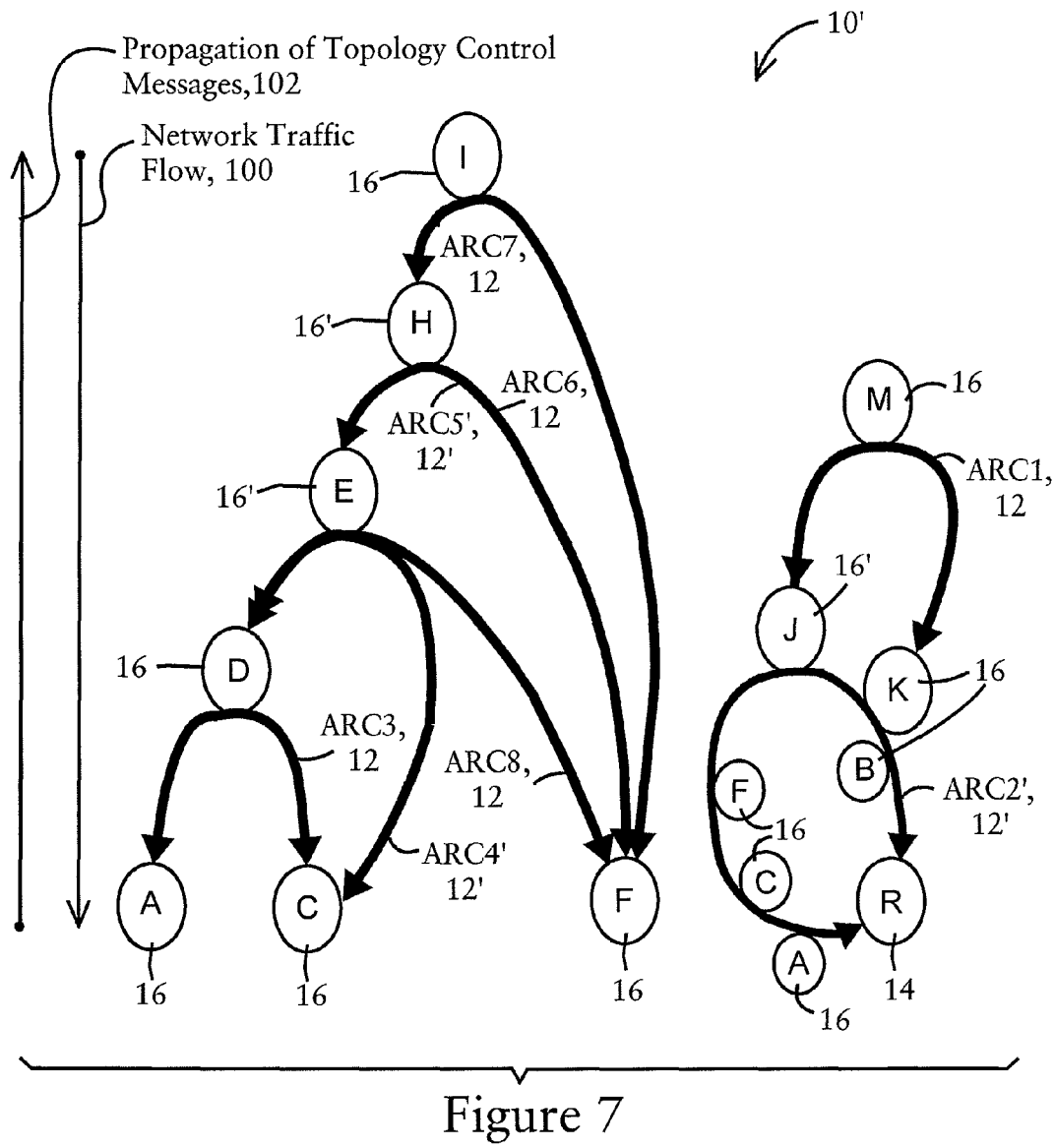
FIG. 7 illustrates the loop-free routing topology of FIG. 6I as an example hierarchy of successively cascaded routing arcs, for propagation of a set of serialized representations of paths in the routing topology, according to an example embodiment.

FIG. 7 illustrates an example hierarchy 10' of successively cascaded routing arcs, constructed by the apparatus 20 of FIG. 2 according to an example embodiment. In particular, the loop-free routing topology 10 can be represented by the apparatus 20 as a hierarchy 10' that contains the same routing arcs 12 for reaching the destination 14, except that the routing arcs 12 are redrawn as a hierarchy of successively cascaded (collapsed) routing arcs 12 or 12' that supply network traffic in the "downward" direction 100 to a destination 14.

As illustrated in FIG. 7, all network traffic toward the destination 14 follows the direction of the network traffic flow 100, ending at the root 14 or the network nodes "A", "C", or "F" along the root arc "ARC2" 12. Hence, all network traffic flows along the path 100 down the hierarchy 10' of successively cascaded routing arcs 12 or 12' supplying network traffic to the destination 14.

Conversely, topology control messages 102 can be propagated from the destination network node 14 to each of the network nodes 16 in the computing network. The topology control messages 102 include a "set of serialized representations" (described below) describing relevant paths (e.g., routing arcs 12) of the loop-free routing topology 10. The topology control message 102 is used to flood the serialized representations of the relevant paths over the loop-free routing topology 102, across each of the network nodes 16 along each of the routing arcs 12: in other words, a network node (e.g., "C") 16 passes the topology control message (containing the set of serialized representations) to any of its neighbors that can send network traffic back to that network node (e.g., "C"), except that the network node (e.g., "C") will not send the topology control message back to the transmitting network node (e.g., "A") that had just sent the topology control message to the network node ("C"). Hence, each network node 16 can learn the relevant paths of the loop-free routing topology 10 in response to parsing the set of serialized representations contained in a topology control message 102.

Each topology control message 102 also includes one or more locally significant labels ("λ") generated by the network node 16 transmitting the topology control message 102. Each locally significant label generated by the transmitting network node 16 can have an arbitrary numeric value. As described below, each locally significant label is associated with prescribed attributes set by the transmitting network node 16 for forwarding a data packet to the destination network node 14: as described below with respect to FIG. 15 the transmitting network node 16 stores the locally significant table (and associated attributes) in a label forwarding table (also referred to as a label switched forwarding table); the network node receiving the topology control message 102 also stores the received locally significant label in a new label forwarding table entry in its own label forwarding table, creates a new locally significant label as an index to the new label forwarding table entry, and retransmits the set of serialized representations with the new locally significant label in a retransmitted topology control message.

Hence, the topology control messages 102 enable the network nodes 16 to each independently establish loop-free label switched paths for reaching the destination network node 14 via the loop-free routing topology 10. Moreover, multiple locally significant labels can be specified within a single topology control message 102, for example a primary label for a default path to reach the destination, and a "backup" (or "fast reroute") path to reach the destination. Topology control messages 102 also can be propagated along both ends of a bidirectional routing arc 12, resulting in a total of four locally significant labels identifying four respective paths available for reaching the destination node 14 by a network node 16. The loop-free label switched paths can be implemented, for example, using multiprotocol label switched (MPLS) labels according to RFC 3031 or RFC 6178, label distribution protocol (LDP) according to RFC 3036 or 5036; alternately the labels can use other tagging techniques, for example IEEE 802.1q (or Q in Q) as labels in carrier Ethernet, IPv6 flow labels, or direct encapsulation over ATM or frame relay. Other topology information can be transmitted over the routing arcs 12 once established, for example as illustrated in U.S. Pat. No. 7,693,064.

Hence, the label switched paths enable any network node 16 along the bidirectional paths to instantaneously reverse the transmission of a data packet to an alternate (backup) label switched path in response to the network node detecting a failed link; moreover, loops are avoided by using different label switched paths to identify a default path in one direction of the bidirectional path (e.g., routing arc), a default path in a second direction of the bidirectional path, a backup (fast reroute) path that is used in response to detecting a failed link in the default path in the one direction, and a second backup (fast reroute) path than that is used in response to detecting a failed link in the default path in the second direction.

Figure 8:
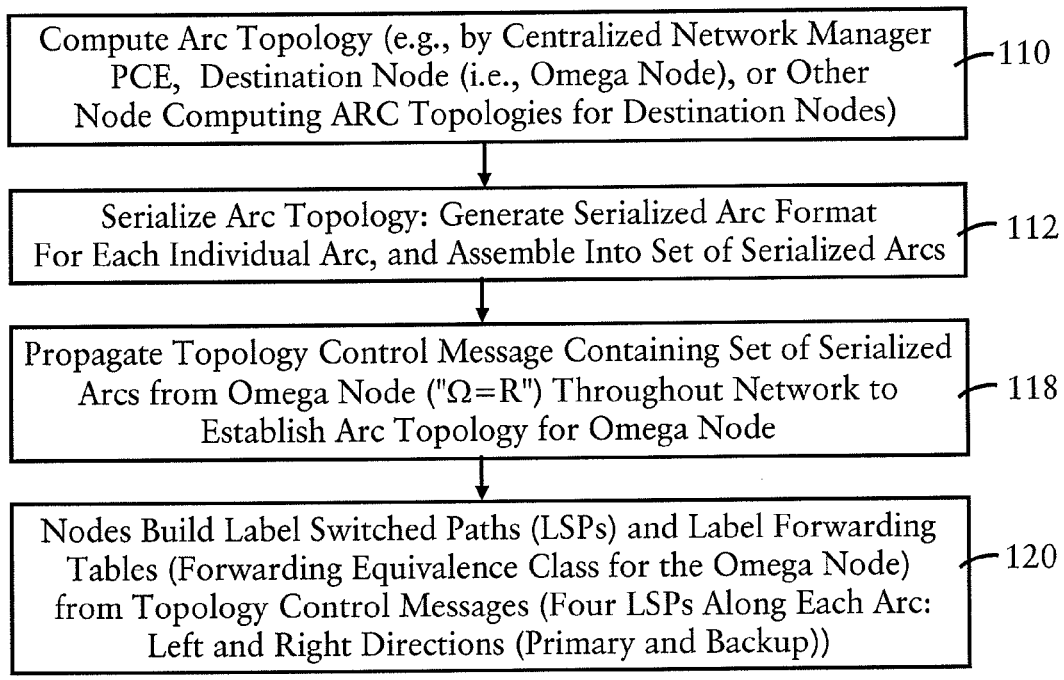
FIG. 8 illustrates an example method summarizing the method of generating and propagating a set of serialized representations describing the loop-free routing topology, that enables network nodes to establish loop-free label switched paths for reaching a destination network node, according to an example embodiment.

FIG. 8 illustrates an example method for label distribution and route installation in the loop-free routing topology, according to an example embodiment. Referring to FIGS. 2, 6I, and 8, the processor circuit 22 in the apparatus 20 is configured for creating in a computing network a loop-free routing topology 10 for reaching the destination network node "R" in operation 110 as illustrated in FIG. 6I and as described previously with respect to FIGS. 1 through 6I. The computing network may be an autonomous system, or any part thereof, for example a local area network, an ad hoc network such as a mobile ad hoc network, a sensor network, etc. As described previously, the loop-free routing topology 10 comprises distinct paths 12 for reaching the destination network node 14.

The processor circuit 22 also is configured for generating in operation 12 a set of serialized representations describing the loop-free routing topology 10. As described in further detail below with respect FIGS. 10 and 14, each serialized representation 114 describes a corresponding one of the paths 12. The processor circuit 22 also assembles all of the serialized representations 114 of the respective paths (e.g., routing arcs 12) into a set 116 of serialized representations, illustrated in FIG. 12. Hence, the set of serialized representations 116 can provide a representation of the entire loop-free routing topology 10.

The processor circuit 22 can generate in operation 118 a topology control message 102 containing the set of serialized representations 116, enabling the network interface circuit 24 of the destination node "R" to output in operation 118 the topology control message 102 on each of its incoming links (i.e., toward nodes "A" and "B") causing the topology control message 102 to be propagated throughout the network. Since the destination node "R" 14 is the final destination for the loop-free topology 10, the destination node 14 also is referred to generically as the "omega node" (Ω). Hence, the omega node (Ω="R") 14 defines the forwarding equivalence class (FEC) for the topology control message 102: the topology control message 102 also specifies a locally significant label (e.g., an MPLS label) (e.g., "O=R_AR" for the link "R-A" or "R_BR" for the link "R-B") that is associated with the network interface that outputs the message to the next hop network node 16 for the forwarding equivalence class "Ω=R".

As used herein, the nomenclature "O=X_YZ" refers to a locally significant label "O" identifying the link in the direction from node "Z" to node "Y" for the forwarding equivalence class "Ω=X" to be used as a default (i.e., primary) path in reaching the destination node "Ω=X": in other words, the node "Z" generates the locally significant label "O=X_YZ" to notify the node "Y" (i.e., topology control message "to Y from Z") that the label "O=X_YZ" is to be used for forwarding a data packet via node "Z" along a default path to the destination node "Ω=X" (i.e., data traffic destined for "Ω=X" via default path is sent "from Y to Z"). An additional extension (e.g., "FRR") can be used to identify an additional label attribute, namely that the link is to be used as a fast reroute ("FRR") path (i.e., backup path) in the event of a link failure on the default path. The locally significant label can be implemented as a numeric value that provides an index into a label forwarding table within a network node. Hence, a topology control message 102 output by a network node 16 and containing the set of serialized representations can further include a default label "O=X_YZ" and a backup (fast reroute) label "O=X_ZY_FRR" for the forwarding equivalence class "Ω=X". Since the routing arcs 12 are bidirectional, the node "Y" also can receive another topology control message 12 from the "other end" of its arc, and in response send to the node "Z" a topology control message 102 specifying the default label "O=X_ZY", the backup label "O=X_YZ_FRR", and the set of serialized representations.

Hence, the omega node (Ω="R") 14 outputs in operation 118 (118*a* of FIG. 12) the topology control message 102 with the set of serialized arcs (116 of FIG. 12): the omega node (Ω="R") 14 also adds a locally significant label "O=R_AR" to the topology control message 102 output onto the link "R-A" to the network node "A", and a locally significant label "O=R_BR" to the topology control message 102 output onto the link "R-B" to the network node "B".

In response to the network node "A" 16 receiving the topology control message 102 with the locally significant label "O=R_AR" on an identified network interface (e.g., "A1"), the network node "A" can create in operation 120 an entry in its internal label forwarding table for the forwarding equivalence class Ω="R" that any data packet destined for the destination node "Ω=R" 14 via the link "R-A" should be output onto the network interface "A1" with the locally significant label "O=R_AR" (as described previously, a locally significant label can be an arbitrary numeric value chosen by the source of the label).

The processor circuit 22 in the network node "A" 16 also can determine the routing topology 10 from the set of serialized arcs 116 in the topology control message 102. Hence, the processor circuit 22 in the network node "A" 16 can create additional label forwarding table entries for the network nodes "C" and "D" that are configured to send network traffic to the destination node "Ω=R" 14 via the network node "A": the label forwarding table entry for the network node "C" can specify a new locally significant label "O=R_CA" (used as an index into the label forwarding table), the destination label "O=R_AR", and the outbound network interface A1. Hence, if the network node "A" receives a data packet from the network node "C" that specifies the locally significant label "O=R_CA", the network node "A" can use the specified locally significant label as an index into the label forwarding table to recover from the forwarding table entry the destination label "O=R_AR" (to be swapped with the existing label in the received data packet) and output the data packet onto the network interface "A1" for transfer to the destination node 14 via the link "A-R".

Hence, in operation 118 the network node "A" sends the topology control message 102 to the network node "C" with the locally significant label "O=R_CA", and to the network node "D" with the locally significant label "O=R_DA". The network node "C" can identify the network topology 10 from the set of serialized arcs 116, and in response can update its label forwarding table in operation 120 with a forwarding table entry specifying the network interface (e.g., "C1") having received the topology control message 102 from the network node "A", the locally significant label "O=R_CA", and new locally significant labels (e.g., "O=R_FC", "O=R_EC") used as indices into the label forwarding table for data packets received from other network nodes (e.g., "F" via C-F; "E" via C-E). The network node "C" can output the topology control message 102 to the network nodes "E" and "F" using the locally significant labels "O=R_EC" and "O=R_FC", respectively.

Hence, the propagation in operation 118 of the topology control message enables the network nodes 16 2 establish the arc topology for reaching the omega node 14; further, insertion and swapping of locally significant labels at each network node enables each of the network nodes 16 to independently establish loop-free label switched paths for reaching the destination network node 14 via the loop-free routing topology 10.

Figures 9, 10:
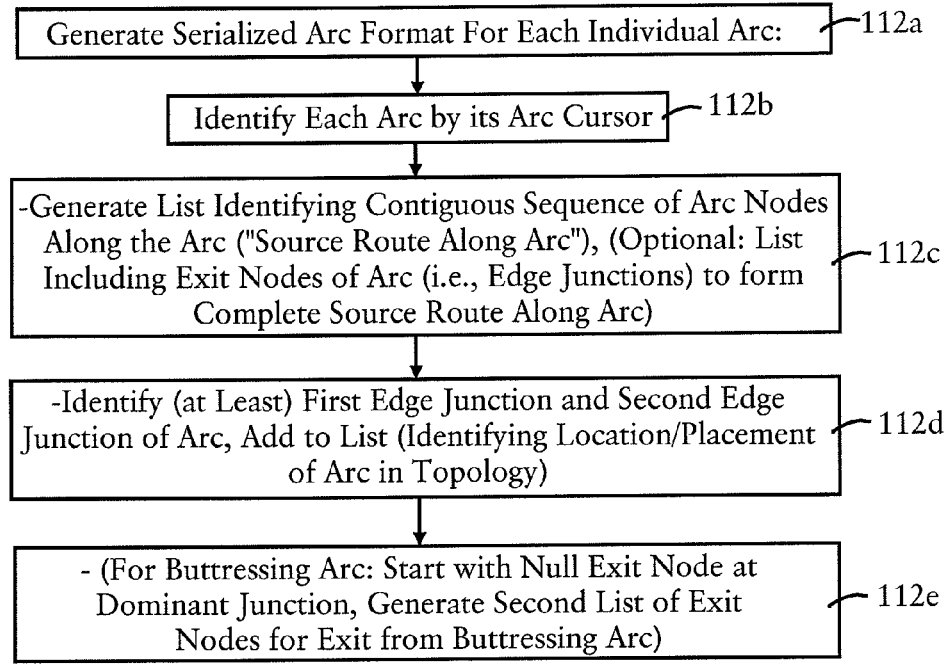
FIG. 9 illustrates an example method of generating a serialized representation of a path in the loop-free routing topology, according to an example embodiment.
FIG. 10 illustrates the set of serialized representations describing the loop-free routing topology, according to an example embodiment.

FIG. 9 illustrates an example method by the processor circuit 22 of the apparatus 20 of executing operation 112 of FIG. 8, namely the serializing of the arc topology 10, according to an example embodiment. The method begins in operation 112*a* based on the processor circuit 22 of the apparatus 20 identifying in operation 112*b* each path (e.g., routing arc) 12 by its arc cursor 18, namely the identity of the network node 16 having position of the arc cursor 18 for a given routing arc 12. As illustrated in FIG. 10, each routing arc 12 as identified by its arc reference (ARC1 to ARC8) in FIG. 6I is given a serialized arc identifier 122 based on the corresponding network node 16 having possession of the arc cursor 18. For example, the network node "J" has possession of the cursor 18 for the routing arc "ARC2" 12; the network node "E" has possession of the arc cursor 18 for the routing arcs "ARC4" 12 and "ARC8", hence the serialized arc identifiers "E1" and "E2" are used to distinguish routing arcs 12 in instances where the same network node ("E") has possession of multiple arc cursors 18 for respective routing arcs 12 (see also the serialized arc identifiers "H1" and "H2" 122 to distinguish the routing arcs "ARC5" and "ARC6" having their respective arc cursors 18 controlled by the network node "H").

Hence, the serialized arc identifier 122 serves as metadata that identifies the network node 16 in the corresponding path (e.g., routing arc) 12 as possessing the corresponding our cursor 18 for control of traffic along the routing arc 12.

The processor circuit 20 of the apparatus 20 generates in operation 112*c* a list 124 (illustrated in FIGS. 10 and 14) identifying a contiguous sequence of arc nodes 16 along the corresponding arc 12. For example, the serialized arc 114*a* provides the source route "{B, K, J, F, C, A}" along the arc having the serialized arc identifier "J" 122 for the routing arc "ARC2" in FIG. 6I. the processor circuit 20 also identifies in operation 112d at least a first edge junction and a second edge junction of the routing arc 12 (i.e., exit nodes) that empties traffic from the routing arc to either the destination node 14 or another routing arc that is closer to the destination network node 14 than the corresponding routing arc 12. As used in this description, any node (or nodes) within brackets "[ ]" identify an end of a routing arc (i.e., an exit node), such that the nodes "C" and "D" are the exit nodes for the routing arc "ARC4" in the serialized arc format 114b; the contiguous sequence of arc nodes within brackets "{ }" refers to intermediate junction nodes that are not exit nodes.

Figure 14:
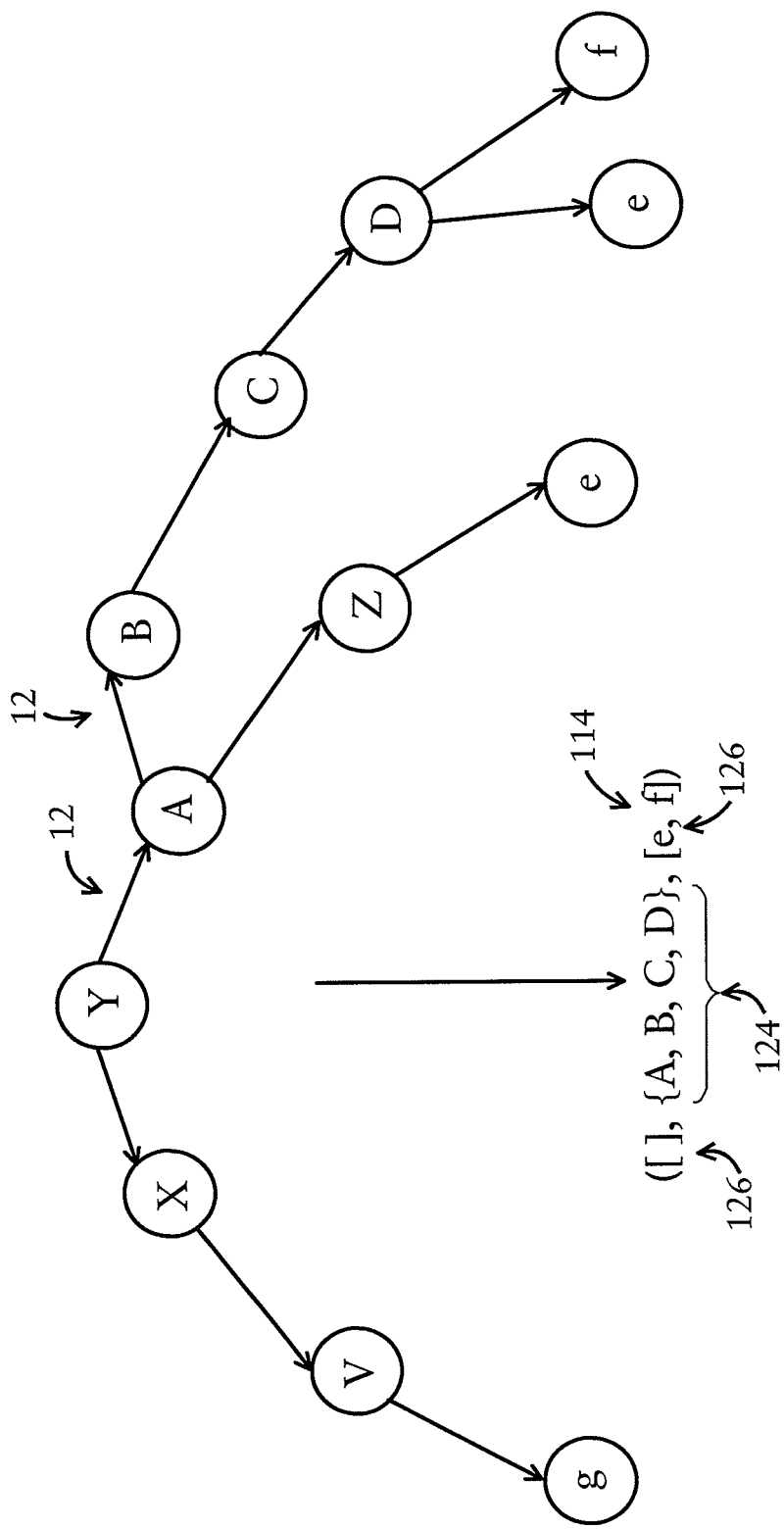
FIG. 14 illustrates an example serialized representation of a buttressing arc, according to an example embodiment.

As illustrated in FIG. 14, a serialized arc format 114 also can be generated in operation 112e for a buttressing arc having zero (i.e., null) exit nodes on one end of the routing arc 12 a contiguous sequence of arc nodes along the buttressing arc (A, B, C, and D), with a list of exit nodes (e, f) coupled to the last network node "D".

Hence, the serialized arc format 114 for each routing arc 12 includes a first list of exit nodes 126, followed by a source route 124 of nodes along the arc, ending with another list 126 of exit nodes of the arc, enabling the formation of a complete source route along the corresponding arc 12; in the case of a buttressing arc as in FIG. 14, one of the lists 126 can have null entries, however the other list 126 must specify at least one exit node for the arc. Hence, the serialized arc format 114 includes metadata for identifying the art cursor (via the serialized arc identifier 122), exit nodes (126), and the intermediate nodes 124 between the exit nodes and along the routing arc 12.

Hence, in operation 112 of FIGS. 8 and 9 the processor circuit 22 of the apparatus 20 assembles the serialized arc formats 114 for each of the individual arcs 12 into a single set 116 of serialized arcs. As described previously, the single set 116 of serialized arcs are output by the destination (omega) node 14 to the network nodes for propagation in operation 118 of the topology control messages 102 to enable building of the label switched paths by the network nodes 16.

Figure 11:
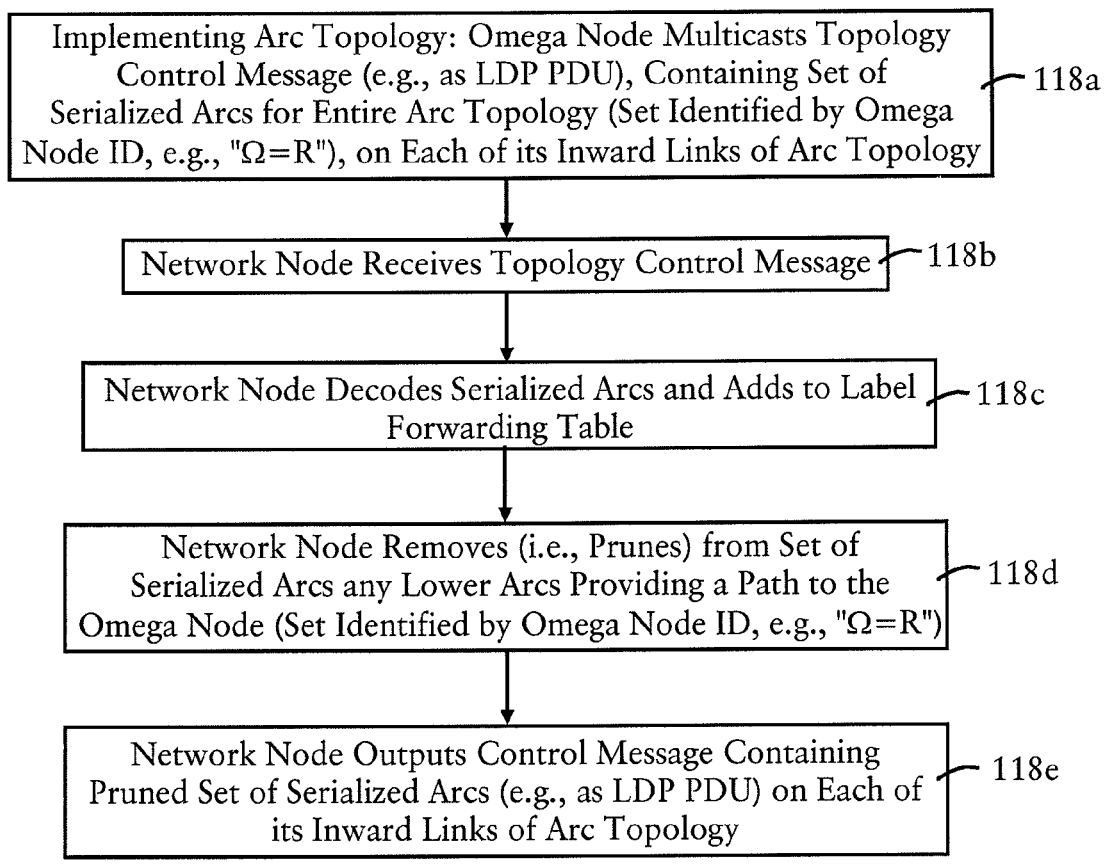
FIG. 11 illustrates implementing the loop-free routing topology based on propagating the set of serialized representations from the destination network node to network nodes in the computing network, according to an example embodiment.

FIG. 11 illustrates example propagation 118 of the topology control messages 102 throughout the network nodes 16, according to an example embodiment. The omega node 14 outputs in operation 118a the topology control message 102, for example as a label distribution protocol (LDP) protocol data unit (PDU). As described previously, the topology control message 102 includes a set 116 of all the serialized arcs (114a through 114h); further, each topology control message 102 output by each network node 16 specifies a corresponding unique locally significant label "O" for associating the LDP PDU to the forwarding equivalence class "Ω=R".

In response to a network node 16 receiving in operation 118b a topology control message 102, the corresponding processor circuit 22 of the network node 16 can parse from the topology control message 102 the locally significant label "O", and the set 116 of serialized representations containing the serialized arc identifiers 122 and the serialized arc formats 114 describing the respective paths 12. The corresponding processor circuit 22 of the network node 16 can decode in operation 118c the serialized arcs, as identified by their respective serialized arc identifiers 122 and their respective serialized arc formats 114, and create the necessary entries into label forwarding table of the network node 16. The network node 16 can optionally remove (i.e. proven) in operation 118d at least one of the serialized representations from the received topology control message 102 based on the corresponding path being positioned between the network node and the destination 14. The pruning of operation 118d is described in further detail below with respect to FIG. 12. The network node 16 outputs in operation 118e a modified (i.e., pruned) topology control message 102 on each of its inward arcs of the arcs topology 10, for propagation to the next network nodes in the topology 10.

FIG. 12 illustrates a selective pruning of selected paths 12 from the set 116 of serialized representations propagated in the topology control message 102 by network nodes within the loop-free routing topology 10, according to an example embodiment. The specific serialized arc formats 114 are omitted from FIG. 12 for simplicity, hence each arc is represented in FIG. 12 merely by its serialized arc identifier 122.

Operations 128a through 128m illustrate operation 118d of FIG. 11 executed by the different outputting network nodes. As illustrated with respect to operation 128a, there is no pruning performed in the output set of serialized arcs 116 when transmitting the topology control message 102 from the destination node (Ω=R) 14 to the nodes along the root arc "ARC2", namely from the destination node (Ω=R) 14 to either node "A" or "B", from node "A" to "C", from node "C" to node "F", from node "F" to node "J", etc. to node "B"; from node "B" to node "K", from node "K" to node "J", etc.

Hence, the topology control message 102 output from the destination node (Ω=R) 14 to node "A" is propagated around the arc "ARC2" 12, enabling each network node 16 node along the path ARC2" 12 in the first direction to update its label forwarding table with the source node's locally significant label O, and swap with a new locally significant label O' for use by the next hop node; similarly, the topology control message 102 output from the destination node (Ω=R) 14 to node "B" is propagated around the arc "ARC2" 12, enabling each network node 16 along the path "ARC2" 12 in the second direction to update its label forwarding table with the source node's locally significant label O", and swap with a new locally significant label O''' for use by the next hop node.

In contrast, the network nodes 16 in the routing arcs above the root arc "ARC2" 12 (identified by its serialized art identifier "J" 122) do not need the topology information for the root arc; hence, the network nodes "A", "C", and "F" can selectively prune the full set of serialized arcs 116a as illustrated in operations 128b, 128c, 128d, 128e. for example, in operation 128b the network nodes "A" and "C" can prune the serialized arcs "J" and "M" (as represented in FIG. 10) from the set of serialized arcs 116a, in order to send the pruned set 116b to the network node "D"; similarly, the network nodes "C" and "E" can prune in operation 128c the serialized arcs "J", "M", and "D" from the set of serialized arcs 116a, in order to send the pruned set 116c to the network node "E"; the network node "F" can prune in operation 128d the serialized arcs "J", "M", "D", "E1", and "E2" from the set of serialized arcs 116a, in order to send the pruned set 116d to the network node "H"; the network node "F" also can prune in operation 128e the serialized arcs "J", "M", "D", "E1", "E2", "H1", and "H2" from the set of serialized arcs 116a, in order to send the pruned set 116e to the network node "I".

Operations 128f through 128l illustrated further pruning that can be executed by other nodes in arcs that are above the root arc ARC2. Hence, each network node can selectively prune at least one of the serialized representations 114 from the received topology control message 102 based on the corresponding path 12 being positioned between the at least one network node and the destination network node 14, and output the modified (i.e., pruned) topology control message to another one of the network nodes away from the destination and the selectively pruned path.

Figure 13:
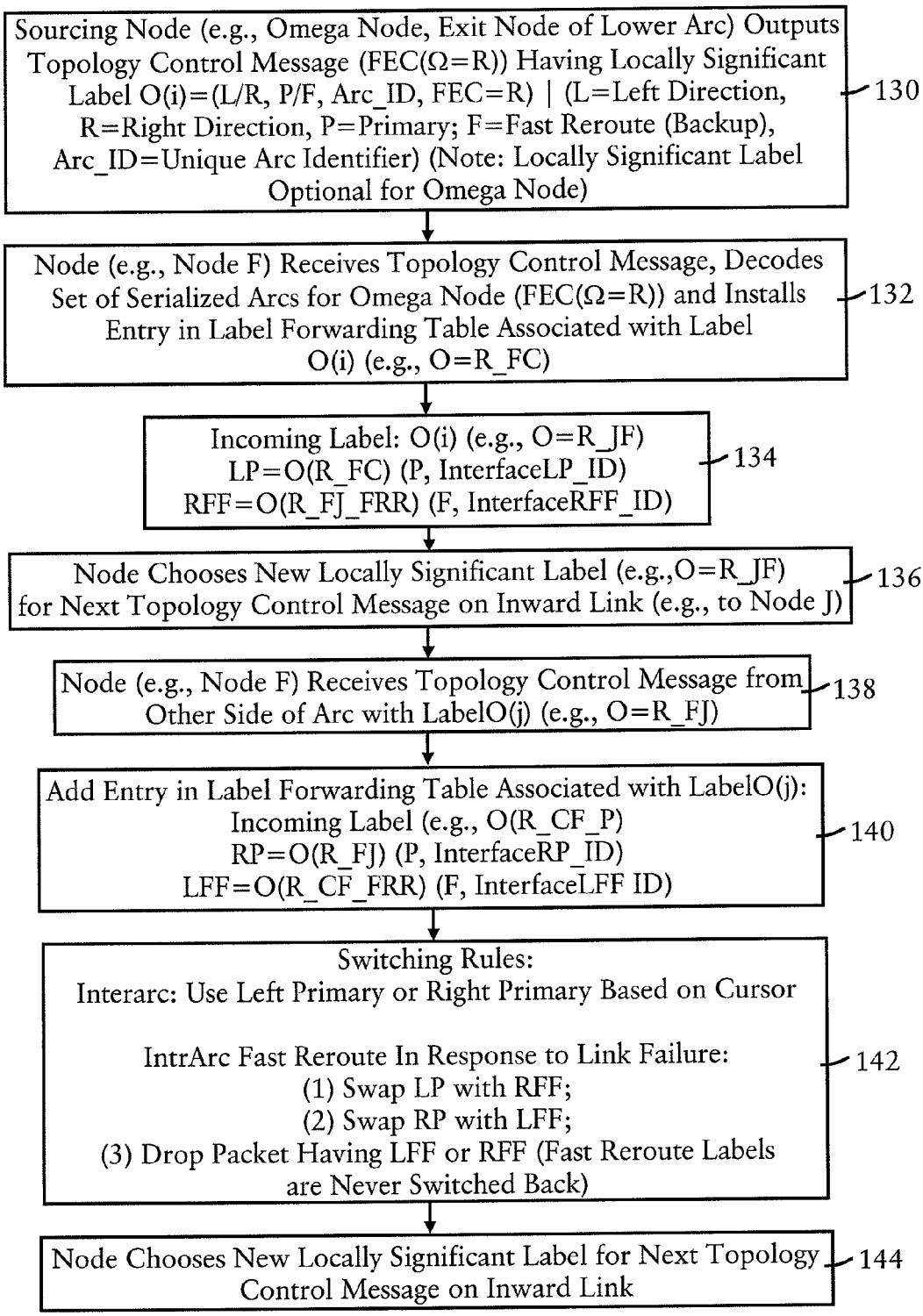
FIG. 13 illustrates an example method of the establishment of loop-free label switched paths by the network nodes receiving the set of serialized representations from the destination network node, according to an example embodiment.

FIG. 13 illustrates an example method of establishing the loop-free label switched paths by the network nodes receiving the set when 16 of serialized representations from the destination network node 14, according to an example embodiment.

As described previously, the sourcing network node (e.g., the destination node (Ω=R) 14 or an exit node of a lower routing arc 12) outputs a topology control message 102 specifying the forwarding equivalence class (FEC) for the destination node (Ω=R) 14; the topology control message 102 also specifies a locally significant label O that is unique for the sourcing node based on path direction, whether the path is the primary (default) path or a fast reroute (backup) path, arc identifier, and the forwarding equivalency class.

Assume the receiving network node that receives in operation 130 the topology control message 102 is node "F" that receives the topology control message from the node C: the topology control message specifies the label "O=R_FC" generated by the node "C" (i.e., for the FEC=R, output on link C-F in the "LEFT" direction from node F to node C). In response, the node "F" decodes in operation 132 the set of serialized arcs for the forwarding equivalence class and installs an entry in the label forwarding table associated with the locally significant label "O=R_FC" specified in the topology control message 102.

Figure 15:
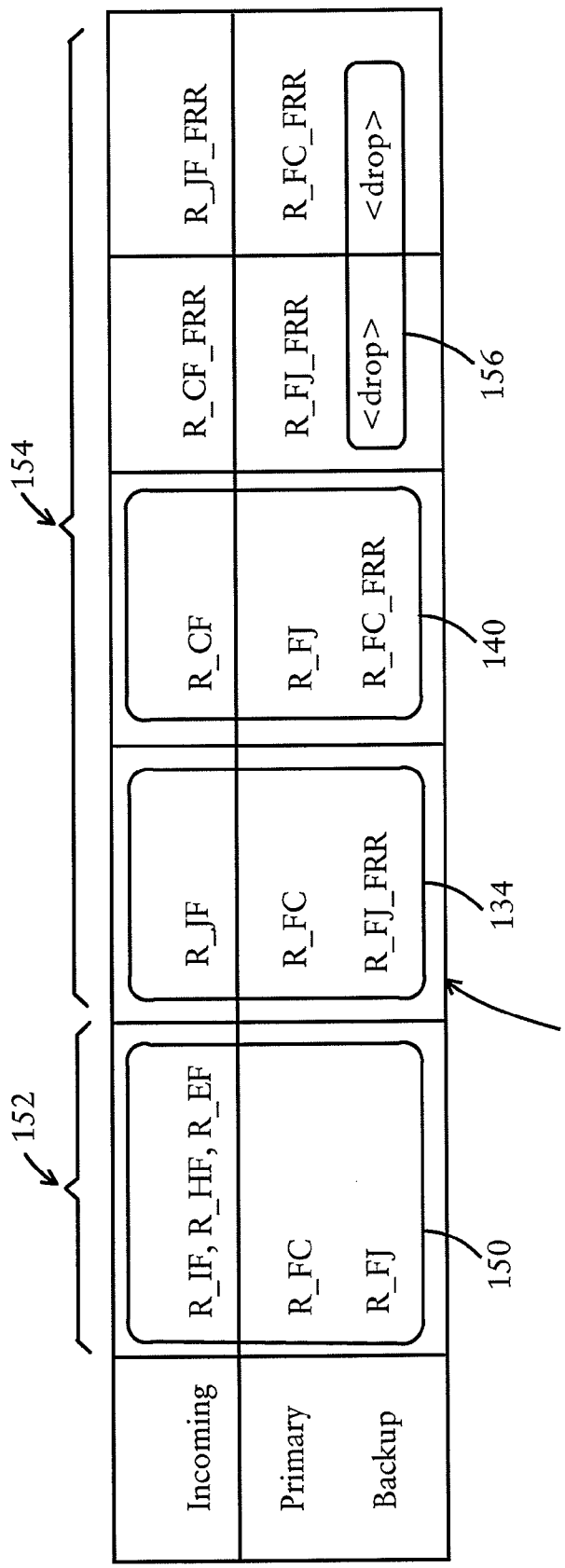
FIG. 15 illustrates an example label switched forwarding table built in one of the network nodes of FIG. 6I for routing at a primary hierarchal level, according to an example embodiment.

FIG. 15 illustrates an example label forwarding table 148 stored in the memory circuit 26 of the network node "F" 16, according to an example embodiment. In particular, the processor circuit 22 of the node "F" creates an entry in operation 134 of FIGS. 13 and 15, using the new label "O=R_JF" created by node "F" as an index: hence, any data packet received by node "F" (e.g., from node J) containing the label "O=R_JF" is swapped with the left primary swap label (LP) "O=R_FC" and output on the network interface identified as "InterfaceLP_ID" to the link F-C for switching to the node "C"; if the node "F" detects a failure on the link C-F, then fast reroute can be instantly implemented by swapping the label "O=R_JF" with the right-direction fast reroute (RFF) label "O=R_FJ_FRR" and outputting the packet on the interface "InterfaceRFF_ID" for transmission of the data packet via the link F-J back to the node "J".

The network node (e.g., "F") can choose in operation 136 a new locally significant label for each of the other next hop nodes that did not send the topology control message 102, and forward the topology control message on the inward links (e.g., F-J, F-I, F-H, or F-E). The relevant table entries also are created in operation 150 of FIG. 15. For example, the network node "F" would send to the network node "J" the topology control message 102 specifying the set of serialized representations, and the labels "O=R_JF" for the default path and "O=R_FJ_FRR" for the fast reroute (FRR) path.

Assuming in operation 138 that another topology control message 102 is received from the other side of the arc (e.g., "F" receives the message 102 from node "J" with the label "O=R_FJ"), the node "F" can add the corresponding entry in the label forwarding table in operation 140, including a right primary swap label (RP) and a left fast reroute (LFF), enabling association of the locally significant label (e.g., "O=R_CF") as described previously, but in the opposite direction.

The processor circuit 22 in each network node 16 also implements switching rules in operation 142, illustrated in FIG. 15 based on the incoming label. In particular, for Inter-arc switching 152, either the left primary or right primary labels may be used depending on the position of the network node relative to the arc cursor. For intra-arc (i.e. within the arc) switching 154, loop-free fast reroute is utilized in response to a detected local link failure: (1) a left primary (LP) label is swapped with a Right Fast Reroute (RFF) label; (2) a right primary (RP) label is swapped with a Left Fast Reroute (LFF) label; and (3) any received packet having a RFF label or LFF label is dropped to prevent the formation of a loop (156 of FIG. 15).

Hence, fast reroute is implemented instantly in response to a detected link failure: four label switched paths are maintained by each network node, namely: left-primary (in the left direction), right-fast reroute (in the right direction in response to a detected link failure for left-primary), right-primary (in the right direction), and left-fast reroute (in the left direction in response to a detected link failure for right-primary). Further, a fast reroute label state is propagated in the rerouted direction; hence, a second link failure in the same arc will cause the data packet to be dropped, avoiding the formation of a loop.

The topology control message received in operation 144 also is forwarded after a new locally significant label is chosen.

Hence, labels can be established within a routing topology that enables full redundancy in two connected graphs: a new label distribution protocol format is introduced that contains a new non-linear source route information to describe the routing arc topology. Each routing arc allows one link failure, hence the arc topology can support multiple concurrent link failures that might occur in different routing arcs. Further, the label distribution protocol can be deployed automatically and independently by the network nodes in the computing network.

Figure 16A:
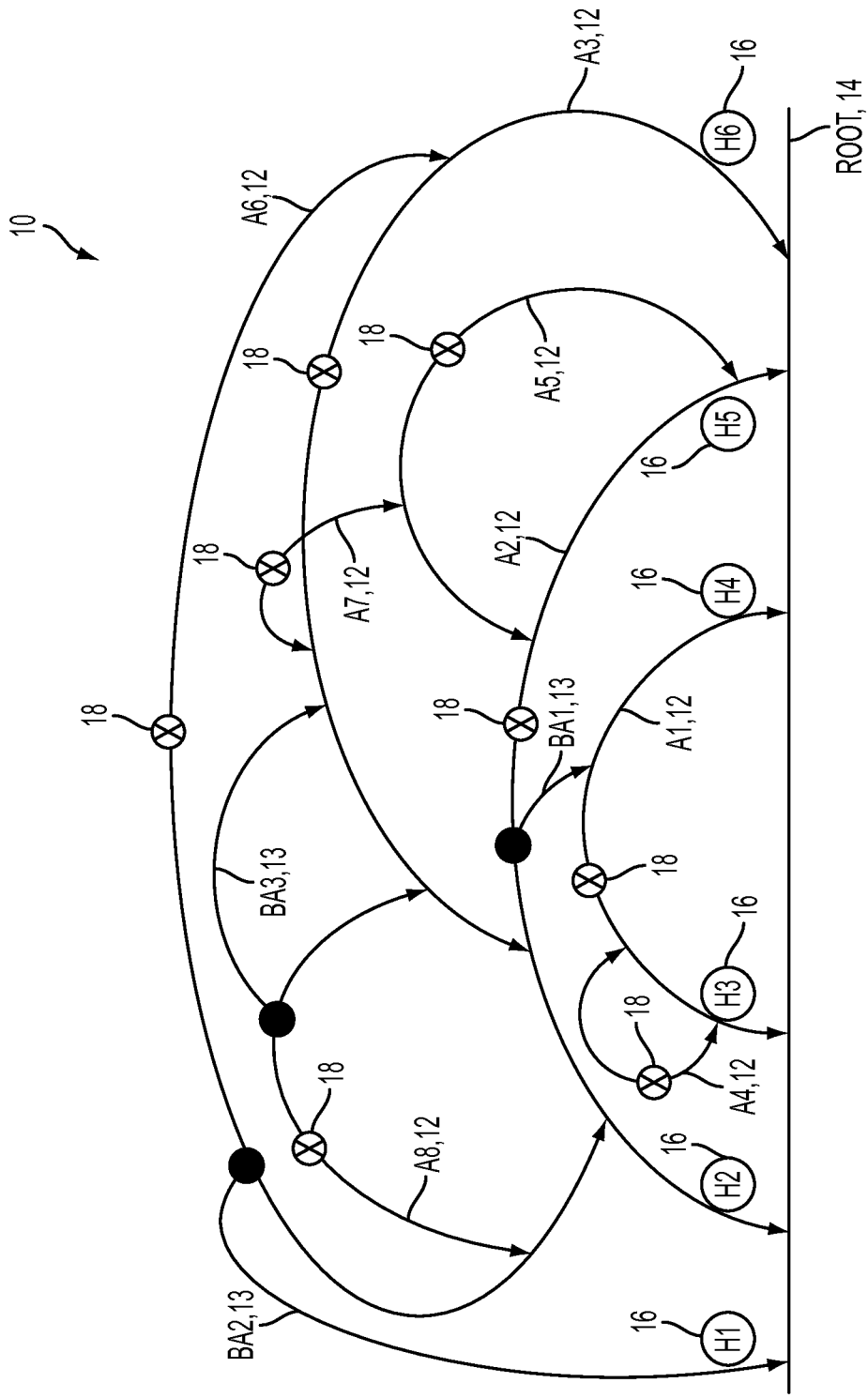
FIGS. 16A, 16B, and 16C illustrate example establishment of non-congruent paths in a loop-free routing topology having routing arcs, for bicasting of data packets toward a root node and/or multicasting data streams from the root node, according to an example embodiment.
Figure 16B:
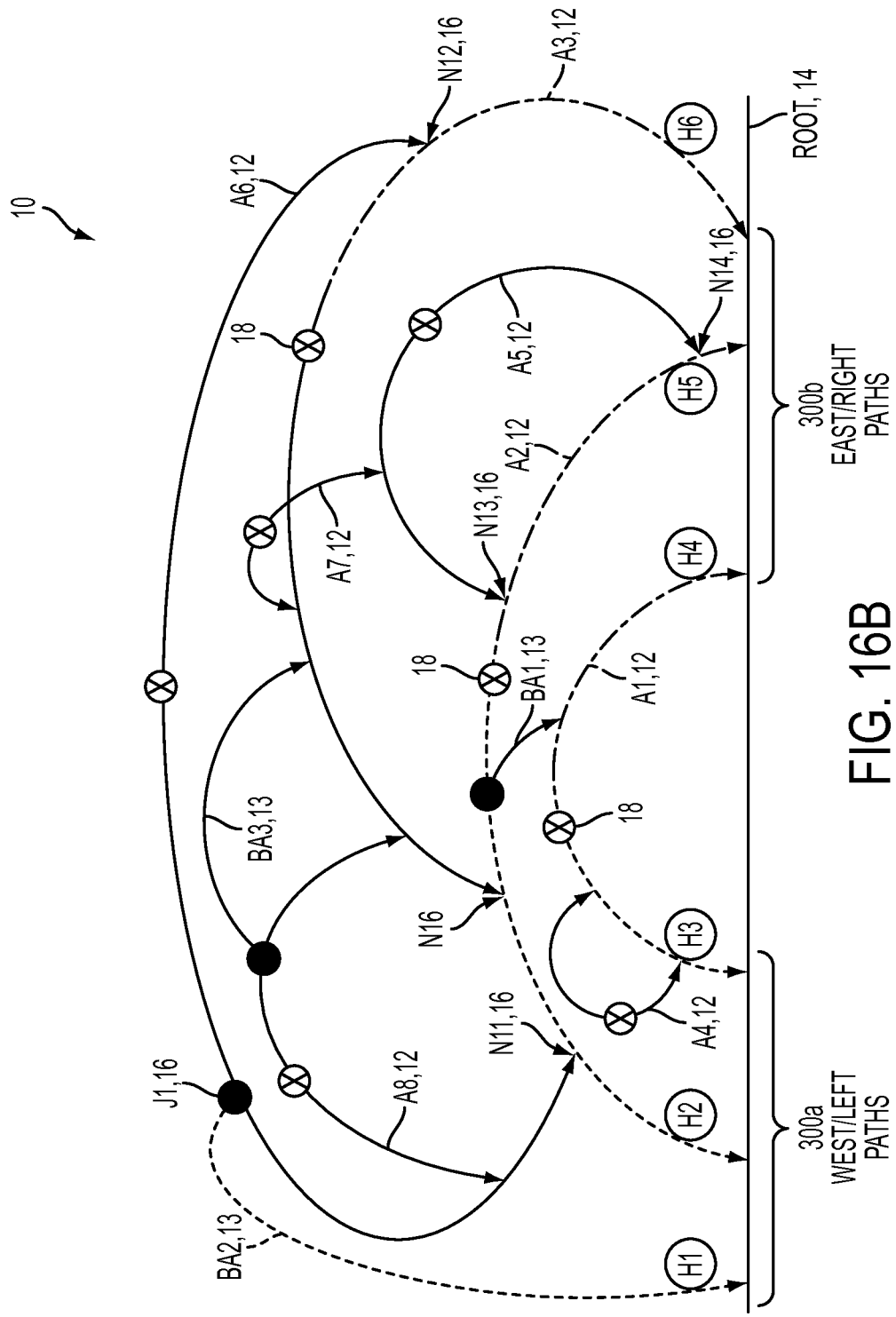
Figure 16C:
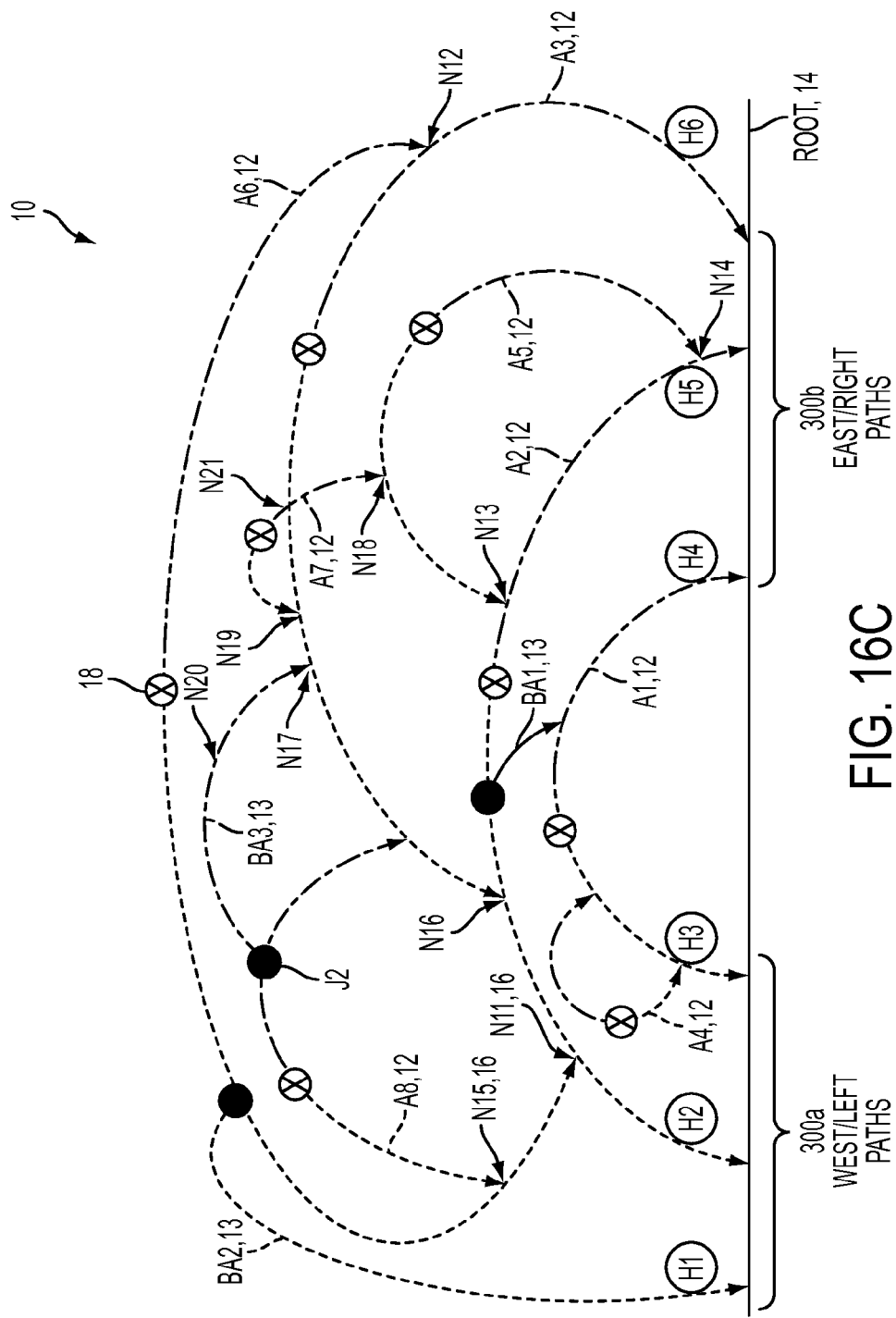

Creating Non-Congruent Paths in the Loop-Free Routing Topology Having Routing Arcs FIGS. 16A-16C illustrate creation of non-congruent paths 300a and 300b (illustrated in FIGS. 16B and 16C) in the loop-free routing topology 10 that enables bicasting of network traffic between a source network node and a destination network node 14, according to an example embodiment. The term "bicasting" refers to a network node within the loop-free routing topology 10 (e.g., a host network node such as a controller device, a sensor device, a user device, etc.) that outputs two data packets containing the same payload for delivery to a destination: one data packet is routed to a destination via a first multi-hop network path to the destination, and a bicasted copy of the data packet is routed to the destination via a second multi-hop network path that is distinct from the first multi-hop network path. Bicasting is effective in deployments where reliability and timeliness must be guaranteed. Bicasting also can be used in video distribution.

As an example of bicasting, a single packet could be routed via the routing arcs 12 along the shortest path to the destination network node (i.e., "root") 14, based on the above-described routing of traffic away from the arc cursor 18; however any such routing of a data packet may require utilizing fast reroute to reverse the flow for the data packet in response to a failure in the network topology.

According to an example embodiment, the non-congruent paths 300a and 300b guarantee that no single point of failure within the loop-free routing topology 10 will cause a disruption in any network traffic that is concurrently transmitted (e.g., bicasting) via the two or more non-congruent paths. In particular, bicasted data packets are routed via the non-congruent paths 300a and 300b and independent of the arc cursors 18, to guarantee that even with a breakage in the network topology two non-congruent paths can be maintained.

FIG. 16A illustrates the loop-free routing topology 10 comprising the routing arcs "A1", "A2", "A3", "A4", "A5", "A6", "A7", and "A8" 12, and the buttressing arcs "BA1", "BA2", and "BA3" 13, prior to assignment of any routing arc to any non-congruent path: any unassigned routing arc 12 or buttressing arc 13 is illustrated in FIGS. 16A-16C as a solid line. FIG. 16B illustrates initial formation of the non-congruent path 300a within the routing arcs "A1" and "A2" and the buttressing arc "BA2", where each non-congruent path 300a is illustrated as a dashed line; FIG. 16B also illustrates initial formation of the non-congruent path 300b within the routing arcs "A1", "A2" and "A3", where each non-congruent path 300b is illustrated as a long-dashed and short-dashed line (with alternating long-dash and short-dash). FIG. 16C illustrates the completed formation of the non-congruent paths 300a and 300b within the routing topology 10.

FIGS. 14 and 16A-16C each illustrate a routing arc 12 joined with a single buttressing arc 13. However, any number of buttressing arcs 13 may be joined with a routing arc 12 at the same junction node or a different junction node, enabling the formation of a comb structure comprising a single routing arc and multiple buttressing arcs joined to the routing arc.

As described in further detail below, each bicasted data packet includes a tag that specifies or identifies the direction that the data packet is to be transmitted, namely along either the non-congruent path 300a or 300b: if a data packet includes a tag specifying the "West/Left" path 300a, the data packet is forwarded along the non-congruent path 300a, whereas the bicasted copy of the data packet having the tag specifying the "East/Right" path 300b will be forwarded along the non-congruent path 300b. As described below, a data packet also can be forwarded away from the non-congruent path (e.g. 300a) toward the arc cursor 18 if the corresponding tag specifies the opposite direction (e.g., 300b). Consequently, the bicasting data packets are routed to the non-congruent paths 300a and 300b based on the directions as specified by the tags, respectively.

Hence, a data packet does not need to be reversed (using fast rerouting) in response to a detected failure within a first path (e.g., 300a) of the loop-free routing topology, as the second non-congruent path (e.g., 300b) can provide the concurrently-transmitted packet between the source and destination. As described below, fast rerouting can be used in response to detected collisions either during formation of the non-congruent paths, or during establishment of non-congruent multicast paths for transmitting multicast streams from the multicast source (i.e., the root) 14 to one or more network nodes in the loop-free routing topology 10 that have subscribed to the multicast streams.

Figure 17:
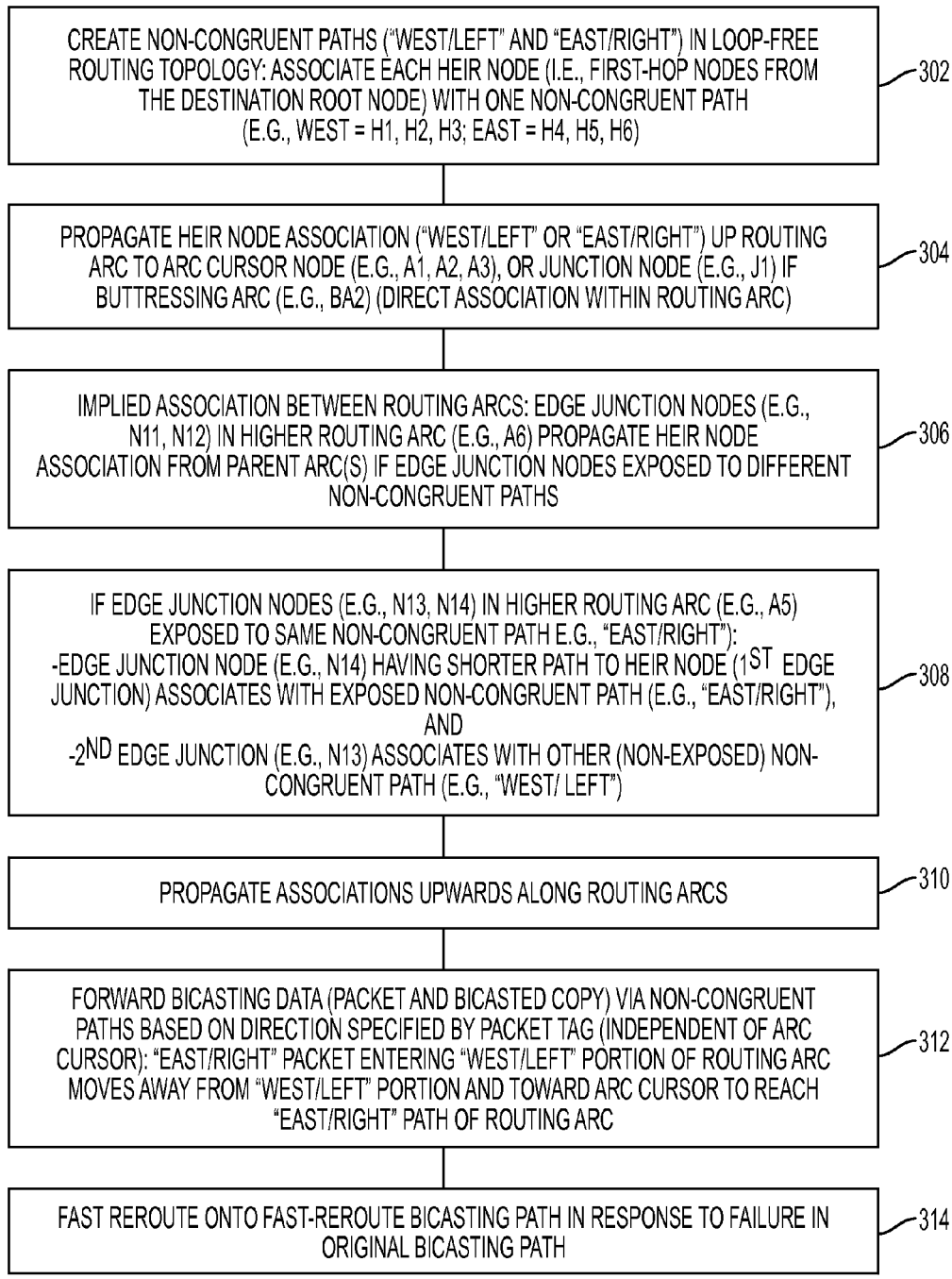
FIG. 17 illustrates an example method of creating the non-congruent paths in the loop-free routing topology of FIGS. 16A-16C, according to an example embodiment.
Figure 18:
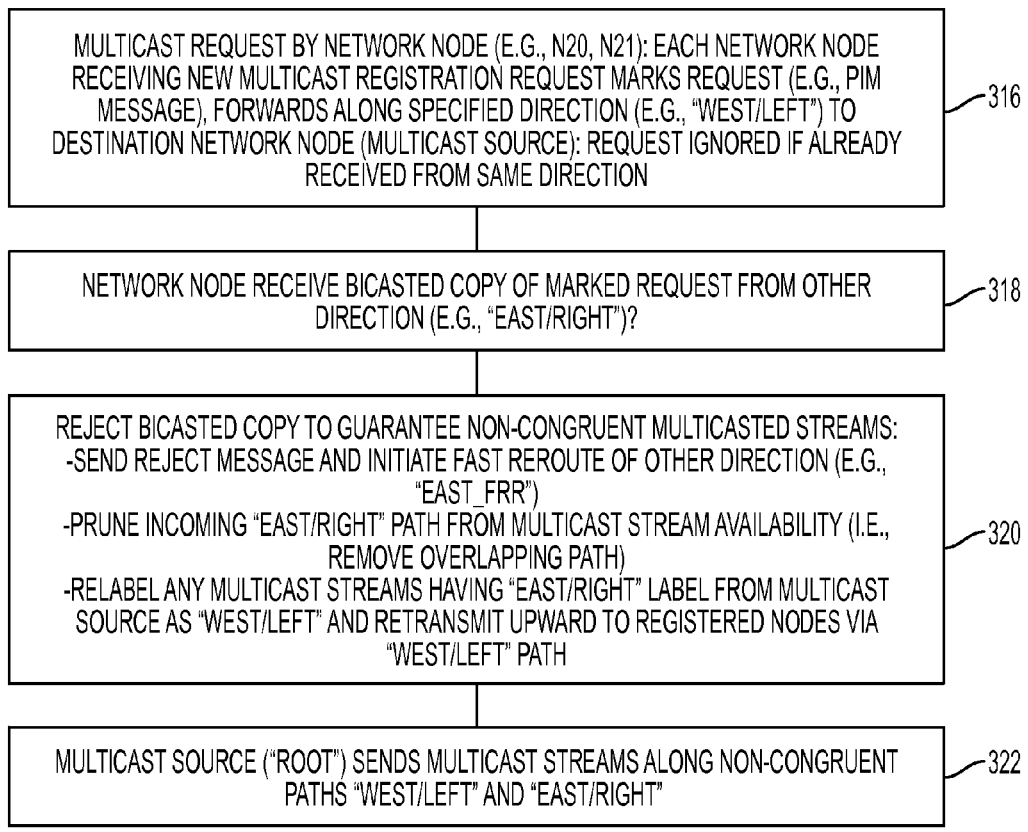
FIG. 18 illustrates an example registration by network nodes, and multicasting by a multicast source, via the non-congruent paths of FIGS. 16A-16C, according to an example embodiment.

FIG. 17 illustrates an example method of creating non-congruent paths 300a and 300b in the loop-free routing topology 10, according to an example embodiment. FIG. 18 illustrates example multicast registration by network nodes using the non-congruent paths 300a and 300b in the loop-free routing topology 10, and multicasting via non-congruent multicast paths established based on the non-congruent paths 300a and 300b, according to an example embodiment. Each of the disclosed operations with respect to FIG. 17 and FIG. 18 can be executed by the processor circuit 22 of the apparatus 20, or any logic encoded on a tangible computer readable storage medium, as described previously.

The processor circuit 22 can create non-congruent paths 300a and 300b within the loop-free routing topology 10 based on execution of operations 302, 304, 306, 308, and 310 of FIG. 17. The processor circuit 22 can begin creation of the non-congruent paths based on associating each heir network node (i.e., each first hop node from the destination root node 14) in operation 302 to one and only one non-congruent path 300a or 300b. For example, FIG. 16B illustrates the processor circuit 22 associating the heir network nodes "H1", "H2", and "H3" with the "West/Left" non-congruent path 300a, and the heir network nodes "H4", "H5", and "H6" with the "East/Right" non-congruent path 300b.

The processor circuit 22 in operation 304 propagates the association of each heir network node along the corresponding routing arc 12 toward the corresponding network node having possession of the arc cursor 18 in a routing arc 12, or alternately toward the junction node of a buttressing arc. For example, the association of the heir network node "H2" to the non-congruent path 300a is propagated up along the routing arc "A2" toward the corresponding arc cursor 18, causing all network nodes that are along the routing arc "A2" in between the heir network node "H2" and the arc cursor 18 (e.g., network nodes "N11" and "N16") to be associated with the non-congruent path 300a. Similarly, the association of the heir network node "H5" to the non-congruent path 300b is propagated up along the routing arc "A2" toward the corresponding arc cursor 18, causing all network nodes that are along the routing arc "A2" in between the heir network node "H5" and the arc cursor 18 (e.g., network nodes "N14" and "N13") to be associated with the non-congruent path 300b. Similar associations are propagated in the routing arc "A1". Both the routing arcs "A1" and "A2" are root arcs having their ends of the routing arcs as the first hop heir network nodes, such that all of the network nodes in the root arcs "A1" and "A2" have a direct association with one of the heir network nodes. The association of the heir network node "H6" to the non-congruent path 300b is propagated in operation 304 up the routing arc "A3" up to the corresponding arc cursor 18. The association of the heir network node "H1" to the non-congruent path 300a is propagated up the entire buttressing arc "BA2" 13 up to and including the edge junction node "J1" 16.

The processor circuit 22 in operation 306 performs implied association between the routing arcs based on selectively propagating the association along a routing arc to another higher routing arc via the network nodes that serve as edge junctions between the lower (parent) routing arc and the higher routing arc. In particular, edge junction nodes (e.g., "N11" and "N12") of a higher routing arc (e.g., "A6") propagate the heir node association from the parent arcs if the edge junction nodes (e.g., "N11" and "N12") are exposed to different non-congruent paths. As illustrated in FIG. 16B, the edge junction node "N11" of the routing arc "A6" is exposed to the "West/Left" non-congruent path 300a of the parent routing arc "A2", whereas the complementary edge junction node "N12" of the routing arc "A6" is exposed to the "East/Right" non-congruent path 300b of the parent routing arc "A3". Hence, the heir node associations from the parent arcs can be propagated along the routing arc "A6" up to the corresponding arc cursor 18, where the processor circuit 22 causes the network node "N11" to propagate the association to the non-congruent path 300a up the routing arc "A6" to the corresponding arc cursor 18, and causes the network node "N12" to propagate the association to the non-congruent path 300b up the routing arc "A6" to the corresponding arc cursor 18.

The selective propagation of the associations along a routing arc also includes the processor circuit 22 in operation 308 resolving any "collisions" if edge junction nodes (e.g., "N13", "N14") in a higher routing arc (e.g., "A5") are joined to the same non-congruent path 300b via the at least one lower routing arc (e.g., "A2") providing reachability to the destination network node 14. The processor circuit 22 associates the edge junction node (e.g., "N14") having the shorter path to an heir network node "H5" with the exposed non-congruent path 300b, and associates the second edge junction (e.g., "N13") (that is further than "N14" to any heir network node) with the other (non-exposed) non-congruent path 300a, enabling the routing arc "A5" to have edge junctions "N13" and "N14" providing reachability to the non-congruent paths 300a and 300b, respectively.

The processor circuit 22 can continue in operation 310 the propagation of associations of the non-congruent paths 300a or 300b upward along the routing arcs 12, resulting in the complete association of all the routing arcs in FIG. 16C to either the non-congruent path 300a or the non-congruent path 300b.

Figure 19:
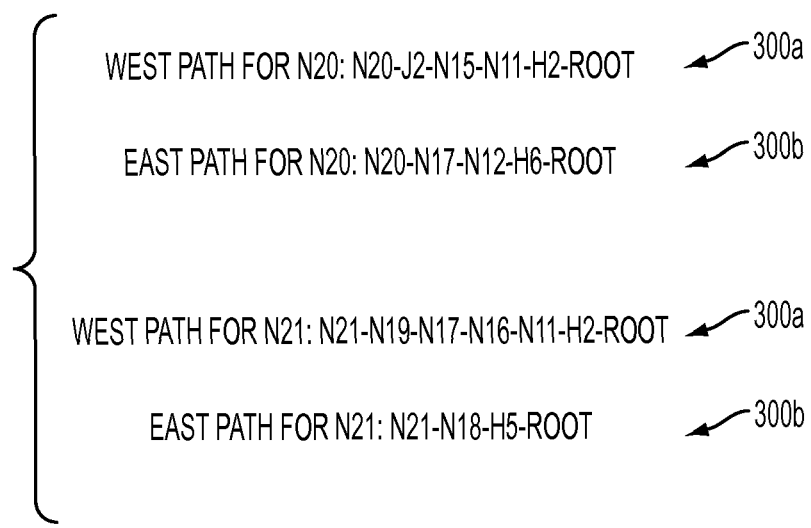
FIG. 19 illustrates example non-congruent paths used by network nodes in the loopfree routing topology of FIGS. 16A-16C for bicasting data packets, and for use in multicasting by the multicast source, according to an example embodiment.

Hence, the processor circuit 22 enables any network node in the loop-free routing topology 10 to utilize the non-congruent paths 300a and 300b in operation 312 for forwarding bicasting data via the non-congruent paths 300a and 300b. As illustrated in FIGS. 16C and 19, a network node "N20" in the buttressing arc "BA3" 13 can output a data packet having a tag specifying the "West/Left" path 300a, causing the network nodes in the loop-free routing topology 10 to forward the data packet via the non-congruent path 300a that includes the network nodes "J2" (via buttressing arc "BA3"), "N15" (via routing arc "A8"), "N11" (via routing arc "A6"), "H2" (via routing arc "A2"), to the root network node 14. Similarly, the network node "N20" can output a bicasted copy of the data packet having a complementary tag specifying the "East/Right" path 300b, causing the network nodes in the loop-free routing topology 10 to forward the bicasted copy via the non-congruent path 300b that includes the network nodes "N17" (via buttressing arc "BA3"), "N12" and "H6" (via routing arc "A3"), to the root network node 14. FIGS. 16C and 19 also illustrate bicasting by the network node "N21" along the non-congruent paths 300a and 300b.

Hence, the bicasting by the network nodes "N20" and "N21" via the non-congruent paths 300a and 300b guarantee that at least one of the bicasted data packets will reach the destination root 14. If the processor circuit 22 determines that a particular path along one of the routing arcs encounters a failure, the processor circuit 22 can execute a fast reroute onto a fast reroute bicasting path in operation 314, to establish an alternate non-congruent path, if needed. As described below, the multicast source 14 can also use the non-congruent paths 300a and 300b as illustrated in FIG. 19 as non-congruent multicast paths for multicast traffic to the nodes "N20" and "N21".

FIG. 18 illustrates the processor circuit 22 establishing in operation 316 non-congruent multicast paths utilizing the non-congruent paths 300a and 300b, according to an example embodiment. As described with respect to operation 312 and FIG. 19, if the data packet that is bicasted contains a multicast request generated by the network node (e.g., "N20" or "N21"), each network node along the non-congruent path 300a or 300b can mark the new multicast registration request (implemented, for example, as a protocol independent multicast (PIM) message) in a local routing table, for example by the incoming link identifier, direction identifier (identifying the path 300a or 300b), and multicast identifier. Assuming a given network node has not already received the multicast registration request from the same direction (e.g., "West/Left"), the multicast request is forwarded along the specified non-congruent path 300a or 300b. If the network node has already received a multicast registration request for the same direction (e.g., "West/Left"), the multicast registration request can be disregarded as redundant in view of the multicast registration request previously stored in the local routing table.

As apparent from the foregoing, multiple network nodes may initiate their own multicast registration requests for consumption of the multicast stream to be transmitted by the multicast source 14. Hence, instances may arise where a single network node (e.g., "N13") may receive in operation 318 another multicast request for the same multicast stream, but for a different direction (e.g., "East/Right"): this "collision" can occur if multicast requests are crossing the same routing arc 12 via different entry points from higher routing arcs; this "collision" also can occur if multicast requests from different sets of higher routing arcs exit into the same junction node of a parent routing arc. In both cases, the processor circuit 22 in operation 320 can cause the network node (e.g., "N13") to detect that the second bicasted copy of the multicast registration requests that specifies the conflicting direction "East/Right", and in response cause the network node (e.g., "N13") to reject the bicasted copy that caused the collision by sending a reject message back and initiating a fast reroute for the conflicting direction (e.g., "East_FRR") to the upstream network node that caused the collision (e.g., "N18"); the processor circuit 22 also can cause the network node (e.g., "N13") to prune the incoming "East/Right" path from the multicast stream availability in order to remove the overlapping path. Further, the processor circuit 22 can cause the network node (e.g., "N13") to relabel any multicast streams from the root 14 having the conflicting "East/Right" label to be re-labeled as the registered non-congruent path 300a, for retransmissions upward to the registered nodes via the registered non-congruent path 300a. Hence, the network node (e.g., "N13") maintains the non-congruent path only for the first registered direction 300a, rejects any requests in the conflicting direction 300b, and relabels any media streams specifying the conflicting direction 300b to the registered direction 300a to guarantee non-congruency of the multicast path. The network node that initially transmitted the conflicting multicast registration request (e.g., "N18") can respond to the reject message specifying the fast reroute direction (e.g., "East_FRR") by establishing an alternate non-congruent path for reaching the destination 14, and pruning the link providing the reject message to prevent any further multicast conflicts in the conflicting direction.

Figure 20A:
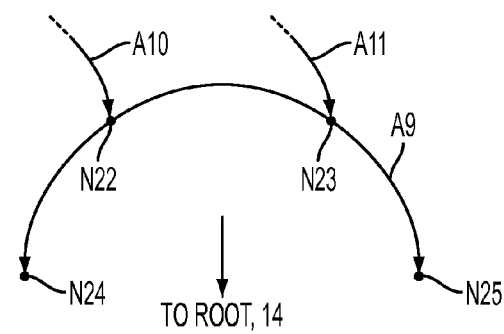
FIGS. 20A and 20B illustrate additional routing arcs having network nodes executing collision avoidance for establishing non-congruent multicast paths for multicast streams, according to an example embodiment.

The following examples can further illustrate the collision mediation of multiple multicast registration request from different directions. Referring to FIG. 20A, assume in a first example that the network node "N22" receives a first multicast registration request "R1" (for the "East/Right" direction) from the routing arc "A10" 12, marks the first multicast registration request "R1" in its local (internal) routing table, and forwards the first multicast registration request "R1" along the routing arc "A9" toward the network node "N23" for exiting the right-hand side exit node of the routing arc A9 (operations 316 and 318 for network node "N22"). Assume further the network node "N23" receives a second multicast registration request "R2" from the routing arc "A11" for the same multicast stream as the first multicast registration request, except for the second multicast registration request specifying the "West/Left" direction: the network node "N23" marks the second multicast registration request "R2" in its local (internal) routing table, and forwards the second multicast registration request "R2" to the network node "N22".

In response to the network node "N22" receiving in operation 318 the second multicast registration request "R2" from the network node "N23", the network node "N22" detects the collision based on detecting the second multicast registration request "R2" specifies the "West/Left" direction in conflict with the "East/Right" direction marked for the previously-received first multicast registration request "R1" from the routing arc "A10" 12. In response, the network node "N22" forwards the second multicast registration request "R2" along the arc "A9" to the network node "N24" and marks the second multicast registration request "R2": as described below, the marking of the second registration request "R2" enables the network node "N22" to identify that relabeling of a multicast stream from "West/Left" to "East/Right" may be needed. The network node "N2" also can execute collision resolution based on sending a path unavailability message to the network node "N23", specifying the path from network node "N23" to "N22" is not available for servicing the second multicast registration request "R2" for the "West/Left" direction. The network node "N22" also can perform collision mediation by pruning the incoming path (from node "N23" along arc A9) from multicast availability to remove the overlapping path for the specified multicast stream.

The network node "N23" can receive, mark, and forward the first multicast registration request "R1" along the routing arc "A9" to the exit network node "N25: the marking of "R1" and "R2" having conflicting directions enables the network node "N23" to detect the collision, and in response prune the path between nodes "N22" and "N23" along the routing arc "A9", and perform any relabeling of multicast streams, described below. The network node "N23" also can respond to the path unavailability message indicating unavailability of the path between "N23" and "N22" by pruning the path (from node "N23" along arc A9 to node "N22") from multicast availability for the specified multicast stream. Hence, the network node "N23" can perform collision resolution either based on the path availability message, and/or based on detecting the conflicting directions between the requests "R1" and "R2", depending on the order in which the messages "R1", "R2", and/or the path unavailability message are received by the network node "N23".

Hence, the network node "N22" receives the multicast stream (labeled "West/Left") via node "N24" for propagation to the arc "A10" after relabeling as "East/Right"; and the network node "N23" receives the multicast stream (labeled "East/Right") via the network node "N25" for propagation to the arc "A11" after relabeling as "West/Left". Hence, the network nodes "N22" and "N23" perform collision mediation to guarantee the non-congruency of the multicast streams, based on pruning the overlapping path along the routing arc "A9" between the network nodes "N22" and "N23".

Figure 20B:
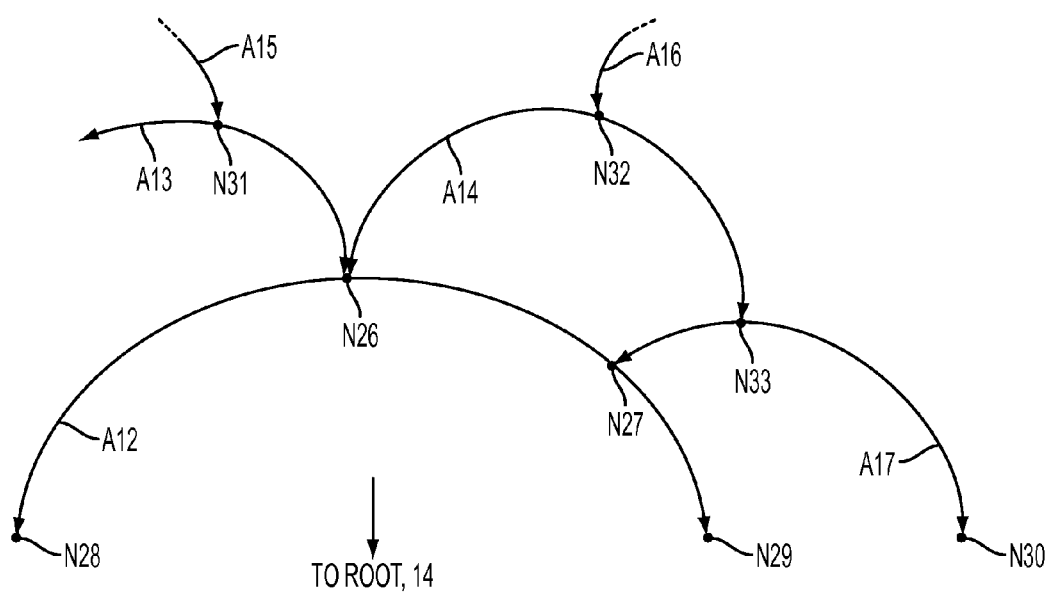

FIG. 20B illustrate another collision mediation example, where multicast registration packets for different directions from routing arcs "A13" and "A14" are received by the network node "N26". Assume the network node "N26" receives from the network node "N31" (from routing arc "A15") via the routing arc "A13" a first multicast registration request "R1" specifying a first direction (e.g., "East/Right"), causing the network node "N26" to mark and forward the request "R1" toward the network node "N27" along arc "A12" for delivery to the destination 14 via the network node "N29". In response to the network node "N26" receiving a second multicast registration request "R2" specifying a conflicting direction (e.g., "West/Left") from the network node "N32" via arc A14 (received from arc A16), the network node "N26" can execute collision mediation by sending a reject message of the second multicast registration request "R2" back to the node "N32", and the network node "N26" pruning the path between "N26" and "N32" via "A14" for the "West/Left" direction. The network node "N32" forwards the second multicast registration request "R2" (specifying "West/Left") using its fast reroute path along the arc "A14" to the exit node "N33". If the exit node "N33" cannot forward the second multicast request to the exit node "N30" along arc "A17" using the "West/Left" direction label, the exit node "N33" can "recolor" (i.e., relabel) the direction to another direction that is different than the original "West/Left" direction label, and forward the second multicast request to the network node "N30". Collision mediation can be repeated, as needed, by downstream network nodes until the multicast registration requests are received by the destination 14.

Hence, the network nodes of FIG. 20B can establish a first multicast stream from the root 14 upwards via the network nodes "N29", "N27", "N26", and "N31", and a second non-congruent multicast stream via the network nodes "N30", "N33", and "N32". Relabeling (recoloring) can be performed at any nodes to resolve any rerouting that was required for collision avoidance.

Hence, the multicast source 14 can send the multicast streams along the non-congruent multicast paths in operation 322 based on the collision resolution implemented in the network nodes 16 forwarding the registration requests to the multicast source 14. Hence, the collision resolution guarantees the non-congruency of the multicast paths.

According to example embodiments, non-congruent paths are established for bicasting data within a computing network having a loop-free routing topology. The non-congruent paths also can be utilized for establishing non-congruent multicast paths based on forwarding the multicast requests along the non-congruent paths, and applying collision resolution to guarantee no single point of failure can adversely affect reception of the multicast streams by any network node in the loop-free routing topology. Further, fast reroute can be employed for instantaneous collision resolution with respect to any single node receiving requests utilizing conflicting paths.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
creating, in a computing network, a loop-free routing topology comprising a plurality of routing arcs for reaching a destination network node, each routing arc comprising a first network node as a first end of the routing arc, a second network node as a second end of the routing arc, and at least a third network node configured for routing any network traffic along the routing arc toward the destination network node via any one of the first or second ends of the routing arc, the loop-free routing topology providing first and second non-congruent paths; and
forwarding bicasting data, comprising a data packet in a first direction from a network node and a bicasted copy of the data packet in a second direction from the network node, concurrently to the destination network node respectively via the first and second non-congruent paths;
wherein the creating includes:
associating first-hop nodes, that are one hop from the destination network node, as belonging to one of the first non-congruent path or the second non-congruent path, and propagating the association of each first-hop node along the corresponding routing arc toward one of the corresponding third network node, or a junction node of a buttressing arc;

wherein at least one of the routing arcs is a root arc having the corresponding first network node as the first-hop node belonging to the first non-congruent path and the corresponding second network node as the corresponding first-hop node belonging to the second non-congruent path, the third network node of the at least one routing arc having possession of an arc cursor for controlling the network traffic along the corresponding at least one routing arc via the respective first or second non-congruent paths of the corresponding routing arc.

2. The method of claim 1, wherein the creating further includes selectively propagating the association along the corresponding routing arc to a second routing arc via the corresponding first network node serving as an edge junction node between the second routing arc and the corresponding routing arc, for propagation along the second routing arc of the association to the one non-congruent path.

3. The method of claim 2, wherein the selectively propagating includes:
identifying that the first network node and the second network node of the second routing arc are joined to the first non-congruent path via at least one lower routing arc providing reachability to the destination network node;
associating the first network node of the second routing arc with the first non-congruent path based on determining the first network node has a shorter path to the destination network node via the first non-congruent path than the corresponding second network node via the first non-congruent path;
associating the second network node of the second routing arc with the second non-congruent path based on the corresponding first network node associating with the first non-congruent path;
propagating along the second routing arc the respective associations of the first and second network nodes.

4. The method of claim 1, wherein the forwarding includes:
forwarding the data packet in the first direction along the first non-congruent path via one of the routing arcs, in response to detecting a tag in the data packet identifying the first direction; and
forwarding the bicasted copy of data packet away from the first direction along the first non-congruent path and toward the second non-congruent path, in response to detecting the tag in the bicasted copy of the data packet identifying the second direction.

5. The method of claim 4, wherein the forwarding includes switching the bicasted copy to a fast-reroute path for the second non-congruent path in response to detecting a failure in the routing topology along the second non-congruent path.

6. A method comprising:
creating, in a computing network, a loop-free routing topology comprising a plurality of routing arcs for reaching a destination network node, each routing arc comprising a first network node as a first end of the routing arc, a second network node as a second end of the routing arc, and at least a third network node configured for routing any network traffic along the routing arc toward the destination network node via any one of the first or second ends of the routing arc, the loop-free routing topology providing first and second non-congruent paths;
forwarding bicasting data, comprising a data packet in a first direction from a network node and a bicasted copy of the data packet in a second direction from the network node, concurrently to the destination network node respectively via the first and second non-congruent paths; and
sending multicast streams from the destination network node to the network node, via first and second non-congruent multicast paths, in response to the destination network node receiving the data packet and the bicasted copy each containing a multicast registration request, each network node along one of the first or second non-congruent multicast paths marking the multicast registration request in response to reception thereof.

7. The method of claim 6, further comprising establishing the first and second non-congruent multicast paths based on:
forwarding the multicast registration request from the network node along the first and second non-congruent paths based on the data packet specifying the first direction and the bicasted copy specifying the second direction, respectively;
executing collision resolution in a fourth network node in response to the fourth network node encountering a collision based on receiving the multicast registration request for the first direction and the second direction, including:
rejecting the bicasted copy containing the multicast registration request from the second direction and having caused the collision, and
relabeling by the fourth network node any multicasted stream specifying the second direction with the first direction, and forwarding the relabeled multicasted stream along the first non-congruent path for delivery to the network node.

8. An apparatus comprising:
a processor circuit configured for creating, in a computing network, a loop-free routing topology comprising a plurality of routing arcs for reaching a destination network node, each routing arc comprising a first network node as a first end of the routing arc, a second network node as a second end of the routing arc, and at least a third network node configured for routing any network traffic along the routing arc toward the destination network node via an one of the first or second ends of the routing arc, the loop-free routing topology providing first and second non-congruent paths; and
a network interface circuit configured for causing forwarding of bicasting data, comprising a data packet in a first direction from a network node and a bicasted copy of the data packet in a second direction from the network node, concurrently to the destination network node respectively via the first and second non-congruent paths;
wherein the processor circuit is configured for creating the first and second non-congruent paths based on:
associating first-hop nodes, that are one hop from the destination network node, as belonging to one of the first non-congruent path or the second non-congruent path; and
causing propagating of the association of each first-hop node along the corresponding routing arc toward one of the corresponding third network node, or a junction node of a buttressing arc;
wherein at least one of the routing arcs is a root arc having the corresponding first network node as the first-hop node belonging to the first non-congruent path and the corresponding second network node as the corresponding first-hop node belonging to the second non-congruent path, the third network node of the at least one routing arc having possession of an arc cursor for controlling the network traffic along the corresponding at least one routing arc via the respective first or second non-congruent paths of the corresponding routing arc.

9. The apparatus of claim 8, wherein the processor circuit further is configured for selectively propagating the association along the corresponding routing arc to a second routing arc via the corresponding first network node serving as an edge junction node between the second routing arc and the corresponding routing arc, for propagation along the second routing arc of the association to the one non-congruent path.

10. The apparatus of claim 9, wherein the processor circuit is configured for:
identifying that the first network node and the second network node of the second routing arc are joined to the first non-congruent path via at least one lower routing arc providing reachability to the destination network node;
associating the first network node of the second routing arc with the first non-congruent path based on determining the first network node has a shorter path to the destination network node via the first non-congruent path than the corresponding second network node via the first non-congruent path;
associating the second network node of the second routing arc with the second non-congruent path based on the corresponding first network node associating with the first non-congruent path;
propagating along the second routing arc the respective associations of the first and second network nodes.

11. The apparatus of claim 8, wherein the processor circuit is configured for causing:
forwarding the data packet in the first direction along the first non-congruent path via one of the routing arcs, in response to detection of a tag in the data packet identifying the first direction; and
forwarding the bicasted copy of data packet away from the first direction along the first non-congruent path and toward the second non-congruent path, in response to detecting the tag in the bicasted copy of the data packet identifying the second direction.

12. The apparatus of claim 11, wherein the forwarding includes switching the bicasted copy to a fast-reroute path for the second non-congruent path in response to detecting a failure in the routing topology along the second non-congruent path.

13. An apparatus comprising:
a processor circuit configured for creating, in a computing network, a loop-free routing topology comprising a plurality of routing arcs for reaching a destination network node, each routing arc comprising a first network node as a first end of the routing arc, a second network node as a second end of the routing arc, and at least a third network node configured for routing any network traffic along the routing arc toward the destination network node via an one of the first or second ends of the routing arc, the loop-free routing topology providing first and second non-congruent paths; and
a network interface circuit configured for causing forwarding of bicasting data, comprising a data packet in a first direction from a network node and a bicasted copy of the data packet in a second direction from the network node, concurrently to the destination network node respectively via the first and second non-congruent paths;
wherein the processor circuit is configured for causing multicast streams from the destination network node to be sent to the network node, via first and second non-congruent multicast paths, in response to the destination network node receiving the data packet and the bicasted copy each containing a multicast registration request, each network node along one of the first or second non-congruent multicast paths marking the multicast registration request in response to reception thereof.

14. The apparatus of claim 13, wherein the processor circuit is configured for causing the first and second non-congruent multicast paths to be established based on:
the multicast registration request being forwarded from the network node along the first and second non-congruent paths based the data packet specifying the first direction and the bicasted copy specifying the second direction, respectively;
causing collision resolution to be executed in a fourth network node in response to the fourth network node encountering a collision based on receiving the multicast registration request for the first direction and the second direction, including:
rejecting the bicasted copy containing the multicast registration request from the second direction and having caused the collision, and
relabeling by the fourth network node any multicasted stream specifying the second direction with the first direction, and forwarding the relabeled multicasted stream along the first non-congruent path for delivery to the network node.

15. Logic encoded in one or more non-transitory tangible media for execution and when executed by a machine operable for:
creating, in a computing network, a loop-free routing topology comprising a plurality of routing arcs for reaching a destination network node, each routing arc comprising a first network node as a first end of the routing arc, a second network node as a second end of the routing arc, and at least a third network node configured for routing any network traffic along the routing arc toward the destination network node via any one of the first or second ends of the routing arc, the loop-free routing topology providing first and second non-congruent paths; and
forwarding bicasting data, comprising a data packet in a first direction from a network node and a bicasted copy of the data packet in a second direction from the network node, concurrently to the destination network node respectively via the first and second non-congruent paths; and
causing multicast streams to be sent from the destination network node to the network node, via first and second non-congruent multicast paths, in response to the destination network node receiving the data packet and the bicasted copy each containing a multicast registration request, each network node along one of the first or second non-congruent multicast paths marking the multicast registration request in response to reception thereof.

16. The method of claim 6, wherein the creating includes:
associating first-hop nodes, that are one hop from the destination network node, as belonging to one of the first non-congruent path or the second non-congruent path; and
propagating the association of each first-hop node along the corresponding routing arc toward one of the corresponding third network node, or a junction node of a buttressing arc.

17. The method of claim 16, wherein at least one of the routing arcs is a root arc having the corresponding first network node as the first-hop node belonging to the first non-congruent path and the corresponding second network node as the corresponding first-hop node belonging to the second non-congruent path, the third network node of the at least one routing arc having possession of an arc cursor for controlling the network traffic along the corresponding at least one routing arc via the respective first or second non-congruent paths of the corresponding routing arc.

18. The apparatus of claim 13, wherein the processor circuit is configured for creating the first and second non-congruent paths based on:
associating first-hop nodes, that are one hop from the destination network node, as belonging to one of the first non-congruent path or the second non-congruent path; and
causing propagating of the association of each first-hop node along the corresponding routing arc toward one of the corresponding third network node, or a junction node of a buttressing arc.

19. The apparatus of claim 18, wherein at least one of the routing arcs is a root arc having the corresponding first network node as the first-hop node belonging to the first non-congruent path and the corresponding second network node as the corresponding first-hop node belonging to the second non-congruent path, the third network node of the at least one routing arc having possession of an arc cursor for controlling the network traffic along the corresponding at least one routing arc via the respective first or second non-congruent paths of the corresponding routing arc.

20. The logic of claim 15, wherein the creating includes:
associating first-hop nodes, that are one hop from the destination network node, as belonging to one of the first non-congruent path or the second non-congruent path; and
propagating the association of each first-hop node along the corresponding routing arc toward one of the corresponding third network node, or a junction node of a buttressing arc.

21. The logic of claim 20, wherein at least one of the routing arcs is a root arc having the corresponding first network node as the first-hop node belonging to the first non-congruent path and the corresponding second network node as the corresponding first-hop node belonging to the second non-congruent path, the third network node of the at least one routing arc having possession of an arc cursor for controlling the network traffic along the corresponding at least one routing arc via the respective first or second non-congruent paths of the corresponding routing arc.

* * * * *